US007336595B2

(12) United States Patent
Kondo et al.

(10) Patent No.: US 7,336,595 B2
(45) Date of Patent: Feb. 26, 2008

(54) REPRODUCING SYSTEM AND CORRESPONDING INFORMATION RECORDING MEDIUM HAVING WOBBLED LAND PORTIONS

(75) Inventors: Tetsuya Kondo, Kanagawa-ken (JP); Kenji Oishi, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 11/620,150

(22) Filed: Jan. 5, 2007

(65) Prior Publication Data

US 2007/0133382 A1    Jun. 14, 2007

Related U.S. Application Data

(63) Continuation of application No. 10/419,149, filed on Apr. 21, 2003, now Pat. No. 7,177,262.

(30) Foreign Application Priority Data

| Apr. 19, 2002 | (JP) | ............................. 2002-117555 |
| Apr. 25, 2002 | (JP) | ............................. 2002-123612 |
| May 16, 2002 | (JP) | ............................. 2002-141286 |
| May 23, 2002 | (JP) | ............................. 2002-148781 |
| May 31, 2002 | (JP) | ............................. 2002-160129 |

(51) Int. Cl.
*G11B 7/24* (2006.01)

(52) U.S. Cl. ................................. 369/275.4; 369/275.1

(58) Field of Classification Search ..................... None
See application file for complete search history.

(56) References Cited

U.S. PATENT DOCUMENTS 5,602,824 A * 2/1997 Ooki et al. ............... 369/275.4

(Continued)

FOREIGN PATENT DOCUMENTS

| JP | 2778405 | 5/1998 |
| JP | 10-172248/1998 | 6/1998 |
| JP | 2797035 | 7/1998 |
| JP | 11-259985 | 9/1999 |
| JP | 11-346154 | 12/1999 |

(Continued)

OTHER PUBLICATIONS

Narahara et al. "Optical Disc System for Digital Video Recording" SPIE vol. 3864 International Symposium on Optical Memory and Optical Data Storage (1999), pp. 50-52.

*Primary Examiner*—Tan Dinh
(74) *Attorney, Agent, or Firm*—Connolly Bove Lodge & Hutz LLP

(57) ABSTRACT

An information recording medium is at least composed of a substrate having a microscopic pattern constituted by a continuous substrate of grooves formed with a groove portion and a land portion alternately, a recording layer formed on the microscopic pattern for recording information, and a light transmitting layer formed on the recording layer. The microscopic pattern is formed with satisfying a relation of $P \leq \lambda/NA$, wherein P is a pitch of the land portion or the groove portion, $\lambda$ is a wavelength of reproducing light for reproducing the recording layer, and NA is a numerical aperture of an objective lens. The land portion is formed with wobbling so as to be parallel with each other for both sidewalls of the land portion. An auxiliary information based on data used supplementally when recording the information and a reference clock based on a clock used for controlling a recording speed when recording the information is recorded alternately. Information is recorded in the recording layer corresponding to only a land portion by at least either one change of reflectivity difference and refractive index difference in the recording layer so as to be more than 5% for reflectivity and so as to be more than 0.4 for modulated amplitude of signal recording.

2 Claims, 27 Drawing Sheets

U.S. PATENT DOCUMENTS

| | | | |
|---|---|---|---|
| 5,776,574 A * | 7/1998 | Honguh et al. | 369/275.1 |
| 5,933,410 A | 8/1999 | Nakane et al. | |
| 6,693,873 B2 | 2/2004 | Kondo et al. | |
| 6,873,595 B2 | 3/2005 | Kondo et al. | |
| 6,982,127 B2 | 1/2006 | Kondo et al. | |
| 7,133,331 B2 * | 11/2006 | Kondo et al. | 369/275.1 |
| 2002/0110067 A1 | 8/2002 | Kondo et al. | |
| 2003/0053404 A1 * | 3/2003 | Kondo | 369/275.4 |
| 2003/0053405 A1 | 3/2003 | Kondo | |
| 2003/0058782 A1 | 3/2003 | Kondo | |
| 2003/0165095 A1 | 9/2003 | Iimura et al. | |
| 2007/0133381 A1 * | 6/2007 | Kondo et al. | 369/275.4 |

FOREIGN PATENT DOCUMENTS

| | | |
|---|---|---|
| JP | 2000-228064 | 8/2000 |
| JP | 2000-286709 | 10/2000 |
| JP | 2000-332613 | 11/2000 |
| JP | 2001-023243 | 1/2001 |
| JP | 2001-110146 | 4/2001 |
| JP | 2001-112016 | 4/2001 |
| JP | 2001-186027 | 7/2001 |
| JP | 2002-100049 | 4/2002 |
| JP | 2002-342941 | 11/2002 |

* cited by examiner

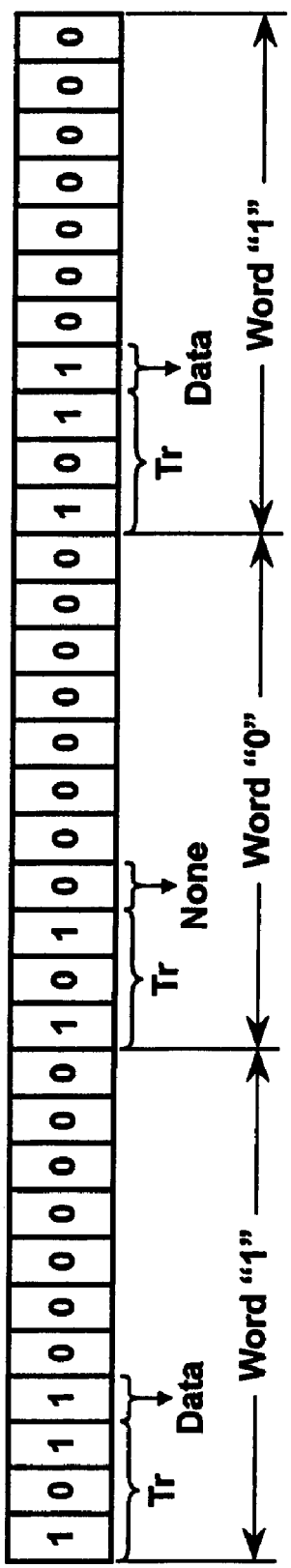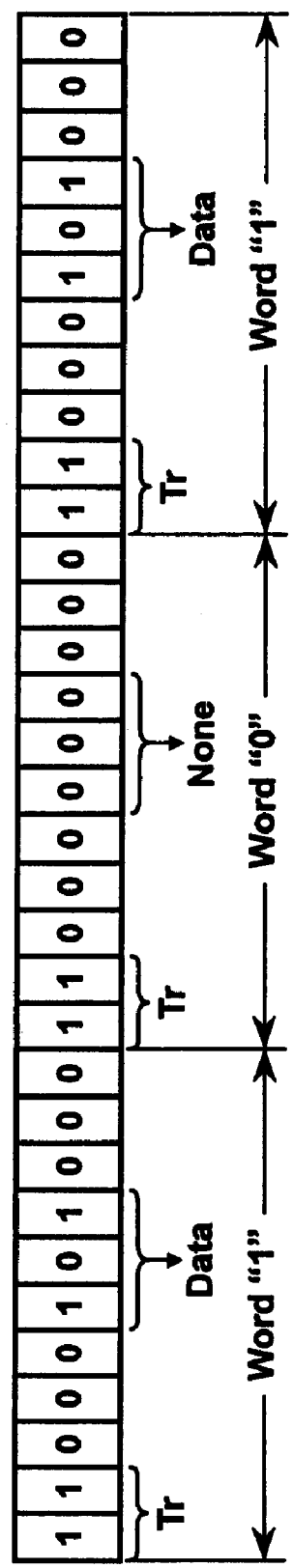

| Base-band before modulating | Base-band after modulated |
|---|---|
| 0 | 00, 11 |
| 1 | 01, 10 |

Fig. 15

| Base-band before modulating | 1 0 0 0 0 1 |
|---|---|
| Base-band after modulated | 01 00 11 00 11 01 |

Fig. 16

| | Thickness of Reflective layer 121 [nm] | Thickness of First Protective layer 122 [nm] | Thickness of Recording layer 123 [nm] | Thickness of Second Protective layer 124 [nm] | Reflectivity [%] | Modulation amplitude | Reproduction laser power at limit of deterioration [mW] | Judgement of deteriorated reproduction | Judgement of reproduction error rate | Judgement of address error rate |
|---|---|---|---|---|---|---|---|---|---|---|
| Emb. 1 | 100 | 11.5 | 18 | 36 | 14.8 | 0.596 | 0.37 | Good | Good | Good |
| Emb. 2 | 100 | 10.0 | 16 | 36 | 12.0 | 0.605 | 0.36 | Good | Good | Good |
| Emb. 3 | 85 | 13.0 | 18 | 43 | 18.5 | 0.525 | 0.38 | Good | Good | Good |
| Emb. 4 | 85 | 11.5 | 16 | 43 | 19.7 | 0.527 | 0.38 | Good | Good | Good |
| Emb. 5 | 85 | 10.0 | 14 | 43 | 19.5 | 0.526 | 0.39 | Good | Good | Good |
| Emb. 6 | 70 | 13.0 | 16 | 50 | 22.7 | 0.455 | 0.40 | Good | Good | Good |
| Emb. 7 | 70 | 11.5 | 14 | 50 | 26.0 | 0.444 | 0.41 | Good | Good | Good |
| Exa. 1 | 100 | 13.0 | 14 | 36 | 11.0 | 0.685 | 0.34 | Not Good | Good | Good |
| Exa. 2 | 70 | 10.0 | 18 | 50 | 28.2 | 0.389 | 0.42 | Good | Not | Good |

Note: "Emb." and "Exa." represent "Embodiment" and "Comparative Example" respectively.

Fig. 39

REPRODUCING SYSTEM AND CORRESPONDING INFORMATION RECORDING MEDIUM HAVING WOBBLED LAND PORTIONS

CROSS-REFERENCE TO RELATED APPLICATIONS

This application is a Continuation of co-pending application Ser. No. 10/419,149, filed on Apr. 21, 2003, and for which priority is claimed under 35 U.S.C. § 120; and this application claims priority of Application No. 2002-117555 filed in Japan on Apr. 19, 2002 under 35 U.S.C. § 119; this application also claims priority of Application No. 2002-141286 filed in Japan on May 16, 2002 under 35 U.S.C. § 119; this application also claims priority of Application No. 2002-160129 filed in Japan on May 31, 2002 under 35 U.S.C. § 119; this application also claims priority of Application No. 2002-123612 filed in Japan on Apr. 25, 2002 under 35 U.S.C. § 119; and this application claims priority of Application No. 2002-148781 filed in Japan on May 23, 2002 under 35 U.S.C. § 119; the entire contents of all are hereby incorporated by reference.

BACKGROUND OF THE INVENTION

1. Field of the Invention

The present invention relates to an information recording medium that is particularly used for recording information and a reproducing apparatus for reading out information recorded in the information recording medium with making the information recording medium move relatively particularly, relates to an information recording medium for recording and/or reproducing information optically and a reproducing apparatus thereof.

2. Description of the Related Art

Until now, there existed a system used for reading out information from an information recording medium while the information recording medium is made relatively move. In order to reproduce the system, such a method as optical, magnetic or capacitance is utilized. A system for recording and/or reproducing information by the optical method has been most popular in daily life. In the case of a read-only type information recording medium in disciform, which is reproduced by a light beam having a wavelength of 650 nm, for example, such a medium in disciform as a DVD video disc pre-recorded with picture image information, a DVD-ROM disc that is pre-recorded with a program or like, a DVD audio disc, or an SACD (Super Audio CD) disc that is pre-recorded with musical information is popularly known.

In the case of a recording and reproducing type information recording medium, there existed a DVD RAM disc utilizing a phase change effect, an ASMO (Advanced Storage Magneto-Optical) disc and an iD (intelligent image disc) utilizing a magneto-optical effect.

On the other hand, in order to increase recording density, such a study as shortening a wavelength of laser beam so as to realize emission of violaceous light has been continued. A second harmonic oscillating element or a semiconductor light emitting element of gallium nitride system compound, which was invented recently, emits light having a wavelength $\lambda$ in the neighborhood of 350 nm to 450 nm. Consequently, they are possible to be an important light emitting element, which increases recording density drastically.

Further, a design of objective lens complying with such a wavelength has been advanced. Particularly, an objective lens having an NA (numerical aperture) utilized for a DVD disc, that is, an NA of exceeding 0.6 and more than 0.7 is being developed.

As mentioned above, a reproducing apparatus for information recording medium that is equipped with a light emitting element of which wavelength $\lambda$ is reduced down to 350 nm to 450 nm and equipped with an objective lens of which an NA is more than 0.7 is being developed. By using these technologies, it can be expected that an optical disc system, which surpasses recording capacity of current DVD disc further more, will be developed.

Further, it is also desired that an information recording medium having higher recording density, which is designed on the basis of a violaceous laser beam and a higher NA, is developed.

On the other hand, a recent recording and reproducing type disc adopts a microscopic configuration, namely the land-groove system. With referring to FIGS. 41 and 42, an information recording medium designed for a higher NA recording and reproducing system is explained.

FIG. 41 is a cross sectional view of a conventional information recording medium adopting the microscopic configuration that is called the land-groove system according to the prior art.

FIG. 42 is an enlarged plan view of the information recording medium shown in FIG. 41 showing the horizontal configuration of the information recording medium according to the prior art.

As shown in FIG. 41, an information recording medium 100 is composed of a recording layer 120 and a light transmitting layer 110 that are sequentially laminated on a substrate 130. A microscopic pattern 131 is formed on the substrate 130. The recording layer 120 is formed directly on the surface of the microscopic pattern 131. The microscopic pattern 131 is composed of a plural of land portions "La" and "Lb" (hereinafter generically referred to as land portion "L") and a plural of groove portions "Ga" to "Gc" (hereinafter generically referred to as groove portion "G"). Macroscopically, the configuration corresponds to that the microscopic pattern 131 is constituted by a continuous groove composed of the land portion "L" and another continuous groove composed of the groove portion "G".

Further, as shown in FIG. 42, a record mark "M" is formed in both the grooves composed of the land portion "L" and the groove portion "G" respectively when recording.

With paying attention to the dimensions of the microscopic pattern 131, while a shortest distance between the groove portions "Ga" and "Gb" is assumed to be a pitch "P0" (another shortest distance between the land portions "La" and "Lb" is also the pitch "P0"), the microscopic pattern 131 is formed so as to satisfy a relation of P0>S0, wherein "S0" is a spot diameter of reproducing light beam.

Hereupon, the spot diameter "S0" is calculated by a wavelength $\lambda$ of laser beam for reproducing and an NA of objective lens such as S0=$\lambda$/NA. In other words, the pitch "P0" is designed so as to satisfy a relation of P0>$\lambda$/NA.

In the case of the information recording medium 100, a light beam for recording (recording light) is irradiated on the light transmitting layer 110 and a record mark "M" is formed on both the land portion "L" and the groove portion "G" of the recording layer 120.

Further, a light beam for reproducing (reproducing light) is irradiated on the substrate 130 or the light transmitting layer 110 and reflected by the recording layer 120, and then the reflected reproducing light is picked up for reproducing.

Inventors of the present invention have actually manufactured an information recording medium 100 as an experiment, and experimentally recorded and reproduced the information recording medium 100. The inventors founded a problem such that a cross erase phenomenon was extremely noticeable. The cross erase phenomenon is a phenomenon such that information is recorded with being superimposed on a signal previously recorded in a groove portion "G", for example, when recording the information in a land portion "L". In other words, it is such a phenomenon that information previously recorded in a groove portion "G" is erased by recording another information in a land portion "L".

Further, this phenomenon can also be noticeable in a reverse case, that is, the cross erase phenomenon is also recognized if previously recorded information in a land portion "L" is observed when recording information in a groove portion "G". If such a cross erase phenomenon occurs, as mentioned above, information recorded in an adjacent groove is damaged. In case of an information system having larger capacity, an amount of lost information becomes excessively large. Consequently, affection to a user is enormous.

Consequently, it is considered for such an information recording medium 100 that information shall be recorded only in either land portion "L" or groove portion "G". However, there is existed a problem such that recording capacity of an information recording medium will decrease and a merit of the information recording medium having a potential of recording in higher density will decline if such an information recording method is conducted.

SUMMARY OF THE INVENTION

Accordingly, in consideration of the above-mentioned problems of the prior art, an object of the present invention is to provide an information recording medium that is reduced in cross erase and can be recorded in higher density, and an reproducing apparatus for reproducing information recorded in the information recording medium with making the information recording medium move relatively.

In order to achieve the above object, the present invention provides, according to an aspect thereof, an information recording medium at least comprising: a substrate having a microscopic pattern constituted by a continuous substrate of grooves formed with a groove portion and a land portion alternately; a recording layer formed on the microscopic pattern for recording information; and a light transmitting layer formed on the recording layer, the information recording medium is further characterized in that the microscopic pattern is formed with satisfying a relation of $P \leq \lambda/NA$, wherein P is a pitch of the land portion or the groove portion, $\lambda$ is a wavelength of reproducing light for reproducing the recording layer, and NA is a numerical aperture of an objective lens, and that the land portion is formed with wobbling so as to be parallel with each other for both sidewalls of the land portion, and that an auxiliary information based on data used supplementally when recording the information and a reference clock based on a clock used for controlling a recording speed when recording the information is recorded alternately and continuously.

According to another aspect of the present invention, there provide a reproducing apparatus for reproducing a recording layer of an information recording medium comprising: a substrate having a microscopic pattern constituted by a continuous substrate of grooves formed with a groove portion and a land portion alternately; the recording layer formed on the microscopic pattern for recording information; and a light transmitting layer formed on the recording layer, the information recording medium is further characterized in that the microscopic pattern is formed with satisfying a relation of $P \leq \lambda/NA$, wherein P is a pitch of the land portion or the groove portion, $\lambda$ is a wavelength of reproducing light for reproducing the recording layer, and NA is a numerical aperture of an objective lens, and that the land portion is formed with wobbling so as to be parallel with each other for both sidewalls of the land portion, and that an auxiliary information based on data used supplementally when recording the information and a reference clock based on a clock used for controlling a recording speed when recording the information is recorded alternately and continuously, the reproducing apparatus comprising: a light emitting element for emitting reproducing light having a wavelength $\lambda$ of 350 nm to 450 nm and a noise of less than RIN (Relative Intensity Noise) −125 dB/Hz; a reproducing means equipped with an objective lens having a numerical aperture NA of 0.75 to 0.9; and a control means for controlling the reproducing means to irradiate the reproducing light only on the land portion for reproducing.

Other object and further features of the present invention will be apparent from the following detailed description when read in conjunction with the accompanying drawings.

BRIEF DESCRIPTION OF DRAWINGS

FIG. 11 is a first example showing a distributed recording of auxiliary information.

FIG. 12 is a second example showing a distributed recording of auxiliary information.

FIG. 15 is a table exhibiting data change before and after modulating a base-band.

FIG. 16 is a table exhibiting an example of actual data change before and after modulating a base-band.

FIG. 39 is a chart exhibiting reflectivity and reproduction characteristics of embodiments 1 through 7 and comparative examples 1 and 2.

DETAILED DESCRIPTION OF THE PREFERRED EMBODIMENTS

First Embodiment

With referring to FIG. 1, a basic configuration of an information recording medium according to the present invention will be explained. An information recording medium according to a first embodiment of the present invention is such an information recording medium that at least one of recording and reproducing is conducted through an optical method. Actually, it is such an information recording medium as a phase change recording type information recording medium, a dye type information recording medium, a magneto-optical type information recording medium or a light assist magnetic type information recording medium.

Figure 1:
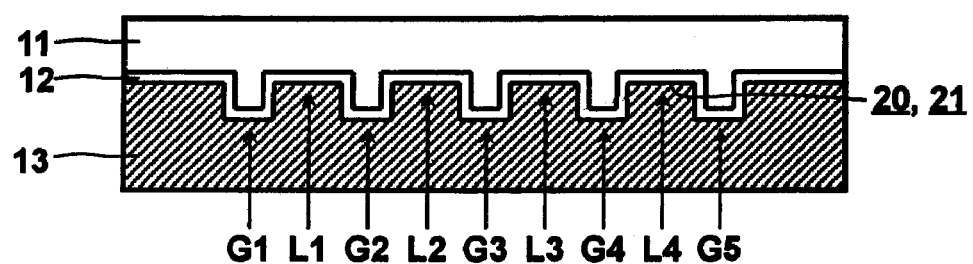
FIG. 1 is a cross sectional view of an information recording medium according to a first embodiment of the present invention.
Figure 3:
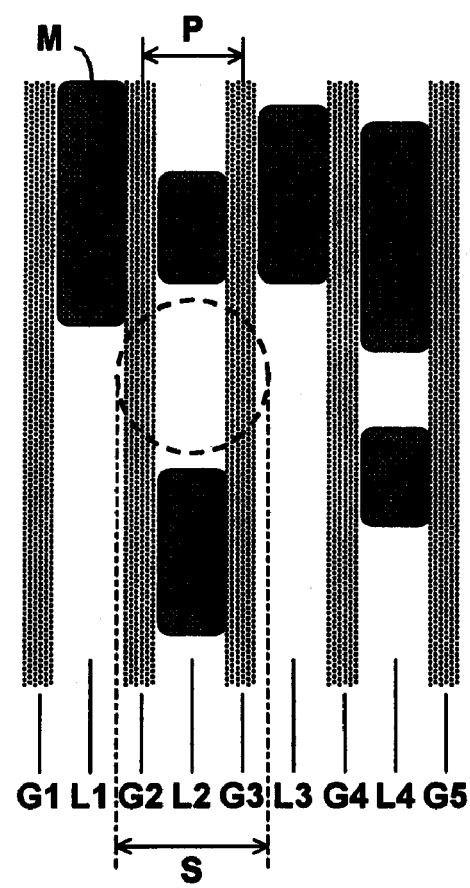
FIG. 3 is another enlarged plan view of a microscopic pattern of the information recording medium shown in FIG. 1 exhibiting a state of being recorded.

FIG. 1 is a cross sectional view of an information recording medium according to a first embodiment of the present invention. In FIG. 1, an information recording medium 1 according to the present invention is at least composed of a light transmitting layer 11, a recording layer 12, and a substrate 13 formed with a microscopic pattern 20. They are formed sequentially on the substrate 13. Unevenness of the microscopic pattern 20 forms a shape of continuous substance of approximately parallel grooves, wherein a symbol sign 21 is a microscopic pattern that is recorded with a record mark "M" as shown in FIG. 3.

Further, a shape of the information recording medium 1 can be applicable in any shape such as disciform, card and tape even in circular, rectangular or oval shape. The information recording medium 1 can also be acceptable although it is perforated.

Furthermore, a light beam for reproducing (reproducing light) or recording (recording light) is irradiated on the light transmitting layer 11.

The substrate 13, the recording layer 12, and the light transmitting layer 11 are detailed first. The substrate 13 is a base substance having a function of sustaining mechanically the recording layer 12 and the light transmitting layer 11 sequentially laminated thereon. With respect to a material for the substrate 13, any of synthetic resin, ceramic and metal is used. A typical example of synthetic resin is various kinds of thermoplastic resins and thermosetting resins such as polycarbonate, polymethyle methacrylate, polystyrene, copolymer of polycarbonate and polystyrene, polyvinyl chloride, alicyclic polyolefin and polymethyle pentene, and various kinds of energy ray curable resins such as UV ray curable resins, visible radiation curable resins and electron beam curable resins. They can be preferably used.

Further, it is also acceptable that these synthetic resins are mixed with metal powder or ceramic powder.

With respect to a typical example of the ceramic, soda lime glass, soda aluminosilicate glass, borosilicate glass or silica glass can be used. With respect to a typical example of the metal, a metal plate such as aluminum having no transparency can be used. A thickness of the substrate 13 is suitable to be within a range of 0.3 mm to 3 mm, desirably 0.5 mm to 2 mm due to necessity of supporting mechanically the information recording medium 1 totally. In case that the information recording medium 1 is in disciform, the thickness of the substrate 13 is desirable to be designed such that the total thickness of the information recording medium 1 including the substrate 13, the recording layer 12, and the light transmitting layer 11 becomes 1.2 mm, for the purpose of interchangeability with a conventional optical disc.

The recording layer 12 is a thin film layer that has a function of reading out information, recording or rewriting information. The recording layer 12 is formed with the microscopic pattern 20 that is constituted by a plurality of land portions "L1" through "L4" (hereinafter generically referred to as land portion "L") and a plurality of groove portions "G1" through "G5" (hereinafter generically referred to as groove portion "G") respectively. Information is recorded on either one of a land portion "L" and a groove portion "G" as a record mark "M". With respect to a material for the recording layer 12, a material that is represented by a phase-change material of which reflectivity or refractive index changes in a process of before and after recording or both of reflectivity and refractive index change in a process of before and after recording, a dye material of which refractive index or a depth changes in a process of before and after recording or both of refractive index and depth change in a process of before and after recording, or a material represented by a magneto-optical material, which produces a change of Kerr rotation angle in a process of before and after recording, can be used.

With respect to an actual example of phase change material, alloys composed of an element such as indium (In), antimony (Sb), tellurium (Te), selenium (Se), germanium (Ge), bismuth (Bi), vanadium (V), gallium (Ga), platinum (Pt), gold (Au), silver (Ag), copper (Cu), aluminum (Al), silicon (Si), palladium (Pd), tin (Sn) and arsenic (As) are used, wherein an alloy includes a compound such as oxide, nitride, carbide, sulfide and fluoride. Particularly, alloys composed of a system such as Ge—Sb—Te system, Ag—In—Te—Sb system, Cu—Al—Sb—Te system and Ag—Al—Sb—Te system are suitable for the recording layers 12. These alloys can contain one or more elements as a micro additive element within a range of more than 0.01 atomic % to less than 10 atomic % in total. Such a micro additive element is selected out of Cu, Ba, Co, Cr, Ni, Pt, Si, Sr, Au, Cd, Li, Mo, Mn, Zn, Fe, Pb, Na, Cs, Ga, Pd, Bi, Sn, Ti, V, Ge, Se, S, As, Tl and In.

With respect to compositions of each element, for example, there is existed $Ge_2Sb_2Te_5$, $Ge_1Sb_2Te_4$, $Ge_8Sb_{69}Te_{23}$, $Ge_8Sb_{74}Te_{18}$, $Ge_5Sb_{71}Te_{24}$, $Ge_5Sb_{76}Te_{19}$, $Ge_{10}Sb_{68}Te_{22}$ and $Ge_{10}Sb_{72}Te_{18}$ as for the Ge—Sb—Te system and a system adding a metal such as Sn and In to the Ge—Sb—Te system as for the Ge—Sb—Te system.

Further, as for the Ag—In—Sb—Te system, there is existed $Ag_4In_4Sb_{66}Te_{26}$, $Ag_4In_4Sb_{64}Te_{28}$, $Ag_2In_6Sb_{64}Te_{28}$, $Ag_3In_5Sb_{64}Te_{28}$, $Ag_2In_6Sb_{66}Te_{26}$, and a system adding a metal or semiconductor such as Cu, Fe and Ge to the Ag—In—Sb—Te system.

With respect to an actual example of magneto-optical material, alloys composed of an element such as terbium, cobalt, iron, gadolinium, chromium, neodymium, dysprosium, bismuth, palladium, samarium, holmium, praseodymium, manganese, titanium, erbium, ytterbium, lutetium and tin can be used, wherein an alloy includes a compound such as oxide, nitride, carbide, sulfide and fluoride. Particularly, constituting an alloy of a transition metal, which is represented by TbFeCo, GdFeCo and DyFeCo, with rare earth element is preferable. Further, the recording layer 12 can be constituted by using an alternate lamination layer of cobalt and platinum.

With respect to an actual example of dye material, cyanine dye, phthalocyanine dye, naphthalocyanine dye, azo dye, naphthoquinone dye, fulgide dye, polymethine dye, acridine dye, and porphyrin dye can be used.

With respect to a method of forming the recording layers 12, a film forming method such as a vapor phase film forming method and a liquid phase film forming method can be used. As a typical example of the vapor phase film forming method, such methods as vacuum deposition of resister heating type or electron beam type, direct current sputtering, high frequency sputtering, reactive sputtering, ion beam sputtering, ion plating and chemical vapor deposition (CVD) can be used.

Further, with respect to a typical example of the liquid phase film forming method, there is existed a spin coating method and a dipping and drawing up method.

The light transmitting layer 10 is composed of a material having function of conducting converged reproducing light to the recording layer 12 while keeping the converged reproducing light in less optical distortion. A material having transmittance of more than 70%, for example, at a reproduction wavelength $\lambda$, desirably more than 80% can be suitably used for the light transmitting layer 11.

It is essential for the light transmitting layer 11 to be less optical anisotropy. In order to suppress reduction of reproducing light, actually, a material having birefringence of less than ±100 nm, preferably ±50 nm by 90-degree (vertical) incident double paths is used for the light transmitting layer 11.

With respect to a material having such a birefringence characteristic, a synthetic resin such as polycarbonate, polymethyle methacrylate, cellulose triacetate, cellulose diacetate, polystyrene, copolymer of polyearbonate and polystyrene, polyvinyl chloride, alicyclic polyolefin and polymethyle pentene can be used for the light transmitting layer 11.

The light transmitting layer 11 can be provided with a function of protecting the recording layer 12 mechanically and chemically. With respect to a material having such a function, a material having higher stiffness can be used for the light transmitting layer 11. For example, transparent ceramics (such as soda lime glass, soda aluminosilicate glass, borosilicate glass, and silica glass), thermosetting resin, energy ray curable resin (such as ultraviolet rays curable resin, visible radiation curable resin and electron beam curable resin), moisture curable resin and two-part liquid mixture curable resin are preferably used for the light transmitting layer 11 having higher stiffness.

Further, a thickness of the light transmitting layer 11 is desirable to be less than 0.4 mm in view of suppressing aberration when the information recording medium 1 is inclined.

Furthermore, in view of preventing the recording layer 12 from being scratched, the thickness of the light transmitting layer 11 is desirable to be more than 0.05 mm. In other words, the desirable thickness of the light transmitting layer 11 is within a range of 0.05 mm to 0.4 mm. More desirably, the thickness is within a range of 0.06 mm to 0.12 mm.

More, scattering of thickness in a single plain is desirable to be ±0.003 mm maximum in view of spherical aberration, because an NA of objective lens is relatively large. Particularly, in case that an NA of the objective lens is more than 0.85, the scattering of thickness in a single plain is desirable to be less than ±0.002 mm.

Moreover, in case that an NA of the objective lens is 0.9, the scattering of thickness in a single plain is desirable to be less than ±0.001 mm.

With referring to FIG. 2, the microscopic pattern 20 that is one of major features of the present invention is explained next. As mentioned above, microscopically, the microscopic pattern 20 is composed of a continuous substance of approximately parallel grooves. However, macroscopically, the continuous substance can be in a shape of not only linear but also coaxial or spiral.

Figure 2:
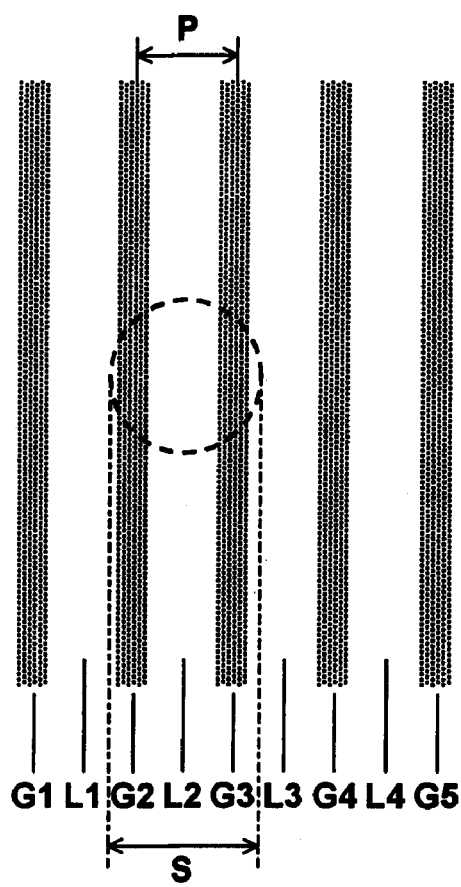
FIG. 2 is an enlarged plan view of a microscopic pattern of the information recording medium shown in FIG. 1.

FIG. 2 is an enlarged plan view of a microscopic pattern of the information recording medium shown in FIG. 1. In FIG. 2, symbol signs "P" and "S" are a pitch between adjoining two groove portions "G2" and "G3" and a spot diameter of reproducing light beam respectively. As shown in FIG. 2, a land portion "L" of the microscopic pattern 20 corresponds to the land (raised) portion "L" shown in FIG. 1 and a groove portion "G" of the microscopic pattern 20 corresponds to the groove (recessed) portion "G" shown in FIG. 1.

Further, the land portion "L" and the groove portion "G" can be wobbled, will be mentioned later. However, centerlines of the land portion "L" and the groove portion "G" are formed in parallel to each other.

In case that a user records data in the information recording medium 1, the data are recorded only on either one of the land portion "L" and the groove portion "G". Accurately, the data are recorded on a portion corresponding to either one of the land portion "L" and the groove portion "G" in the recording layer 12. Selecting either the land portion "L" or the groove portion "G" is arbitrary. However, it is desirable for selecting the land portion "L" or the groove portion "G" to maintain at least a same selection result of either the land portion "L" or the groove portion "G" even in any place in the recording layer 12. In case of recording on different portions by a place, it is hard to reproduce continuously and resulted in degrading a recording capacity substantially.

In FIG. 2 and succeeding drawings FIGS. 3 to 9, a width of the land portion "L" and a width of the groove portion "G" is illustrated in different width in each drawing. However, it is understood that the width is not limited to one specific width.

FIG. 3 is a plan view of a microscopic pattern of the information recording medium 1 shown in FIG. 1 exhibiting an example of recording that is conducted only on land portions "L" of the recording layer 12. As shown in FIG. 3, a record mark "M" is recorded only on the land portions "L1" through "L4" not on the groove portions "G1" through "G5", which constitute the microscopic pattern 21. The record mark "M" is recorded by a mark position recording method or a mark edge recording method.

A signal, which is used for recording, is a modulation signal that is a so-called (d, k) code, which is defined as that a minimum mark length is "d+1" and a maximum mark length is "k+1", wherein either a fixed length code or a variable length code can be applied for a (d, k) modulation signal. Actually, with defining that a minimum mark length is 2T, a (d, k) modulation such as (1, 7) modulation, 17PP modulation, DRL modulation, (1, 8) modulation and (1, 9) modulation can be used.

A typical example representing the (1, 7) modulation of the fixed length code is the "D1, 7" modulation (that is disclosed in the Japanese Patent Application No. 2001-80205 in the name of Victor company of Japan, Limited). The "D1, 7" modulation can be replaced by the (1, 7) modulation or the (1, 9) modulation, which is based on the "D4, 6" modulation of the fixed length code (that is disclosed in the Japanese Patent Application Laid-open Publication No. 2000-332613). The 17PP modulation is one of the (1, 7) modulation of the variable length code and disclosed in the Japanese Patent Application Laid-open Publication No. 11-346154/1999.

Further, the (2, 7) modulation and the (2, 8) modulation, which are the variable length code with defining the minimum mark length as 3T, the EFM modulation, the EFM plus modulation, and the "D8-15" modulation (that is disclosed in the Japanese Patent Application Laid-open Publication No. 2000-286709) as the (2, 10) modulation of the fixed length code can be used.

Furthermore, a modulation system, which defines the minimum mark length as 4T such as the (3,17) modulation, and another modulation system, which defines the minimum mark length as 5T such as the (4,21) modulation, can be used.

A groove portion "G" hereupon follows the definition shown in the Table 4.4-1 described in the publication "Understanding Optical Disc Properly" (edited by the Japan Patent Office and published by the Japan Institute of Invention and Innovation in 2000). In other words, a groove portion "G" is defined as a recessed groove previously provided spirally or coaxially on a surface of base substance in order to form a recording track.

Further, a land portion "L" also follows the definition described in the publication. In other words, a land portion "L" is defined as a land portion previously provided spirally or coaxially on a surface of base substance in order to form a recording track.

Furthermore, the base substance hereupon is a name equivalent to the substrate 11 of the present invention.

In FIGS. 2 and 3, with defining that a distance between adjoining two groove portions "G2" and "G3" is a pitch "P" (in the same way, a distance between adjoining two land portions "L1" and "L2" is also defined as the pitch "P"), the pitch "P" is designated so as to satisfy a relation of $P \leq S$, wherein "S" is a spot diameter of reproducing light. The spot diameter "S" is calculated by a wavelength $\lambda$ of laser beam for reproducing and an NA of objective lens such as $S=\lambda/NA$. In other words, the pitch "P" satisfies a relation of $P \leq \lambda/NA$.

In case of using a violaceous laser beam, its wavelength $\lambda$ is within a range of 350 nm to 450 nm, and in case of using a high NA lens, its NA is 0.75 to 0.9. Consequently, a pitch "P" is set to be within a range of 250 nm to 600 nm.

Further, in case of considering that a digital picture image of HDTV (High Definition Television) program is recorded for approximately two hours, more than 20 GB is necessary for a recording capacity. Consequently, the pitch "P" is desirable to be within a range of 250 nm to 450 nm. Particularly, in case that an NA is 0.85 to 0.9, the pitch "P" is more desirable to be 250 nm to 400 nm.

Furthermore, in case that a wavelength $\lambda$ is 350 nm to 410 nm and also an NA is 0.85 to 0.9, the pitch "P" is most desirable to be 250 nm to 360 nm.

A depth of groove portion "G" is preferable to be within a range of $\lambda/8n$ to $\lambda/20n$, wherein "n" is a refractive index at a wavelength $\lambda$ of the light transmitting layer 11. Since a reflectivity of the recording layer 12 is reduced a little due to existence of the microscopic pattern 20, a depth of groove portion "G" is desirable to be shallower. Less than $\lambda/10n$ is suitable for the depth of groove portion "G" as a limit for jitter of a reproduced signal not to be deteriorated.

Further, an output of push-pull signal increases in accordance with a depth of groove portion "G" when tracking down a land portion "L" or a groove portion "G". Consequently, more than $\lambda/18n$ is suitable for a limiting value for enabling to track. In other words, a range of $\lambda/10n$ to $\lambda/18n$ is suitable for a depth of groove portion "G", and a most suitable range for the depth of groove portion "G" is $\lambda/10n$ to $\lambda/18n$.

As mentioned above, the information recording medium 1 according to the first embodiment of the present invention is such an information recording medium that is recorded on either a groove portion "G" or a land portion "L" of the recording layer 12. Therefore, recording is conducted with keeping a distance of pitch "P" and resulted in decreasing the cross erase phenomenon.

Further, it is designed for the relation between the pitch "P" and the spot diameter "S" to be $P \leq S$, so that recording density is prevented from decreasing.

A result of evaluation with respect to the cross erase phenomenon in comparison with a conventional information recording medium 100 is depicted hereinafter. With respect to an information recording medium of which recording layer 12 is formed by a phase change material, a second track is recorded and reproduced, and the reproduced output is measured. Then, a first track and a third track is recorded ten times each with a signal having a frequency different from that recorded on the second track, and an output from the second track is measured once again. With defining that an output difference between the outputs originally measured and secondary measured is a cross erase amount, a cross erase amount cause by the conventional information recording medium 100 is –5 dB. On the contrary, by the information recording medium 1 according to the first embodiment of the present invention, a cross erase amount is reduced to the order of –2 dB. In other words, by using the information recording medium 1 according to the first embodiment of the present invention, a cross erase phenomenon can be improved by 3 dB in comparison with the conventional information recording medium 100.

Further, a similar evaluation is conducted to an information recording medium of which recording layer 12 is formed by a magneto-optical material. By the conventional information recording medium 100, an output decreases by 4 dB. On the contrary, by the information recording medium 1 according to the first embodiment of the present invention, an output decreases by just 1 dB. In other words, by using the information recording medium 1, a cross erase phenomenon is improved by up to 3 dB in comparison with the conventional information recording medium 100 although a magneto-optical material is used for the information recording medium 1.

Furthermore, a similar evaluation is conducted to an information recording medium of which recording layer 12 is formed by a dye material. By the conventional information recording medium 100, an output decreases drastically by 12 dB. On the contrary, by the information recording medium 1, an output decreases by as low as 2 dB. In other words, by using the information recording medium 1, a cross erase phenomenon is improved by up to 10 dB in comparison with the conventional information recording medium 100 although a dye material is used for the information recording medium 1.

The information recording medium 1 according to the first embodiment of the present invention is such an information recording medium that is recorded with information on either a groove portion "G" or a land portion "L" of the recording layer 12. It is studied that either portion is suitable for recording information in view of reproduction, and it is founded that recording on a land portion "L" of the recording layer 12 decreases an error rate and is excellent in a rewriting characteristic. In view of that a land portion "L" is disposed in a side closer to the light transmitting layer 11 than a groove portion "G", and reproducing light and recording light is irradiated on the light transmitting layer 11, it is considered that thermal flow of a material constituting the recording layers 12 is suppressed to some degree in an area of land portion "L".

Figure 4:
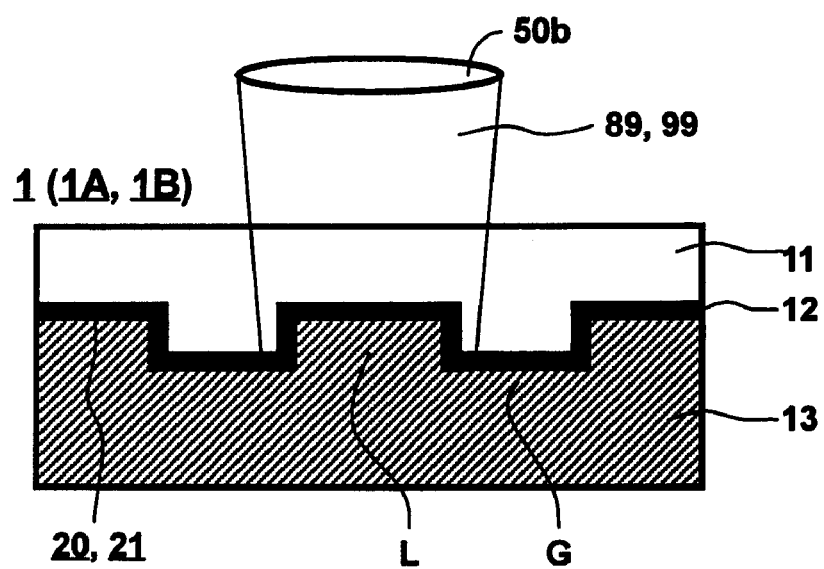
FIG. 4 is a cross sectional view of the information recording medium shown in FIG. 1 exhibiting a state of reproducing or recording a recording layer of the information recording medium.

FIG. 4 is a cross sectional view of the information recording medium 1 according to the first embodiment of the present invention exhibiting a state of recording and reproducing the recording layer 12. In FIG. 4, a recording apparatus and a reproducing apparatus is illustrated by an objective lens 50b as a representative of them. A laser beam 89 is emitted through the objective lens 50b of the recording apparatus when recording. The laser beam 89 is converged selectively on a land portion "L" of the microscopic pattern 20 in the information recording medium 1 with respect to the horizontal direction. As for the vertical direction, the laser beam 89 is converged selectively on the recording layer 12 through the light transmitting layer 11.

Further, a record mark "M" is recorded on a portion where the laser beam 89 is converged on. In other words, recording is selectively conducted to the recording layer 12 corresponding to a land portion "L".

As mentioned above, in the case that the recording layer 12 is formed by a phase change material, the recording hereupon is conducted by change of reflectivity, change of refractive index, or change of both of them. In the case of being formed by a magneto-optical material, the recording is conducted by change of Kerr rotation angle.

Further, in the case of a dye material, the recording is conducted by change of refractive index, change of depth, or change of both of them.

On the other hand, when reproducing, a laser beam 99 is emitted through the objective lens 50b of the reproducing apparatus. The laser beam 99 is converged selectively on a land portion "L" of the microscopic pattern 21 in the information recording medium 1 with respect to the horizontal direction.

Further, with respect to the vertical direction, the laser beam 99 is converged selectively on the recording layer 12 through the light transmitting layer 11. A record mark "M" is recorded selectively on the recording layer 12 corresponding to a land portion "L". Consequently, a record mark "M" can be read out from a portion where the laser beam 99 is converged on.

According to the first embodiment of the present invention, as mentioned above, the microscopic pattern 20 of the information recording medium 1 is formed to be $P \leq \lambda/NA$, wherein "P" is the pitch between adjoining two groove portions "G" or land portions "L", "$\lambda$" is a wavelength of a laser beam for recording or reproducing, and "NA" is a numerical aperture of an objective lens.

Further, recording is conducted to either one of a land portion "L" and a groove portion "B". Consequently, an information recording medium recorded in high density can be obtained as well as reducing a cross erase phenomenon.

In addition thereto, according to the first embodiment of the present invention, an information recording medium that is low in error rate and excellent in rewriting characteristic can be obtained by recording selectively on a land portion "L".

A method of embedding an auxiliary information such as address and a reference clock, which is a second object of the information recording medium 1 according to the first embodiment of the present invention, is explained hereafter. The present invention is explained by specifying an embodiment in which recording is conducted on a land portion "L" hereupon.

In case of a recording type information recording medium, it is required that recording is accurately conducted in an arbitrary position, which is requested by a user. If the recording type information recording medium is constituted by arranging a groove portion "G" and a land portion "L" alternatively as shown in FIG. 2, positioning based on a relative distance between a recording apparatus or reproducing apparatus and the information recording medium can only be conducted. Therefore, recording in a required position can not be conducted accurately.

Accordingly, an address information is essential to be embedded in somewhere on the microscopic pattern 20. It is considered that an alternating configuration of groove portion "G" and land portion "L" as the same configuration as a commonly known optical disc such as a CD, for example, is transported to a free plane at each certain macroscopic interval (each interval of the order of milli) and pits having a plurality of lengths are arranged into the free plane. An address information is defined by a combination of the pit length. Reading out a pit in such a free plane can be conducted by reading out a depth as phase change that is the same manner as a CD, so that the reading out a pit is an easy method. However, providing such a free plane as an address area makes losses of recording capacity expands. In view of reliability of reading out, the loss is approximately 10% and hard to be allowed.

Furthermore, in the case of the recording type information recording medium, a relative speed between an information recording medium and a recording apparatus, that is, a recording speed affects a recording density and besides, signal quality. Therefore, a reference clock for designating a recording speed correctly is essential. In case that a reference clock is provided in a recording apparatus, a relative speed can hardly be adjusted even though the relative speed is shifted by various conditions. Consequently, it is desirable for the reference clock to be provided inside an information recording medium. Particularly, the information recording medium 1 is in disciform and a linear velocity changes every moment in case of a recording mode by the CLV (Constant Linear Velocity) recording method. Therefore, it is essential for the reference clock to be provided inside the information recording medium 1.

In order to solve the problems and satisfy the requirements mentioned above, there provided a method for embedding an auxiliary information and a reference clock in the information recording medium 1. An auxiliary information hereupon is a data array that is used subsidiarily when recording in the recording layer 12 of the information recording medium 1 by a user.

Actually, an auxiliary information is composed of at least an address information. An address information exhibits an address that changes continuously by a position of the information recording medium 1 and is data selected out from information such as absolute address allocated to the whole area of the information recording medium 1, relative address allocated to a partial area, track number, sector number, frame number, field number, and time information.

These address data sequentially change in the order of increment or decrement in accordance with progress of a recording track such as a land portion "L", for example.

It is acceptable that an address information can be accompanied by a specific information, which is composed of a small amount of data. A specific information is common data in the plain of the recording layer 12. Such a specific information is at least selected out from, for example, type of an information recording medium, size of the information recording medium, estimated recording capacity of the information recording medium, estimated recording linear density of the information recording medium, estimated recording linear velocity of the information recording medium, track pitch of the information recording medium, recording strategic information such as peak power, bottom power, erase power, and pulse period, reproduction laser power information, manufacturer's information, production number, lot number or batch number, control number, copyright related information, key for ciphering, key for deciphering, ciphered data, recording permission code, recording refusal code, reproducing permission code, and reproducing refusal code.

Further, an auxiliary information is such information that, for example, is described by the decimal number system or the hexadecimal notation and converted into the binary number system such as a BCD (Binary-Coded Decimal) code and a gray code.

Furthermore, the auxiliary information can accompany an error correcting code in order to prevent a data error.

In addition, a reference clock is provided for representing a pause of a certain period of time on a signal. Actually, a reference clock is composed of a single frequency that will be mentioned later.

Figure 5:
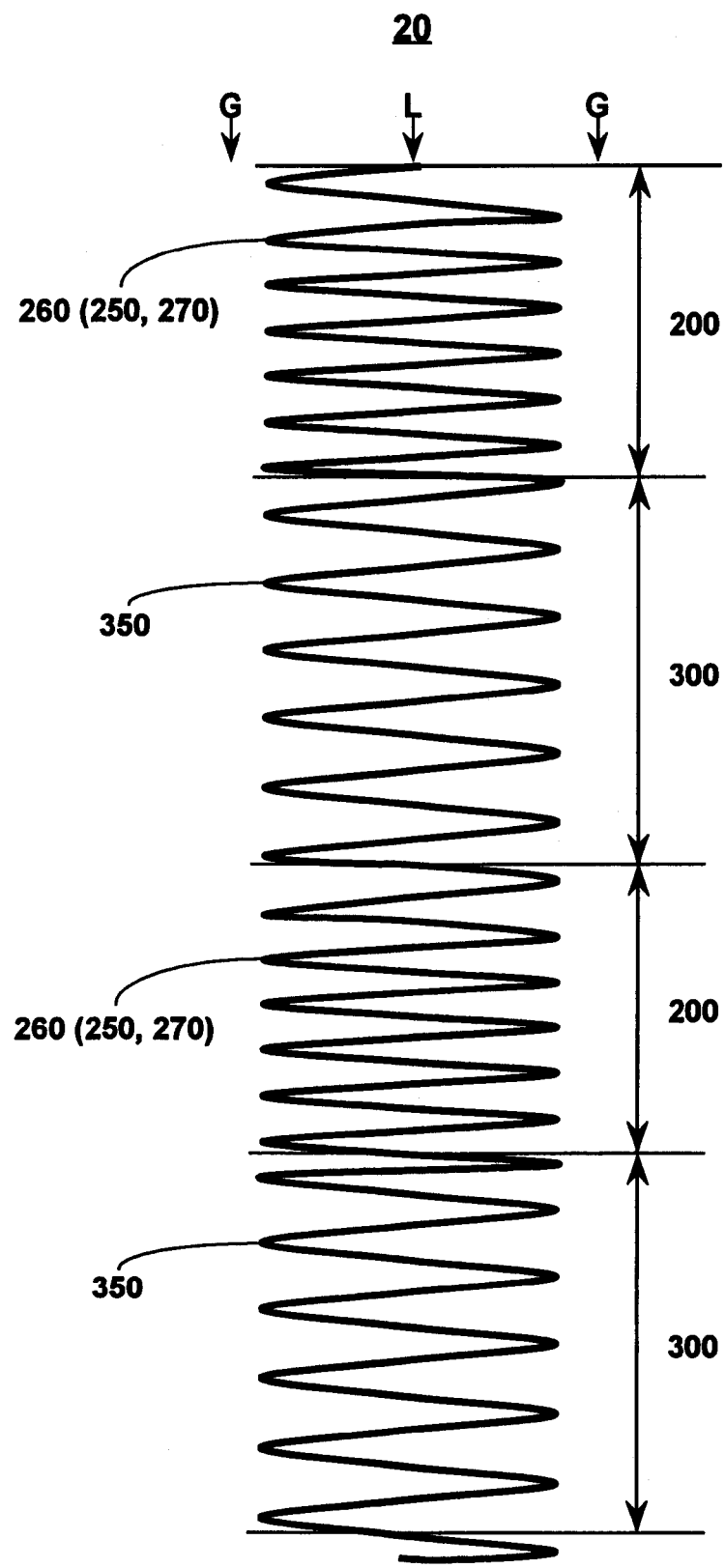
FIG. 5 is an enlarged plan view showing an auxiliary information area and a reference clock area in the information recording medium according to the first embodiment of the present invention.

FIG. 5 is a plan view showing a structure of the microscopic pattern 20, which is embedded with an auxiliary information and a reference clock, of the information recording medium 1 according to the first embodiment of the present invention. That is, the microscopic pattern 20 is composed of a land portion "L" and a groove portion "G".

Further, the land portion "L" or the groove portion "G" is formed by being wobbled. In other words, both an auxiliary information and a reference clock are recorded by a wobbling groove. In FIG. 5, the drawing is illustrated such that an auxiliary information and a reference clock are recorded by wobbling a land portion "L".

Furthermore, the microscopic pattern 20 is divided into at least two areas macroscopically, and at least composed of an auxiliary information area 200 and a reference clock area 300. As mentioned above, each of the auxiliary information area 200 and the reference clock area 300 is wobbled respectively. By a wobbling groove, an auxiliary information is recorded in the auxiliary information area 200 and a reference clock is recorded in the reference clock area 300. These areas are continuously formed without being interrupted, so that continuous reproduction is enabled. FIG. 5 is illustrated such that only two areas of the auxiliary information area 200 and the reference clock area 300 are allocated. However, this alternative allocation of the auxiliary information area 200 and the reference clock area 300 is repeated and constitutes whole area of the microscopic pattern 20 of the information recording medium 1.

Moreover, in FIG. 5, both of the auxiliary information area 200 and the reference clock area 300 are formed on the land portion "L" as a most preferable example. However, it is essential that one of the auxiliary information area 200 and the reference clock area 300 is formed on a groove portion "G" if the other one of the auxiliary information area 200 and the reference clock area 300 is formed on a groove portion "G".

As mentioned above, by forming the auxiliary information area 200 and the reference clock area 300 on the same shaped portion, that is, a land portion "L" or a groove portion "G", an auxiliary information and a reference clock can be reproduced continuously.

The auxiliary information 200 is composed of a waveform that is modulated digital data hereupon. Actually, the waveform is composed of any one of an amplitude-shift keying modulation wave 250 (250, 251, and 252), a frequency-shift keying modulation wave 260 (260, 261, and 262) and a phase-shift keying modulation wave 270 (270, 271, and 272) or any one of them that are transformed. FIG. 5 exemplifies particularly that the auxiliary information 200 is the frequency-shift keying modulation waveform 260 (260, 261, and 262).

Although these modulation methods will be detailed later, in the amplitude-shift keying modulation method, digital data of an auxiliary information are expressed such as "1" or "0" by a fundamental wave whether or not the fundamental wave is existed. In the case of the frequency-shift keying modulation method, digital data of an auxiliary information are expressed such as "1" or "0" by a frequency of a fundamental wave whether the frequency is higher or lower. In the case of the phase-shift keying modulation method, digital data of an auxiliary information are expressed such as "1" or "0" by a difference of phase angular of a fundamental wave. It is possible to record an auxiliary information such as an address more efficiently and to allocate the reference clock area 200 relatively longer by adopting these modulation methods. Being able to allocate the reference clock area 200 longer enables to detect a reference clock for a long period of time when recording the information recording medium 1, so that stable recording can be conducted.

A fundamental wave of these modulation methods hereupon can be selected out from a sinusoidal wave (or cosine wave), a triangular wave, and a rectangular wave. In case that a sinusoidal wave (cosine wave) is selected out from them, a harmonic component can be minimized when reproducing, and resulted in improving power efficiency and suppressing a jitter. Consequently, a sinusoidal wave (cosine wave) is suitable for a fundamental wave.

In addition thereto, a signal waveform formed by any of these modulation methods is recorded geometrically as a wobbling sidewall of land portion "L".

On the other hand, the reference clock area 300 is composed of a single-frequency wave 350 that is continuously repeated. Since the frequency is single, it is possible to generate a frequency in response to a number of revolutions by making the information recording medium 1 move relatively while reproducing. Consequently, a reference clock can be produced. The reference clock can be used for revolution control when recording.

Further, a fundamental wave having a single frequency is composed of any one of a sinusoidal wave (cosine wave), a triangular wave, and a rectangular wave. In case that a sinusoidal wave (cosine wave) is selected out from them, a harmonic component can be minimized when reproducing, and resulted in improving power efficiency and suppressing a jitter. Consequently, a sinusoidal wave (cosine wave) is suitable for a fundamental wave.

In addition thereto, a signal waveform formed by any of these modulation methods is recorded geometrically as a wobbling sidewall of land portion "L".

As mentioned above, the microscopic pattern 20 according to the present invention is at least composed of the auxiliary information area 200 and the reference clock area 300. An auxiliary information and a reference clock are recorded continuously by a wobbling groove without interruption. These auxiliary information and reference clock recorded on a sidewall of the land portion "L" in a shape of wobbling are read out from a push-pull signal by using a well-known 2-division or 4-division detector. Revolution control can be conducted by the read-out reference clock while recording, and further an information can be written in or erased from a predetermined address by extracting an address information from an auxiliary signal.

It is desirable for reproduction that the auxiliary information area 200 and the reference clock area 300 are in uniform length with each other and allocated alternately. In case that a length is not uniform with each other, it is not predicted that an auxiliary information such as an address or a reference clock can be detected at which timing while reproducing. Consequently, confusions may occur. On the contrary, in case that each length is uniform and they are allocated alternately, arrival of a succeeding signal can be easily predicted once reproduction is enabled. Accordingly, a timing of obtaining an auxiliary information and a reference clock is predicted by a logic circuit and the auxiliary information and the reference clock can be reproduced in less error.

Further, the reference clock area 300 is an important signal for controlling a number of revolutions when reproducing the information recording medium 1, so that the reference clock area 300 is desirable to be formed as long as possible. Actually, it is necessary for a ratio of a length of the reference clock area 300 to a total length of the auxiliary information area 200 and the reference clock area 300 to be more than 50%, desirably more than 60%. If the ratio is less than the value mentioned above, a reference clock can only be obtained for a short period of time. Consequently, revolution control is conducted intermittently and a reproduction operation becomes unstable. In a worst case, mismatching occurs in a logic circuit for reproducing and the operation is resulted in interrupting the reproduction.

It is acceptable that a shape of fundamental waveform and an amount of amplitude of these two areas are different from each other. However, they are desirable to be the same in view of simplification and stabilization of a recording circuit and a reproducing circuit.

With respect to a frequency, in case that the auxiliary information area 200 is formed with the amplitude-shift keying modulation wave 250 or the phase-shift keying modulation wave 270, it is acceptable that a frequency of the amplitude-shift keying modulation wave 250 or the phase-shift keying modulation wave 270 is different from a frequency of the single-frequency wave 350 of the reference clock area 300. However, in case of the same frequency, the recording circuit and the reproducing circuit can be simplified drastically. Consequently, the same frequency is desirable. Their frequencies are desirable to be at least related to "integral multiples" or "one over an integer".

Further, in case that an auxiliary information of the auxiliary information area 200 is formed by the frequency-shift keying modulation wave 260, it is acceptable that two frequencies constituting the frequency-shift keying modulation wave 260 are different from a frequency of the single-frequency wave 350 in the reference clock area 300.

However, in case that one of the two frequencies constituting the frequency-shift keying modulation wave 260 is the same as the frequency of the single-frequency wave 350, a physical length utilized for extracting a clock can be extended slightly. Consequently, the same frequency is desirable. These three frequencies are desirable to be related to "integral multiples" or "one over an integer" respectively in view of simplifying a recording circuit and a reproducing circuit.

Furthermore, it is also acceptable that a start-bit signal, a stop-bit signal and a sync signal is recorded as a wobbling groove at the boundary between the auxiliary information area 200 and the reference clock area 300 in order to clarify the division of them. With respect to such a signal, a single-frequency wave having a predetermined period and a predetermined frequency can be used. However, the predetermined frequency is essential to be at least different from the frequency of the single-frequency wave 350 that constitutes the reference clock area 300. It is most desirable that the predetermined frequency is different from any frequency constituting the single-frequency wave 350, the amplitude-shift keying modulation wave 250, the frequency-shift keying modulation wave 260, or the phase-shift keying modulation wave 270.

As mentioned above, the information recording medium 1 according to the first embodiment of the present invention can be in any shape such as disciform, card and tape. Consequently, the microscopic pattern 20 that is composed of approximately parallel grooves can also be in any shape such as spiral, coaxial and line. In case that the information recording medium 1 is in disciform and the microscopic pattern 20 is recorded spirally, the land portion "L" and the groove portion "G" is recorded by a recording method such as the constant angular velocity (CAV), the constant linear velocity (CLV), the zone constant angular velocity (ZCAV) and the zone constant linear velocity (ZCLV) recording methods, wherein the ZCAV and the ZCLV recording methods are a method that forms zones, which vary by radius, and conducts a different controlling system independent of each zone. In case that the information recording medium 1 is recorded by the CLV recording method, for example, a same linear velocity is maintained in the whole area of the information recording medium 1.

Further, in case of recording by the ZCAV recording method, the CLV recording method is conducted in one zone and a controlling system similar to the CAV recording method is conducted in the information recording medium 1 totally.

Furthermore, in case of recording by the ZCLV recording method, the CAV recording method is conducted in one zone and a controlling system similar to the CAV recording method is conducted in the information recording medium 1 totally.

Figure 6:
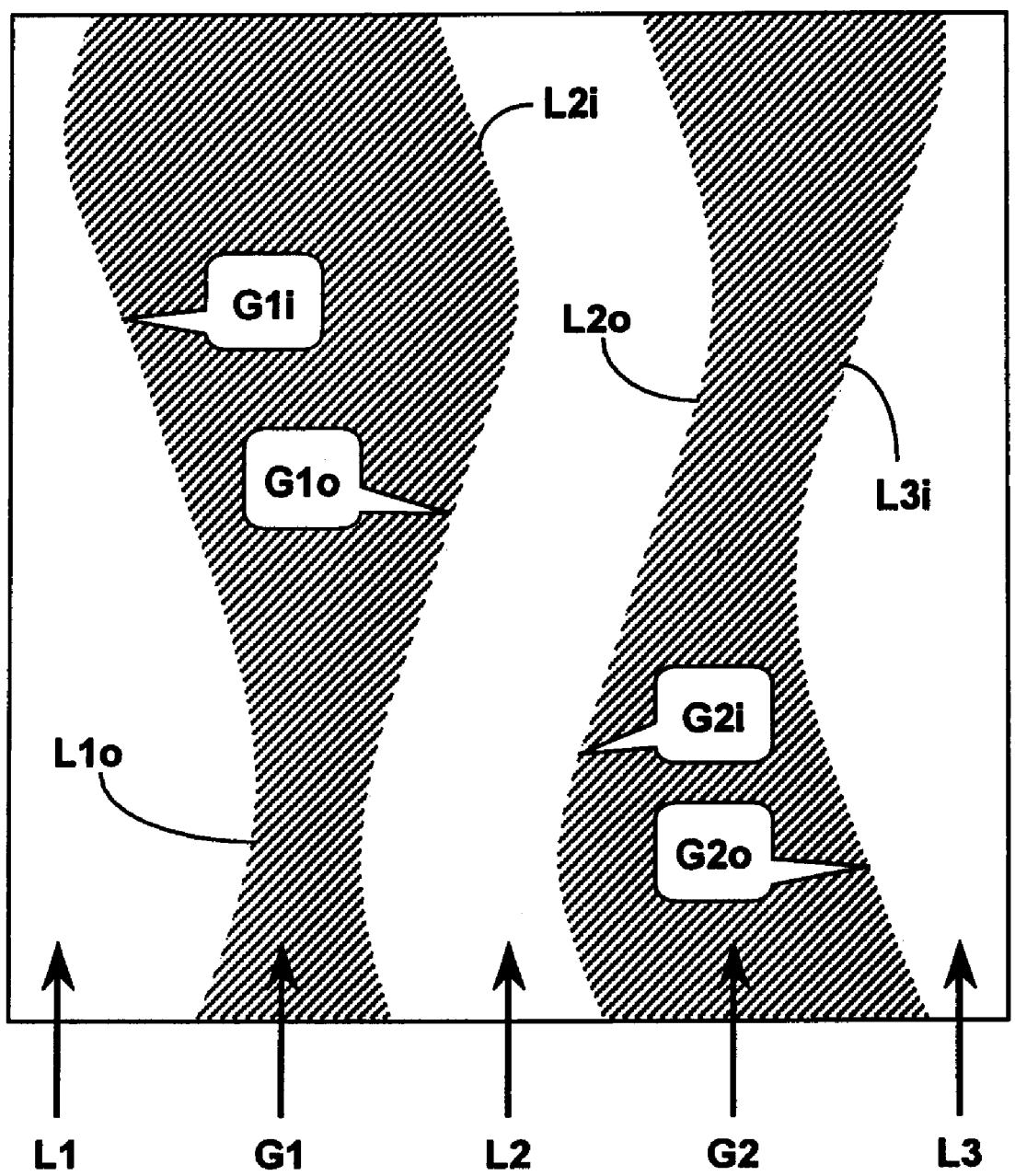
FIG. 6 is an enlarged plan view of the information recording medium according to the first embodiment of the present invention when information is recorded in the information recording medium through the CLV (Constant Linear Velocity) recording method.

FIG. 6 is an enlarged plan view of the. reference clock area 300 in the information recording medium 1 on the basis of recording on a land portion "L" through the CLV recording method. In case that recording is conducted on a portion corresponding to a land portion "L" of the recording layer 12, an auxiliary information or a reference clock is essential to be extracted from the land portion "L". Consequently, a single-frequency wave 350 to be a reference clock must be recorded on the land portion "L". In view of that recording light scan along a centerline not shown of the land portion "L", both sidewalls of the land portion "L" are essential to be parallel to each other. In other words, three land portions "L1" through "L3" (hereinafter generically referred to as land portion "L") and two groove portions "G1" and "G2" (hereinafter generically referred to as groove portion "G") are illustrated in FIG. 6.

Further, in FIG. 6, a sidewall of the inner circumferential side of the land portion "L2" or "L3" is shown as "L2$i$" or "L3$i$" (hereinafter generically referred to as inner sidewall "Li") and another sidewall of the outer circumferential side of the land portion "L1" or "L2" is shown as "L1$o$" or "L2$o$" (hereinafter generically referred to as outer sidewall "Lo").

Further, a side wall of the outer circumferential side of the groove portion "G1" or "G2" is shown as "G1$i$" or "G2$i$" (hereinafter generically referred to as inner sidewall "Gi") and another sidewall of the outer circumferential side of the groove portion "G1" and "G2" is shown as "G1$o$" or "G2$o$" (hereinafter generically referred to as outer sidewall "Go"). The inner sidewall "Li" of the land portion "L" and the outer sidewall "Go" of the groove portion "G" represents the same wall, and the outer sidewall "Lo" of the land portion "L" and the inner sidewall "Gi" of the groove portion "G" represents the same wall hereupon.

Furthermore, a reference clock is recorded on the land portion "L" as a sinusoidal-wave signal through the CLV recording method. Therefore, as shown in FIG. 6, three land portions "L1" through "L3" are not parallel to each other in almost all cases. However, in order to extract a sinusoidal-wave signal accurately with avoiding interference from both sidewalls caused by a phase shift of each sidewall, the inner sidewall "Li" and the outer sidewall "Lo" of the land portion "L" are essential to be always formed in parallel to each other. From a point of view contrary to this, it is represented such that the inner sidewall "Gi" and the outer sidewall "Go" constituting the groove portion "G", which is the other portion than the land portion "L", are never in parallel to each other.

Figure 7:
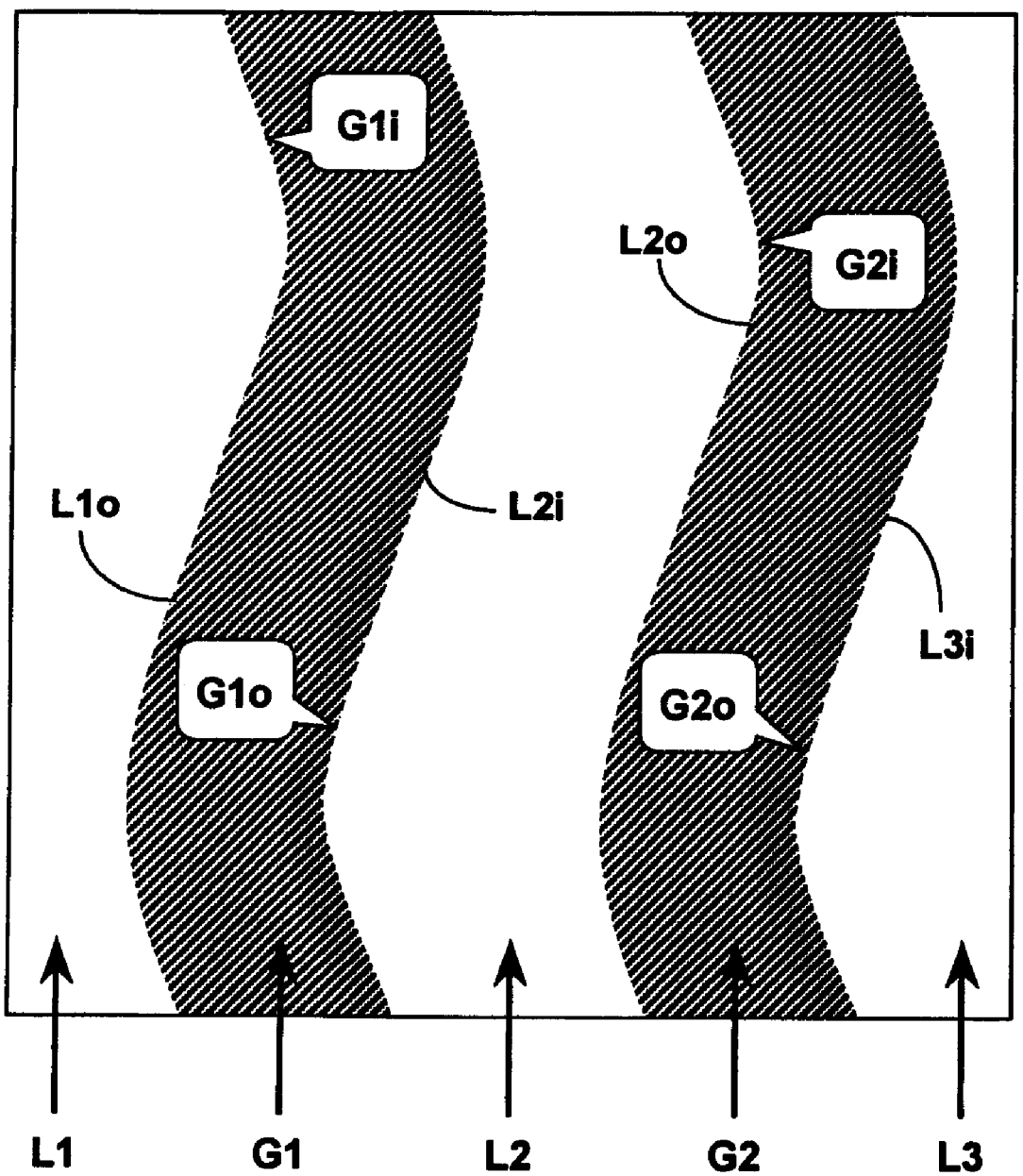
FIG. 7 is an enlarged plan view of the information recording medium according to the first embodiment of the present invention when information is recorded on the information recording medium through the CAV (Constant Angular Velocity) recording method.

FIG. 7 is an enlarged plan view of the reference clock area 300 in the information recording medium 1 on the basis of recording on a land portion "" through the CAV recording method. In case that the information recording medium 1 is recorded by the CAV recording method, a same angular velocity is maintained in a whole area of the information recording medium 1. By this CAV recording method, the wobbling land portion "L" and the groove portion "G" can always be in parallel to each other completely, so that a crosstalk amount between adjoining grooves becomes constant at all times. Consequently, ideal reproduction that can suppress output fluctuation of wobbling frequency and fluctuation in a time axis direction can be conducted. In other words, as shown in FIG. 7, each land portion "L" becomes in parallel to each other and at the same time each groove portion "G" also becomes in parallel to each other due to the characteristic of angular velocity. Three land portions "L1" through "L3" (hereinafter generically referred to as land portion "L") and two groove portions "G1" and "G2" (hereinafter generically referred to as groove portion "G") are illustrated in FIG. 7. In FIG. 7, a sidewall of the inner circumferential side of the land portion "L2" or "L3" is shown as "L2$i$" or "L3$i$" (hereinafter generically referred to as inner sidewall "Li") and another sidewall of the outer circumferential side of the land portion "L1" or "L2" is shown as "L1$o$" or "L2$o$" (hereinafter generically referred to as outer sidewall "Lo").

Further, a side wall of the outer circumferential side of the groove portion "G1" or "G2" is shown as "G1$i$" or "G2$i$" (hereinafter generically referred to as inner sidewall "Gi") and another sidewall of the outer circumferential side of the groove portion "G1" or "G2" is shown as "G1$o$" or "G2$o$" (hereinafter generically referred to as outer sidewall "Go").

The inner sidewall "Ai" of the land portion "L" and the outer sidewall "Go" of the groove portion "G" represents the same wall, and the outer sidewall "Lo" of the land portion "L" and the inner sidewall "Gi" of the groove portion "B" represents the same wall hereupon.

As mentioned above, in case of recording on a land portion "L" of the recording layer 12, for example, a clock is essential to be extracted from the land portion "L". Therefore, the single-frequency wave 350 to be a reference clock is recorded on the land portion "L". The clock is recorded by the CAV recording method, so that the three land portions "L1" through "L3" are completely in parallel to each other as shown in FIG. 7. At the same time, the groove portion "G" that is the rest portion other than the land portion "L" is also in parallel to each other perfectly. In other words, in order to extract a sinusoidal-wave signal accurately, the inner sidewall "Li" and the outer sidewall "Lo" of the land portion "L" are essential to be always formed in parallel to each other. However, in the case of recording by the CAV recording method, the inner sidewall "Gi" and the outer sidewall "Go" of the groove portion "G" is also formed to be in parallel to each other.

In either recording method of the CLV and the CAV, both the sidewalls constituting the land portion "L", that is, the inner sidewall "Li" and the outer sidewall "Lo" of the land portion "L" are essential to be in parallel to each other.

Further, particularly in the case of recording by the CAV recording method, not only the land portion "L" but also both the sidewalls "Gi" and "Go" constituting the groove portion "G" are in parallel to each other. In other words, the inner sidewall "Li" and the outer sidewall "Lo" of the land portion "L" and the inner sidewall "Gi" and the outer sidewall "Go" of the groove portion "G" are all in parallel to each other.

The shape of the sidewall of the reference clock area 300 in the microscopic pattern 20 recorded spirally in the information recording medium 1 in disciform is mentioned above. This situation is exactly the same as for the auxiliary information area 200 due to a similar reason for the reference clock area 300. In other words, in either recording method of the CLV and the CAV, both the sidewalls constituting the land portion "L", that is, both the inner sidewall "Li" and the outer sidewall "Lo" of the land portion "L" are essential to be in parallel to each other.

In the information recording medium 1 according to the present invention, the auxiliary information area 200 and the reference clock area 300 is continuously formed without interruption, so that both sidewalls constituting the land portion "L", that is, the inner sidewall "Li" and the outer sidewall "Lo" of the land portion "L" are formed in parallel to each other in any area on the information recording medium 1.

With referring to FIG. 8, a wobbling amount $\Delta$ of a wobbling groove that is formed in the information recording medium 1 according to the first embodiment of the present invention is explained next.

Figure 8:
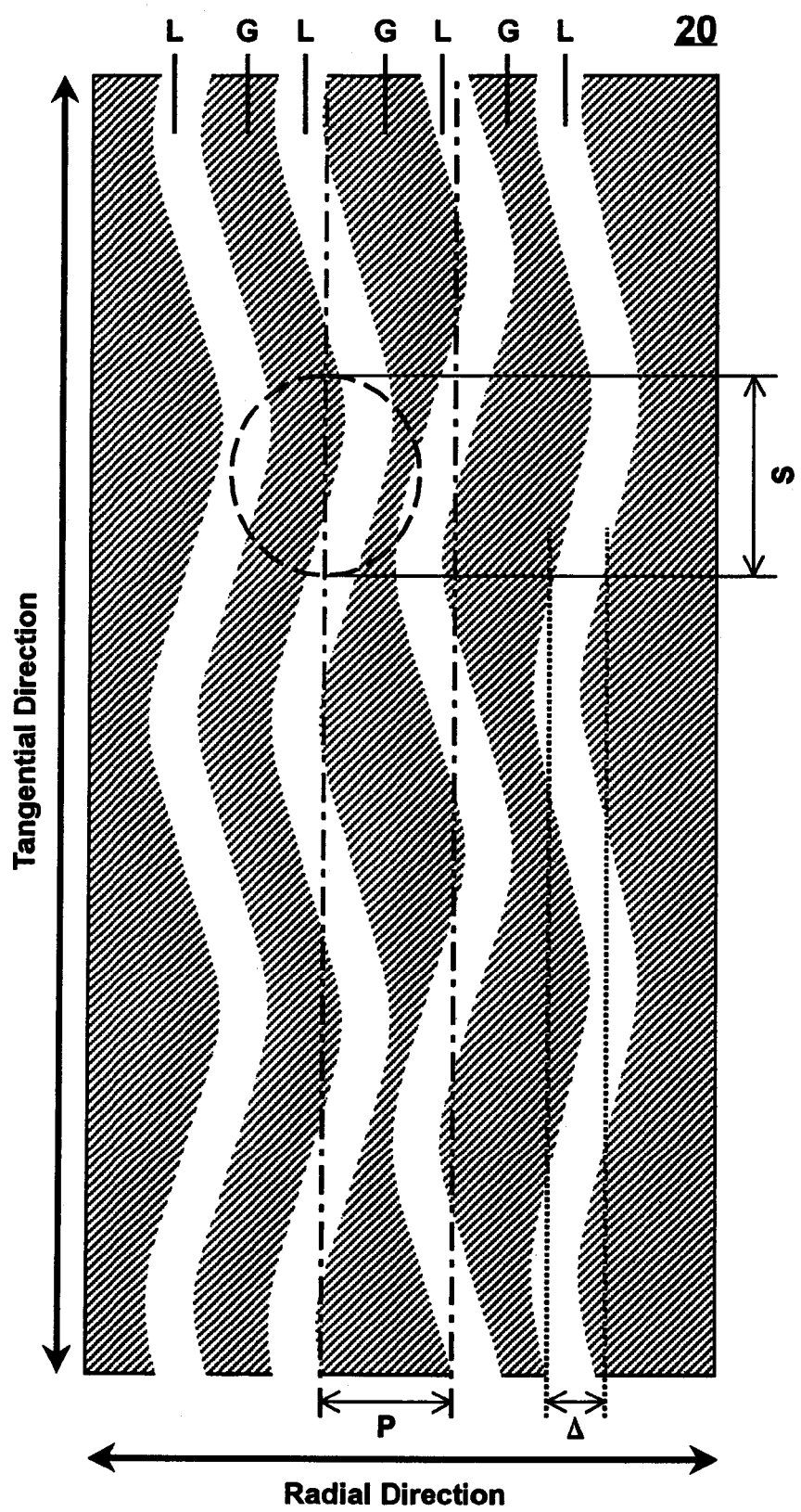
FIG. 8 is an enlarged plan view of the information recording medium in disciform according to the first embodiment of the present invention when information is recorded in the information recording medium through the CLV recording method.

FIG. 8 is an enlarged plan view of the microscopic pattern 20 formed by the CLV recording method in the information recording medium 1 according to the first embodiment of the present invention. The microscopic pattern 20 is composed of the auxiliary information area 200 and the reference clock area 300, which are formed with a fundamental wave based on the sinusoidal wave or the cosine wave and continue without interruption. In FIG. 8, a centerline of wobbling groove is shown by a chain line. A distance between two chain lines, which are adjacent to each other, is defined as a pitch "P".

Further, the information recording medium 1 shown in FIG. 8 is assumed to be recorded on a land portion "L" and a spot of reproducing light beam or a recording light beam that focuses on the land portion "L" is shown by a circle in doted line. The spot diameter is exhibited by "S", that is equal to "$\lambda$/NA", as mentioned above.

Furthermore, the land portion "L" wobbles and its wobbling width $\Delta$ in peak to peak value is shown by two doted lines.

Moreover, in case that the information recording medium 1 is in disciform, a wobbling direction corresponds to a radial direction of the disc-shaped information recording medium A reproducing apparatus of the information recording medium 1 can extract a wobbling amplitude of the auxiliary information area 200 and the reference clock area 300 as a signal through a reproducing light spot without interruption. In other words, by producing a push-pull signal from reflected light of the reproducing light spot, a single-frequency wave 350, a amplitude-shift keying modulation wave 250, a frequency-shift keying modulation wave 260, or a phase-shift keying modulation wave 270, which is based on a sinusoidal wave, can be directly extracted as a signal of similar figure. More accurately, a track direction of wobbling groove is transformed into a time axis direction, and further a radial direction of the wobbling groove is transformed into an amplitude direction of a reproduced signal, and then the single-frequency wave 350, the amplitude-shift keying modulation wave 250, the frequency-shift keying modulation wave 260, or the phase-shift keying modulation wave 270 is reproduced as the signal of similar figure.

According to another aspect of the present invention, the information recording medium 1 of the first embodiment is formed with a wobbling groove of which wobbling width $\Delta$ is within a range of $\Delta<P$. In case that the information recording medium 1 is manufactured as mentioned above, adjacent tracks, that is, adjacent land portions "L", for example, do not contact with each other physically, so that crosstalk caused by recording can be avoided.

Further, the inventors of the present invention make an experiment on a case that a phase change material is used for the recording layer 12 and recording is conducted by difference of reflectivity, phase difference, or both of them. In other words, the inventors try to reproduce an auxiliary information through a push-pull signal detecting method from the information recording medium 1 that is recorded with random data by conducting a phase change recording method. As a result of the experiment, a limit of enabling to detect an auxiliary information is $0.01S \leq \Delta$. In case of a groove of which wobbling width $\Delta$ is formed to be less than 0.01S, random data caused by the phase change recording method are superimposed extremely on an auxiliary information as a noise and an error rate of the auxiliary information drastically increases.

On the contrary, the wobbling width $\Delta$ is set to the limitation of $0.01S \leq \Delta$, an auxiliary information can be reproduced sufficiently even in a low reflectivity condition such as an amorphous state due to the phase change recording method. However, in case of $0.15S<\Delta$, a jitter in time axis direction occurs in an auxiliary information signal and a reference clock signal due to an affection of reproduction crosstalk caused by an adjacent groove, particularly, stability of the reference clock signal is deteriorated.

Accordingly, a relation between the wobbling width $\Delta$ and the pitch P shall be $\Delta<P$, particularly, conditions satisfying relations $\Delta<P$ and $0.01S \leq \Delta \leq 0.15S$ are most suitable for forming a wobbling groove.

Figure 9:
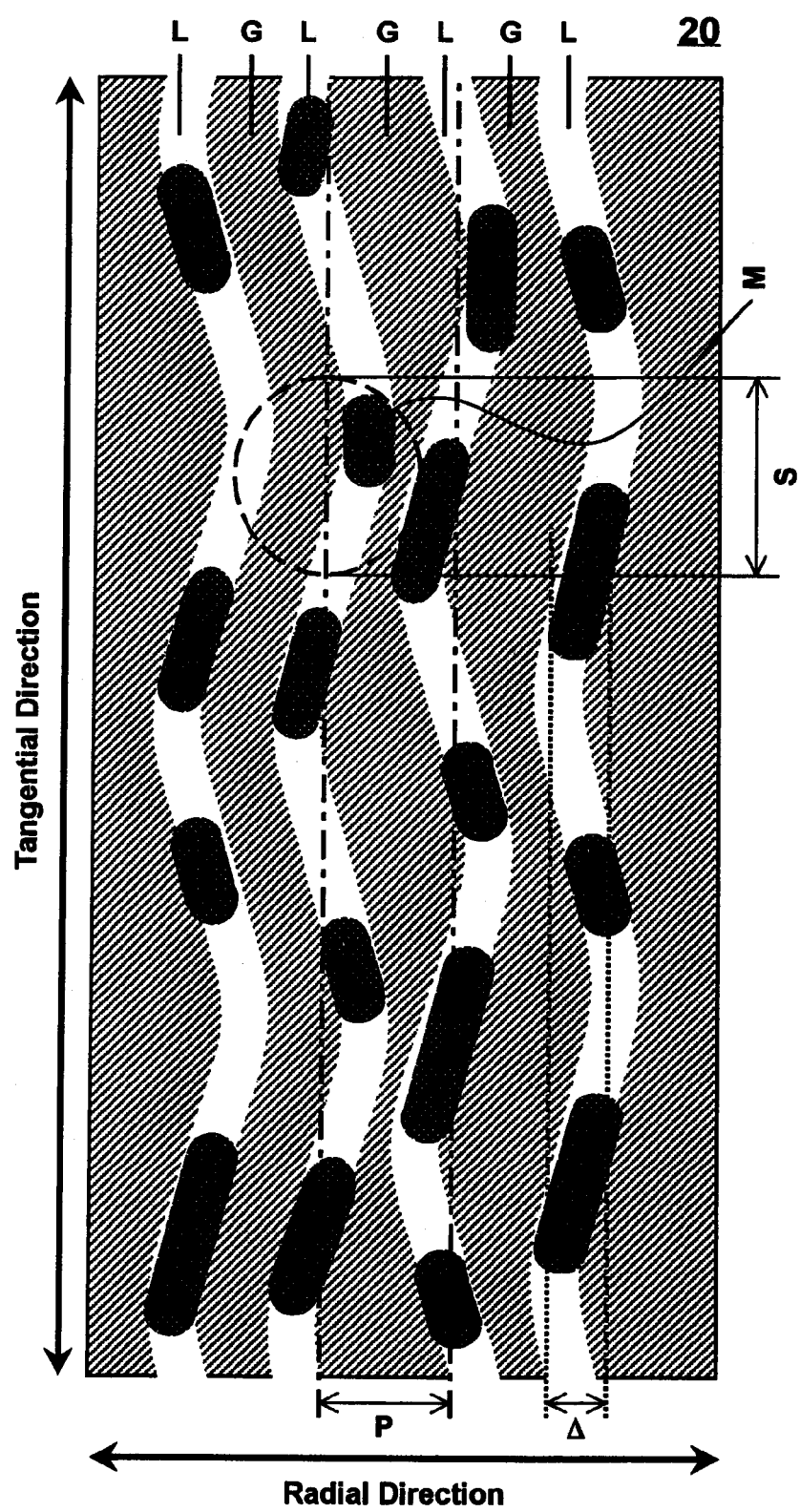
FIG. 9 is an enlarged plan view of the information recording medium in disciform according to the first embodiment of the present invention when information is recorded on the information recording medium through the CLV recording method and further the information is recorded on a land portion.

FIG. 9 is an enlarged plan view of the microscopic pattern 20 of the information recording medium 1, wherein recording is conducted on the recording layer 12 of the information recording medium 1 shown in FIG. 8. In FIG. 9, a record mark M is recorded on the land portions "L" that are wobbled. The record mark M represents whether a modulated signal is ON or OFF. There provided various lengths of record mark M as it will be explained later. As mentioned above, the record mark M is formed on the recording layer 12. In case that the recording layer 12 is formed by a phase change material, a record mark M is recorded by reflectivity and phase difference, difference of reflectivity, or phase difference.

A structure of how a shape of wobbling groove is reflected to a differential signal is complemented hereupon.

Figure 10:
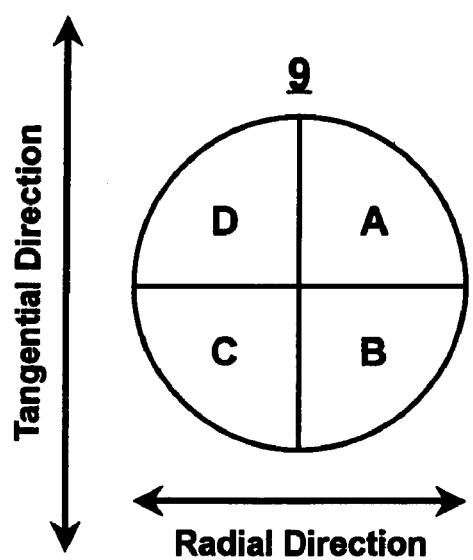
FIG. 10 is an enlarged plan view of a photo-detector mounted on an apparatus for reproducing an information recording medium according to the present invention showing a state of dividing the photo-detector into four.

FIG. 10 is an enlarged plan view of a photo-detector 9 that collects reproducing light, which is irradiated on the information recording medium 1 and reflected. In case that the photo-detector 9 is a 4-division detector, as shown in FIG. 10, the detector 9 is divided into four elements in accordance with the radial direction and the tangential direction of the information recording medium 1. A push-pull signal can be produced by subtracting each sum signal in the tangential direction. More accurately, with defining that the four elements are A, B, C, and D respectively, and further defining that electric currents, which are obtained from each of the elements A, B, C, and D when they receive light, are Ia, Ib, Ic and Id respectively, the push-pull signal can be represented by an equation "(Ia+Ib)−(Ic+Id)". In other words, a signal to be obtained is a differential signal in the radial direction. When a reproducing apparatus of the information recording medium 1 traces a center of groove, that is, the center of the chain line shown in FIGS. 8 and 9, the push-pull signal is in a form of obtaining an output difference in the radial direction with respect to the centerline. Consequently, a wobbling shape can be reproduced as a signal that reflects the wobbling shape.

The total constitution of the information recording medium 1 according to the first embodiment of the present invention is detailed above.

Further, it is acceptable that the auxiliary information area 200 is conducted with not only recording on a sidewall by selecting one modulation wave out of the amplitude-shift keying modulation wave 250, the frequency-shift keying modulation wave 260, and the phase-shift keying modulation wave 270 but also time-division recording on each sidewall in different areas by selecting two or three modulation methods.

A single-frequency wave can be superimposed on the amplitude-shift keying modulation wave 250, the frequency-shift keying modulation wave 260, or the phase-shift keying modulation wave 270. In other words, with respect to the amplitude-shift keying modulation wave 250 and the frequency-shift keying modulation wave 260, a wave having a same frequency as a frequency that constitutes those modulation waves or a different frequency from frequencies of those modulation waves can be superimposed and recorded.

Particularly, with respect to the frequency-shift keying modulation wave 260, a wave having either a higher frequency or a lower frequency of the frequency-shift keying modulation wave 260 can be superimposed on the frequency-shift keying modulation wave 260. Similarly, a wave having a frequency of "an integer multiple" or "one over an integer" of either a higher frequency or a lower frequency of the frequency-shift keying modulation wave 260 can be superimposed on the frequency-shift keying modulation wave 260.

Further, with respect to the phase-shift keying modulation wave 270, a wave having a frequency of "an integer multiple" or "one over an integer" of the frequency constituting the phase-shift keying modulation wave 270 can be superimposed on the phase-shift keying modulation wave 270.

In any case, by using a well-known band pass filter or phase detector, it is possible to separate a single-frequency wave and any of the amplitude-shift keying modulation wave 250, the frequency-shift keying modulation wave 260, and the phase-shift keying modulation wave 270 from the superimposed wave. For example, an experience is conducted with respect to the phase-shift keying modulation wave 270. It is confirmed that a single-frequency wave and a phase-shift keying modulation wave can be separated as far as an amplitude ratio of the phase-shift keying modulation wave to the single-frequency wave is within a predetermined range of 1:5 to 5:1 while superimposing the single-frequency wave on the phase-shift keying modulation wave. In other words, in case that an information recording medium is manufactured as a trial by setting the amplitude ratio for out of the predetermined range, one wave having larger amplitude can be reproduced. However, the other wave having smaller amplitude can not be reproduced due to an excessively low signal to noise ratio (S/N).

In case of such a constitution that a single-frequency wave to be superimposed and the single-frequency wave 350 of the reference clock area 300 is the same frequency, a reference clock can also be extracted form the auxiliary information area 200. Consequently, such a constitution is more suitable for recording by superimposing. That is to say, since a reference clock continues substantially although the auxiliary information area 200 is formed over a long distance, extremely stable recording can be conducted.

It is acceptable that an auxiliary information to be formed on a sidewall of a land portion "L" is highly discomposed and recorded with distributed. By combining with dummy data "101", for example, distributed recording is one recording method such that an auxiliary information is recorded as a data array such as "101X", wherein X is either "0" or "1", and the data array is allocated in each predetermined interval.

FIG. 11 is a first example showing a distributed recording of an auxiliary information. As shown in FIG. 11, the dummy data "101" as a data trigger "Tr" is allocated in the predetermined interval, at every 11 bits herein, and an "X" is allocated in succession to the data trigger "Tr". In other words, by extracting only the "X" allocated immediately after the data trigger "Tr", an auxiliary information can be restored. In this case, with defining that the "1" is data, the auxiliary information shown in FIG. 11 can be restored as a series of data that are composed of existing data (Data), none data (None) and existing data (Data) in sequence, so that "101" can be reproduced as the auxiliary information. This recording method is effective for a format that is allowed to read a data array to be processed with spending a longer period of time. It is defined hereupon that one-bit data to be extracted at each predetermined interval is a "word" and an auxiliary information is constituted by integrating a plurality of "words".

Further, a variation of the recording method shown in FIG. 11 is exhibited in FIG. 12.

FIG. 12 is a second example showing a distributed recording of an auxiliary information. As shown in FIG. 12, a data trigger "Tr" and data "X" can be allocated with separating them in a predetermined bit of interval. In FIG. 12, the data trigger "Tr" is "11" and allocated at every 11 bits. Data are recorded by "101" whether the "101" is existed or not in a predetermined interval. In other words, by extracting data existing in the fourth bit to the sixth bit, one-bit data can be restored. In this second example, data can be restored as a series of data composed of existing data (Data), none data (None) and existing data (Data) in sequence, so that "101" is reproduced as the auxiliary information. This recording method is effective for reducing erratic readout because the data "X" is separated from the data trigger "Tr".

Furthermore, with respect to a third example of the highly distributed recording method, a first specific data pattern such as "11" is allocated or recorded at every predetermined interval. Then, a second specific data pattern such as "101" is allocated between the first specific patterns. A position at where the second specific pattern is allocated is advanced by a predetermined bit, distance or period with respect to the first specific data pattern. Particularly, two positions are allocated previously.

Figure 13:
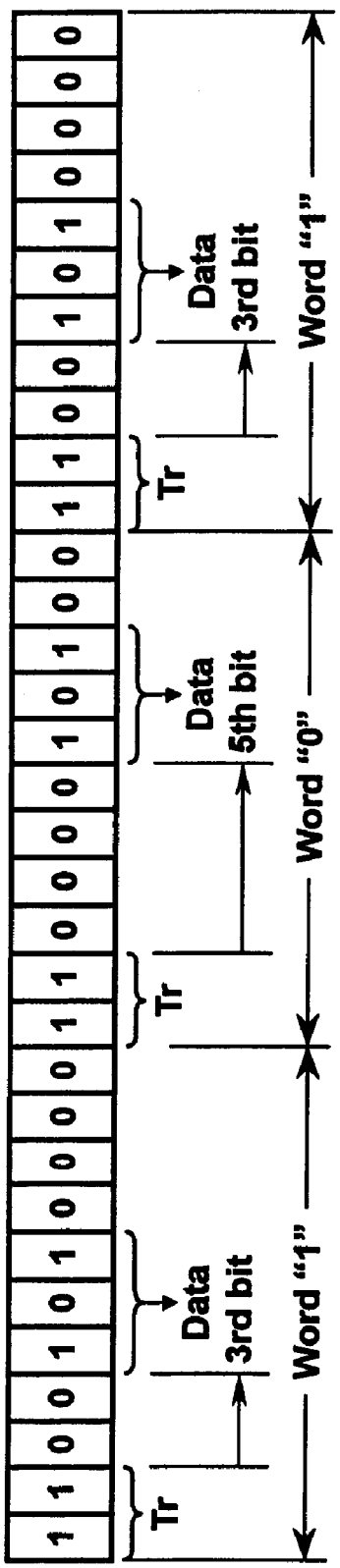
FIG. 13 is a third example showing a distributed recording of auxiliary information.

FIG. 13 is a third example of the highly distributed recording method showing a distributed recording of an auxiliary information. As shown in FIG. 13, a data trigger "Tr" or "11", is allocated at every predetermined interval, actually every 11 bits hereupon, as the first specific data pattern, and a second specific data pattern "101" is allocated between the data triggers "Tr" or "11". A position at where the second specific data pattern is allocated is provided with two positions; one is within a range of the third bit to the fifth bit from the data trigger "Tr" or "11" and the other is within a range of the fifth bit to the seventh bit. Decoding is conducted by judging that the second specific data pattern is allocated in either position. In the case of FIG. 13, the second specific data pattern "101" is sequentially allocated in the positions starting with the third bit, fifth bit and third bit respectively, so that data or words "101" can be reproduced as an auxiliary information. This recording method is effective for ensuring higher reliability to an auxiliary information because the recording method can add a parameter whether or not the data "101" can be read out to one of standards for judging reliability.

In other words, data to be recorded in an auxiliary information area are at least composed of a data trigger that is allocated at every predetermined interval and data allocated at a predetermined position between the data triggers. The information recording medium 1 according to the present invention is recorded with an auxiliary information by a relative distance between the data trigger and the data or the second specific data pattern.

In the description of the third example of the highly distributed recording method mentioned above, the method of distributed recording that is conducted by using a position difference between the first specific data pattern and the second specific data pattern is explained. However, in case that a pattern, which is extremely high in readout accuracy, can be provided, it is acceptable for both the first specific data pattern and the second specific data pattern that their patterns are the same pattern. In other words, decoding can be conducted by extracting a specific pattern having a shorter time interval from a specific pattern recorded at a predetermined time interval and by measuring a distance interval or the time interval between the specific data pattern and the specific pattern. With referring to FIG. 14, further details are explained next.

Figure 14:
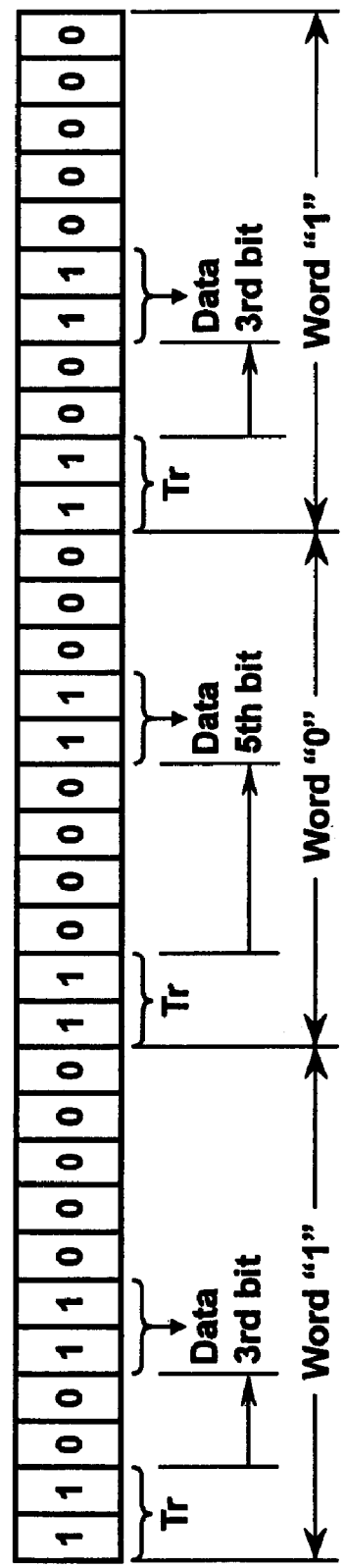
FIG. 14 is a fourth example showing a distributed recording of auxiliary information.

FIG. 14 is a fourth example showing a distributed recording of an auxiliary information. As shown in FIG. 14, a data trigger "Tr" or "11" is allocated at a predetermined interval, at every 11 bits hereupon, as a first specific data pattern, and a second specific data pattern "11" having the same pattern as the data trigger "Tr" is allocated between the data triggers "Tr". A position at where the second specific data pattern is allocated is provided with two positions; one is within a range of the third bit to the fifth bit from the data trigger "Tr" or "11" and the other is within a range of the fifth bit to the seventh bit. Decoding is conducted by judging that the second specific data pattern is allocated in either position. In the case of FIG. 14, the second specific data pattern "11" is sequentially allocated in the positions starting with the third bit, fifth bit and third bit respectively, so that data or words "101" can be reproduced as an auxiliary information. This recording method is advantageous to a reproducing circuit to be simplified because the recording method requires only one specific data pattern.

The highly distributed recording method is explained above in four types. According to these highly distributed recording methods, an auxiliary information is recorded as data that are decomposed into every one bit. Actually, some bits of dummy data are prepared for a data trigger "Tr" first, and a data array composed of continuing single data such as continuing zeros, for example, is prepared next. The data trigger "Tr" is connected with the single data array so as to be allocated at every predetermined interval for the data trigger "Tr". Then, the auxiliary information that is decomposed into every one bit is recorded so as to convert a part of the single data array by a predetermined rule. In other words, an auxiliary information is recorded by converting data allocated in a bit, which is advanced by a predetermined distance from the data trigger "Tr", by the predetermined rule.

On the other hand, when reproducing the auxiliary information, all data are once read out from a sidewall of land portion "L" as a data array and a data trigger "Tr" that is allocated at every predetermined interval is detected from the data array. Then, one bit of data that is equivalent to a "Word" shown in FIGS. 11 to 14 is extracted from the data array excluding the data trigger "Tr" with referring to the predetermined rule. The auxiliary information is restored by integrating the detected one-bit data.

The methods for recording in highly distributed and for reproducing an information recording medium according to the present invention are explained above. In case of an auxiliary information, particularly, an address information, a plurality of zeros or ones may continue, so that there is existed a possibility of generating a DC component in a data array being read out. In order to eliminate such a possibility, it is acceptable that the data array is previously modulated by the base-band modulation method and recorded. In other words, there existed a method such that a data array to be recorded on a sidewall of land portion "L" by wobbling modulation is previously replaced with another codes so as to reduce a sequence of zeros and ones to a certain number or less. With respect to such a method, the method such as Manchester code, PE (phase encoding) modulation, MFM (modified frequency modulation), M2 (Miller squared) modulation, NRZI (non return to zero inverted) modulation, NRZ (non return to zero) modulation, RZ (return to zero) modulation and differential modulation can be used independently or by combining some of them together.

FIG. 15 is a table exhibiting data change before and after modulating a base-band.

With respect to a base-band modulation method, which is most suitable for the information recording medium 1 of the present invention, there is provided the Manchester code (biphase modulation) method. The Manchester code method is a method of applying two bits to each one bit of an original data to be recorded as shown in FIG. 15. That is, "00" or "11" is assigned to a data "0" to be recorded, and "01" or "10" to a data "1".

Further, an inverted code of inverting a last code of preceding data is essentially applied to a head code of succeeding data when arranging the succeeding data after the preceding data.

FIG. 16 is a table exhibiting an example of actual data change before and after modulating a base-band. As shown in FIG. 16, an original data "100001" is assigned to be a code array of "010011001101". The original data contains a sequence of four "0"s and is an asymmetrical data in which an appearing probability of "0" is twice that of "1". If such an asymmetrical data is modulated by the Manchester code method, a sequence of "0" or "1" is only two maximally and the original data is converted into a symmetrical data having equal appearing probability of "0" and "1". As mentioned above, the base-band modulation, which restricts a sequence of same bits within a certain quantity, is effective to increase stability of reading out data, Consequently, the base-band modulation method is suitable for pre-treatment for a long array of auxiliary information.

An amplitude-shift keying modulation wave 250 (250, 251 and 252), a frequency-shift keying modulation wave 260 (260, 261 and 262) and a phase-shift keying modulation wave 270 (270, 271 and 272), which are used for the information recording medium 1 according to the embodiment one of the present invention as a wobbling groove modulation wave, are explained next.

Figure 17:
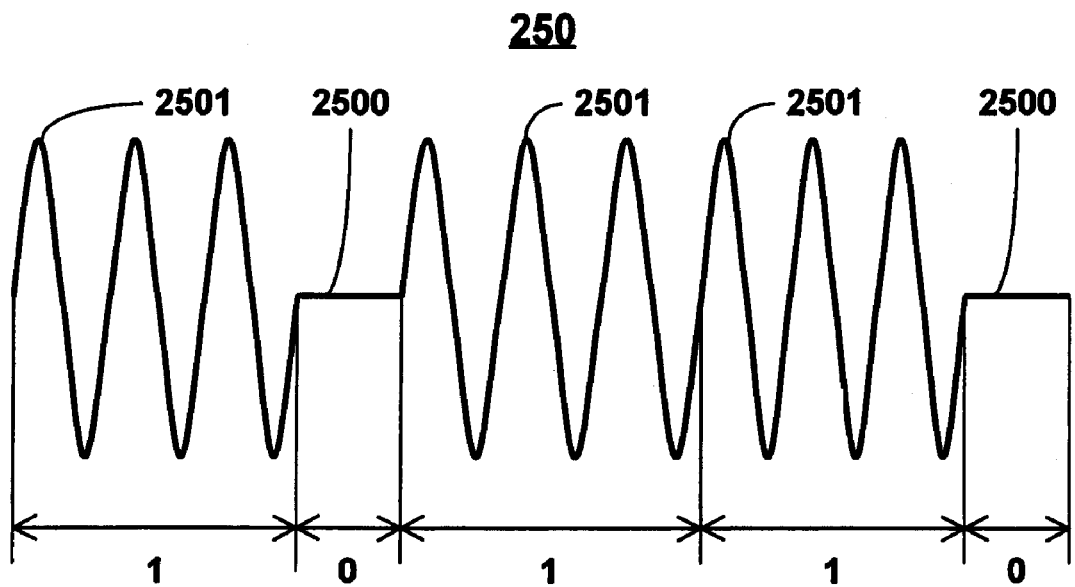
FIG. 17 shows a first example of an amplitude-shift keying modulation waveform according to the present invention.
Figure 18:
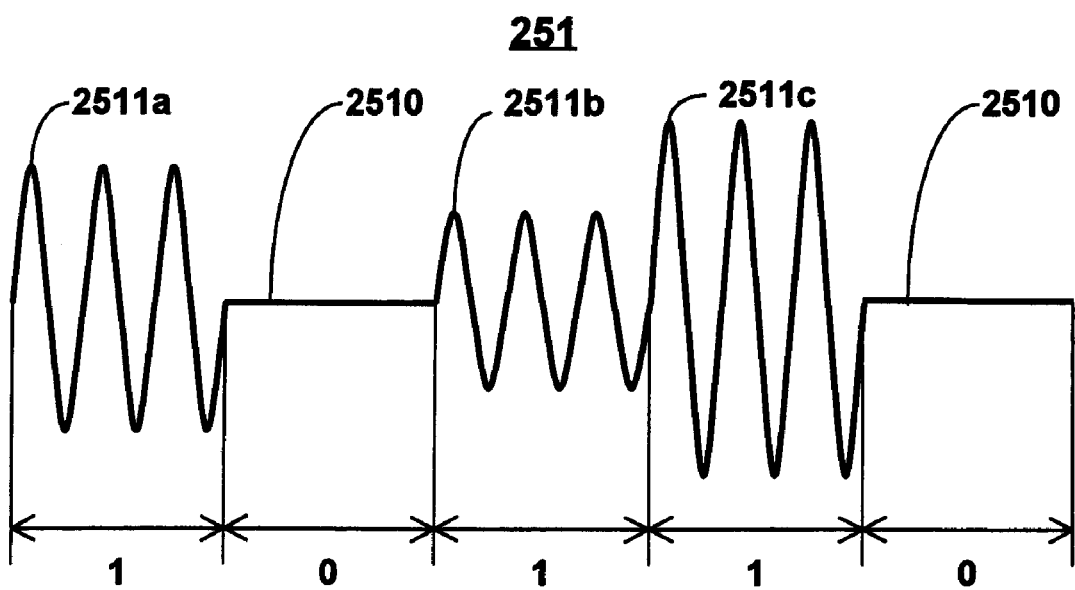
FIG. 18 shows a second example of an amplitude-shift keying modulation waveform according to the present invention.
Figure 19:
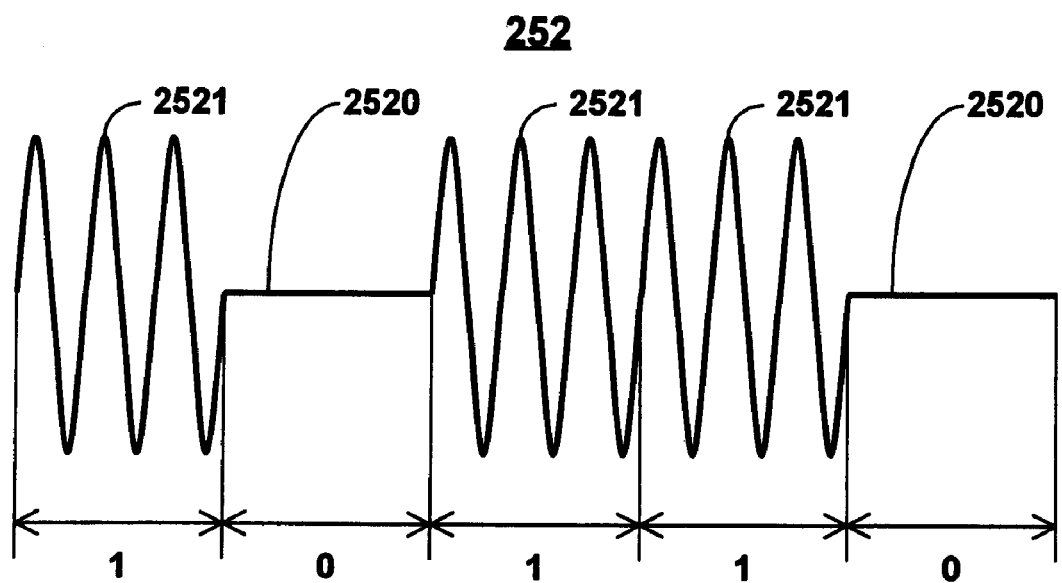
FIG. 19 shows a third example of an amplitude-shift keying modulation waveform according to the present invention.

With referring to FIGS. 17 through 19, the amplitude-shift keying modulation waves 250, 251 and 252 are depicted.

FIG. 17 shows a first example of an amplitude-shift keying modulation waveform according to the present invention. FIG. 18 shows a second example of an amplitude-shift keying modulation waveform according to the present invention. FIG. 19 shows a third example of an amplitude-shift keying modulation waveform according to the present invention.

As shown in FIG. 17, the amplitude-shift keying modulation wave 250 according to the present invention is geometrically recorded by modulating data through the amplitude-shift keying modulation method and actually, constituted by an amplitude section 2501 and a non-amplitude section 2500, wherein the amplitude section 2501 is formed by wobbling a groove in a predetermined period. In other words, the amplitude section 2501 is a wobbling part of groove and the non-amplitude section 2500 is a non-wobbling part of groove.

Further, the amplitude section 2501 and the non-amplitude section 2500 is corresponding to "1" and "0" of a data bit respectively. The amplitude section 2501 is composed of a plurality of waves that continue more than one cycle hereupon. A number of waves is not limited to a specific cycle. However, if it is too many, length of the non-amplitude section 2500 consequently becomes longer and resulting in that a fundamental wave, which produces a gate when reproducing, is hardly detected. Therefore, two to one hundred cycles, preferably three to thirty cycles are suitable for the number of waves of the amplitude section 2501. As mentioned above, digital data (in case of FIG. 17, it is "10110") is recorded by whether or not amplitude is existed. The push-pull signal detecting method mentioned above can be used for reading out the recorded data.

Furthermore, it should be understood that the amplitude-shift keying modulation wave 250 according to the present invention does not limit each length or each amplitude size of the amplitude section 2501 and the non-amplitude section 2500 to specific figure. In the case of the amplitude-shift keying modulation wave 250 shown in FIG. 17, the length of the amplitude section 2501 is set to be longer than that of the non-amplitude section 2500.

In FIG. 18, an amplitude-shift keying modulation wave 251 is constituted by amplitude sections 2511a through 2511c and non-amplitude sections 2511. Each amplitude of the amplitude sections 2511a through 2511c is unequal to each other. However, unequal amplitude is acceptable for the amplitude-shift keying modulation method.

Further, it is also acceptable that assigning each amplitude in multiple levels intentionally realizes recording in multi-values more than three values.

Furthermore, in case of an amplitude-shift keying modulation wave 252 shown in FIG. 19, each amplitude of amplitude sections 2521 is equal to each other and each length of the amplitude sections 2521 is equal to that of non-amplitude sections 2520. This configuration is also acceptable for the amplitude-shift keying modulation method. Particularly, in case that data are recorded in digital by the binary value of "0" and "1", an isotropic layout as shown in FIG. 19 is desirable for the digital recording by the binary value. In other words, if each height of the amplitude sections 2521 is made equal to each other and each length of the amplitude sections 2521 is made equal to that of the non-amplitude sections 2520, judging "0" or "1" when reproducing can be realized by sufficient threshold value of amplitude.

Moreover, data arranged in series can be read out by one threshold value of time, so that a reproducing circuit can be simplified.

In addition thereto, even in case that jitter exists in reproduced data, there is existed a merit that influence of the jitter can be minimized.

Further, with assuming that a code to be recorded is ideally symmetrical, total length of the amplitude sections 2521 is made equal to that of the non-amplitude sections 2520 and resulted in that no DC component is existed in a reproduced signal. It is advantageous to digital recording that no DC component releases a burden on data decoding and servo.

As mentioned above, by using any of the amplitude-shift keying modulation waves 250, 251 and 252, an auxiliary information is recorded in an information recording medium 1 according to the first embodiment of the present invention. Either "0" or "1" is recorded in response to whether a wobble is existed on a sidewall of groove or not, so that ability of judging "0" or "1" is excellent. In other words, a low error rate can be obtained although an auxiliary information is in relatively low C/N (carrier to noise ratio).

Further, although recording on the recording layer 12 is conducted by a user, influence of random noise caused by the recording can be reduced and a low error rate can be maintained.

With referring to FIGS. 20 through 22, frequency-shift keying modulation waves 260 through 262 are explained next.

Figure 20:
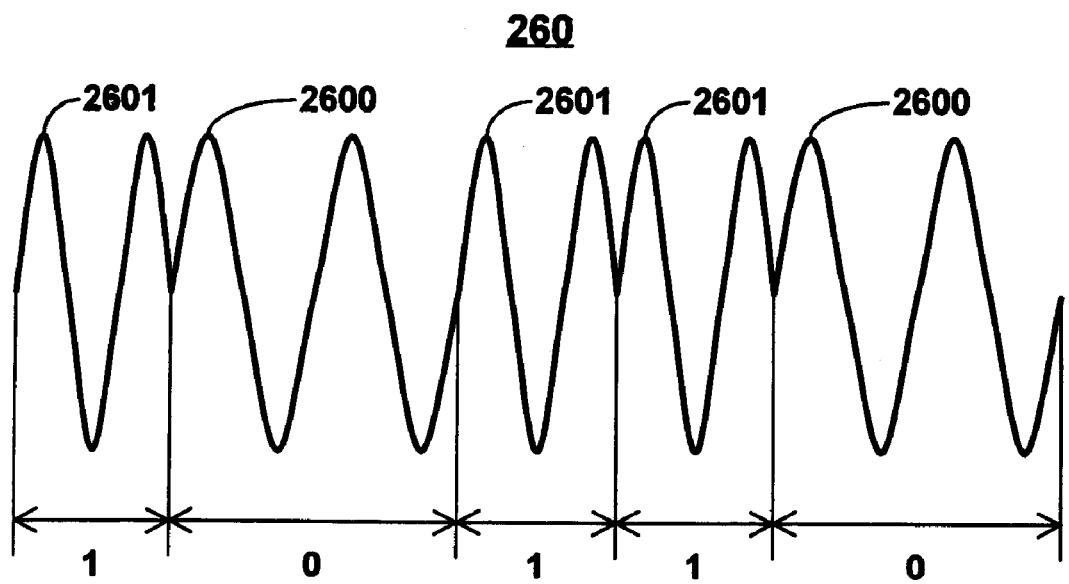
FIG. 20 shows a first example of a frequency-shift keying modulation waveform according to the present invention.

FIG. 20 shows a first example of a frequency-shift keying modulation waveform according to the present invention. FIG. 21 shows a second example of a frequency-shift keying modulation waveform according to the present invention. FIG. 22 shows a third example of a frequency-shift keying modulation waveform according to the present invention.

A frequency-shift keying modulation wave is for recording data geometrically by the frequency-shift keying modulation method and is composed of a plurality of sections that are formed by wobbling grooves by different frequencies.

Actually, in the case of binary data, the frequency-shift keying modulation wave is geometrically recorded by using a higher frequency section and a lower frequency section. In case of multi-valued data such as "n" values, a frequency-shift keying modulation wave is geometrically recorded by the frequency-shift keying modulation method that uses "n" kinds of frequency sections. Hereinafter the examples are explained with assuming that data to be recorded are in binary. FIG. 20 is one example of recording data "10110" geometrically. In FIG. 20, the frequency-shift keying modulation wave 260 is composed of three higher frequency sections 2601 and two lower frequency sections 2600. The higher frequency section 2601 and the lower frequency section 2600 are equivalent to "1" and "0" of a data bit respectively and they are recorded in digital by changing the frequency at each one channel bit. A number of waves that constitute each frequency section is not limited to one specific number. Each frequency section is composed of a wave that continues more than one cycle. However, in consideration of that data are not redundant too much in a reproducing apparatus so as to detect a frequency accurately and to obtain a certain degree of data transfer rate, each frequency section, which is corresponding to each data bit mentioned above, is desirable to be constituted by a number of waves within a range of one cycle to one hundred cycles, preferably one cycle to thirty cycles.

Further, it is acceptable that each amplitude of the higher frequency section 2601 and the lower frequency section 2600 is equal to each other. However, an amplitude ratio is not limited to one specific figure. Amplitude of the higher frequency section 2601 can be formed larger than that of the lower frequency section 2600 in consideration of a frequency response of reproducing apparatus.

Furthermore, the push-pull signal detecting method mentioned above can be used for reading out the recorded data.

It should be understood that the information recording medium 1 according to the first embodiment of the present invention does not place a restraint on physical length or amplitude size of a channel bit, which is composed of the higher frequency section 2601 and the lower frequency section 2600. For example, in FIG. 20, the physical length of lower frequency section 2600 is designated to be longer than that of the higher frequency section 2601.

Figure 21:
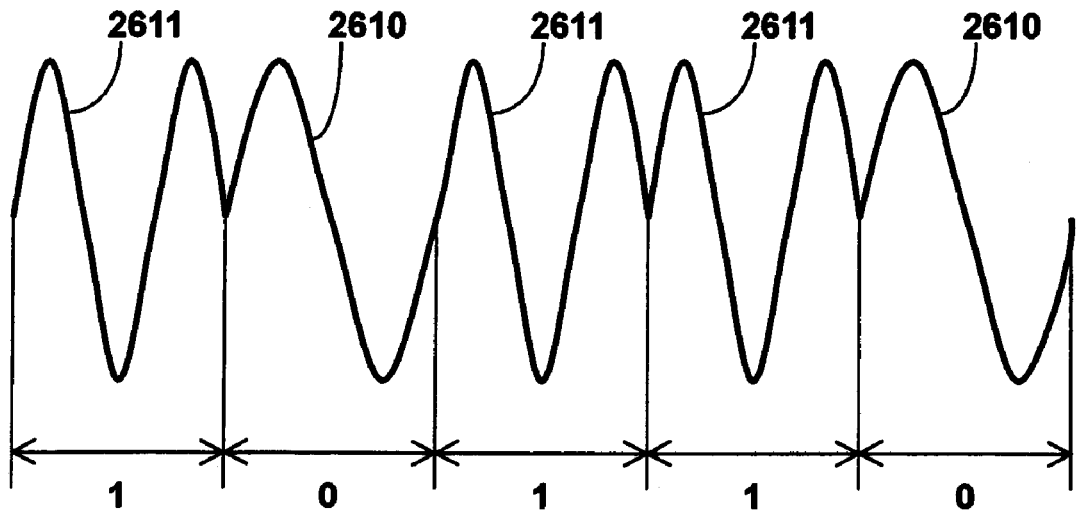
FIG. 21 shows a second example of a frequency-shift keying modulation waveform according to the present invention.

As shown in FIG. 21, in case of a frequency-shift keying modulation wave 261, it is acceptable that amplitude of a higher frequency section 2611 and a lower frequency section 2610 are equal to each other and length of the higher frequency section 2611 is equal to that of the lower frequency section 2610. By equalizing each amplitude and length as mentioned above, judging "0" or "1" can be conducted by sufficient threshold value of amplitude when reproducing.

Further, data arranged in series can be read out by one threshold value of time, so that a reproducing circuit can be simplified.

Furthermore, in case that jitter exists in reproduced data, there is existed a merit that influence of the jitter can be minimized.

Moreover, with assuming that a code to be recorded is ideally symmetrical, total length of the higher frequency sections 2611 is equal to that of the lower frequency sections 2610 and resulted in that no DC component is existed in a reproduced signal. It is advantageous to digital recording that no DC component releases a burden on data decoding and servo.

In FIGS. 20 and 21, the higher frequency section 2601 or 2611 and the lower frequency section 2600 or 2610 is connected to each other respectively, wherein each waveform rises at a point where a channel bit changes. However, phase jump happens in probability of 50% at the moment when a channel bit changes. Consequently, a high frequency component is generated and resulted in deterioration of power efficiency per each frequency.

In order to eliminate such phase jump, a frequency-shift keying modulation wave 262 is provided. In FIG. 22, the frequency-shift keying modulation wave 262 is composed of a higher frequency section 2621r or 2621f (hereinafter referred generically to as higher frequency section 2621) and a lower frequency section 2620. The higher frequency section 2621 and the lower frequency section 2620 is arranged so as to maintain phase continuity at a point where each channel bit of the frequency-shift keying modulation wave 262 changes over. Actually, a starting phase of the lower frequency section 2620 is selected so as to be that a phase direction of the end of the higher frequency section 2621 and a phase direction of the start of the lower frequency section 2620 are the same direction.

Further, the reverse connection is the same as such that a starting phase of the higher frequency section 2621 is selected so as to be that a phase direction of the end of the lower frequency section 2620 and a phase direction of the start of the higher frequency section 2621 are the same direction. If the starting phase is selected as mentioned above, continuity of phase is maintained and power efficiency is improved.

Furthermore, a reproduction envelope becomes constant, so that a data error rate of auxiliary information, which is recorded in the information recording medium 1, is improved. Such a method of maintaining continuity of phase at a point where a channel bit changes can be applied to the auxiliary information area 200 and the reference clock area 300 shown in FIG. 5. A data error rate of auxiliary information is further improved if waveforms of the auxiliary information area 200 and the reference clock area 300 are arranged as mentioned above.

A frequency of the higher frequency section 2621 (2601, 2611 or 2621) and the lower frequency section 2620 (2600, 2610 or 2620) is arbitrary selected. However, in order to eliminate interference with a frequency range that is provided for recording data on the information recording medium 1 by a user, it is strictly required for the higher frequency section 2621 not to be extremely high frequency in comparison with a frequency of the lower frequency section 2620.

On the other hand, in order to improve a reproduction error rate of address data, a frequency difference between the higher frequency section 2621 and the lower frequency section 2620 shall be kept in certain degree so as to maintain excellent separativeness. From these viewpoints, a frequency ratio of the higher frequency section 2621 to the lower frequency section 2620 is desirable to be within a range of 1.05 to 5.0, particularly, desirable to be within a range of 1.09 to 1.67. In other words, phase relation between two frequencies is desirable to be within a range of $2\pi\pm(\pi/20.5)$ to $2\pi\pm(\pi/0.75)$, particularly, desirable to be within a range of $2\pi\pm(\pi/12)$ to $2\pi\pm(\pi/2)$, that is, 360±15 degrees to 360±90 degrees, wherein the reference phase is defined as $2\pi$.

Figure 22:
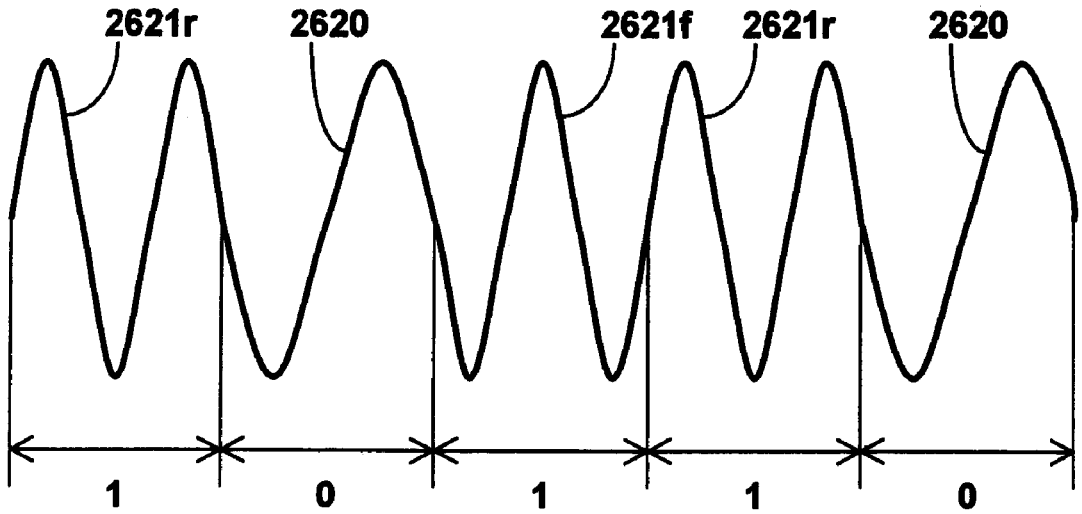
FIG. 22 shows a third example of a frequency-shift keying modulation waveform according to the present invention.

With respect to a frequency ratio (ratio of higher frequency to lower frequency), if the frequency ratio shown in FIG. 22 is assigned to be 1.5, there exists a phase relation between these higher and lower frequencies such that the higher frequency is shifted by $-\pi/2.5$ from a reference phase of a single-frequency wave and the lower frequency is shifted by +π/2.5 from the reference phase of the single-frequency wave, wherein the phase relation becomes 2π± (π/2.5) when the reference phase is defined as 2π. In other words, the phase relation is shifted to 360±72 degrees. It is expressed that these two frequencies are integral multiple (wherein it is three times and two times respectively) of the frequency (in this case 0.5) of the single-frequency wave. Consequently, it is advantageous for a demodulation circuit to be simplified.

Further, generating a clock signal becomes easier by using a circuit having a window of 0.5.

Furthermore, a synchronous detector circuit can conduct demodulation. In this case, an error rate can be reduced extremely.

As mentioned above, an auxiliary information is recorded in the information recording medium 1 of the present invention by the frequency-shift keying modulation waves 260, 261 and 262. The binary data "0" or "1" is recorded in accordance with change of a wobbling frequency, so that ability of judging "0" or "1" is excellent. In other words, an auxiliary information can be obtained in a low error rate although a C/N is relatively low.

More, influence of random noise caused by recording on the recording layer 12 by a user can be reduced and a low error rate can be maintained.

With referring to FIGS. 23 through 25, phase-shift keying modulation waves 270, 271 and 272 are explained next.

Figure 23:
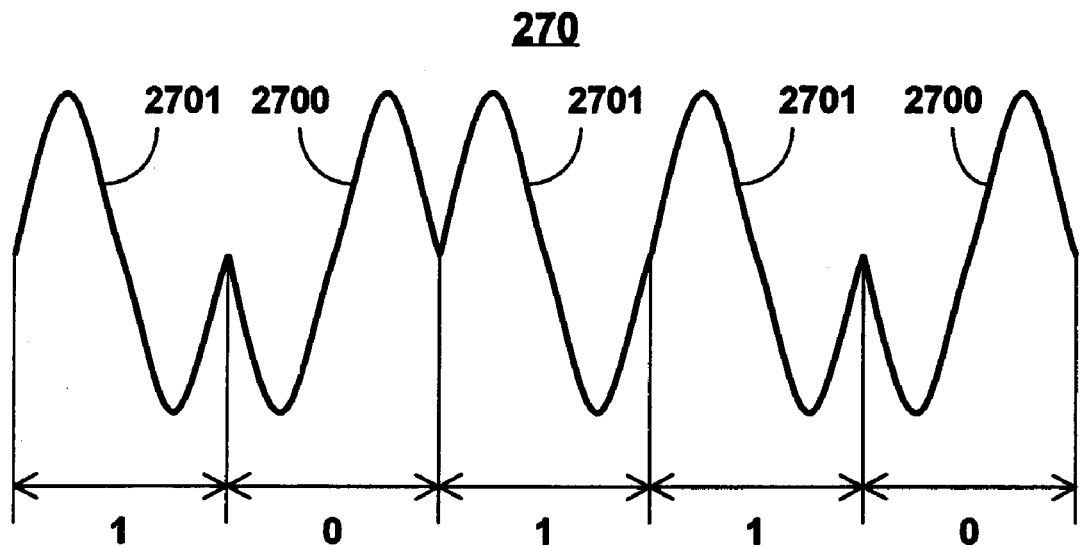
FIG. 23 shows a first example of a phase-shift keying modulation waveform according to the present invention.

FIG. 23 shows a first example of a phase-shift keying modulation waveform according to the present invention. FIG. 24 shows a second example of a phase-shift keying modulation waveform according to the present invention. FIG. 25 shows a third example of a phase-shift keying modulation waveform according to the present invention.

As shown in FIG. 23, the phase-shift keying modulation wave 270 is formed by recording data geometrically by the phase-shift keying modulation method. Actually, the phase-shift keying modulation wave 270 is composed of a plurality of sections, which are constituted by wobbling a groove by a predetermined frequency. In the case of binary data, the phase-shift keying modulation wave 270 is composed of an advancing phase section 2701 and a receding phase section 2700. In case of multi-valued data such as "n" values, a phase-shift keying modulation wave is composed of "n" phase sections, which correspond to "n" kinds of phases respectively. Hereinafter the examples are explained with assuming that data to be recorded are in binary. FIG. 23 is one example of recording data "10110" geometrically. In FIG. 23, the phase-shift keying modulation wave 270 is composed of three advancing phase sections 2701 and two receding phase sections 2700. The advancing phase section 2701 and the receding phase section 2700 are equivalent to "1" and "0" of a data bit respectively, and recorded in digital by changing the phase at each one channel bit. Actually, the advancing phase section 2701 and the receding phase section 2700 are exhibited by a sinusoidal wave of "sin 0" and another sinusoidal wave of "sin(−π)" respectively. As shown in FIG. 23, the advancing phase section 2701 and the receding phase section 2700 are constituted by one cycle of waveform respectively. However, phase difference between them is as many as π, so that they can be separated and reproduced sufficiently by the envelope detection method or the synchronous detection method.

Each frequency of the advancing phase section 2701 and the receding phase section 2700 is identical to each other. A number of waves, which constitutes the advancing phase section 2701 and the receding phase section 2700, is not restricted to a specific number. Both phase sections are composed of a wave that continues more than one cycle.

However, in consideration of that data are not redundant too much in a reproducing apparatus so as to detect a frequency accurately and to obtain a certain degree of data transfer rate, each phase section corresponding to each data bit that is mentioned above is desirable to be constituted by a number of waves within a range of one cycle to one hundred cycles, preferably one cycle to thirty cycles.

It is acceptable for each physical length of the advancing phase section 2701 and the receding phase section 2700 to be identical or not. In case that each physical length is identical, data, which are combined in series, can be divided into piece by a predetermined time, that is, a predetermined clock when reproducing. Consequently, a reproduction circuit can be simplified.

Further, in case that jitter exists in reproduced data, there is existed a merit that enables to minimize influence of the jitter.

It is also acceptable for each amplitude of the advancing phase section 2701 and the receding phase section 2700 to be coincide with each other or not. However, in consideration of easier reproduction, it is desirable for the advancing phase section 2701 and the receding phase section 2700 that each amplitude of them coincides with each other.

The information recording medium 1 according to the first embodiment of the present invention can deal with not only binary data but also multi-valued data. Dealing with how many kinds of phases depends on that phase difference of each data bit can be separated into what degree of resolution. The limit of separation of the information recording medium 1 is obtained experimentally by the inventors of the present invention and it is confirmed that phase difference can be separated into up to π/8. In other words, various phase sections, which constitute the multi-valued channel bit, can deal with minimum phase difference of each phase section within a range of π/8 to π, wherein π is equivalent to minimum phase difference of a binary data. That is to say, a wide range of data from binary to hexadecimal can be dealt with.

Figure 24:
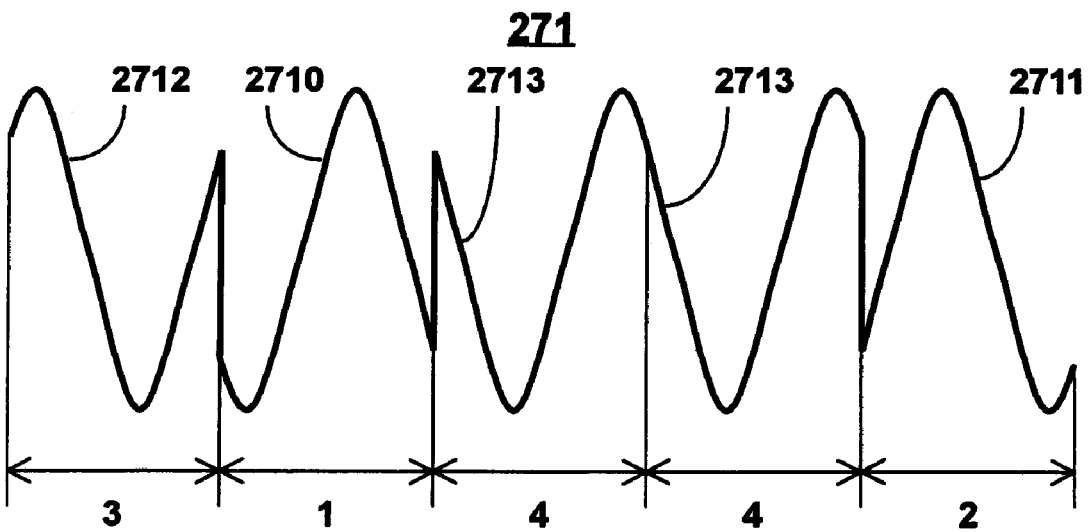
FIG. 24 shows a second example of a phase-shift keying modulation waveform according to the present invention.

FIG. 24 is a second example showing a phase-shift keying modulation wave 271 that is recorded with 4-valued data. In FIG. 24 the phase-shift keying modulation wave 271 is composed of a first phase [sin(−3π/4)] section 2710, a second phase [sin(−π/4)] section 2711, a third phase [sin(π/4)] section 2712 and a fourth phase [sin(3π/4)] section 2713. Minimum phase difference of each phase section is π/2, so that each of the 4-valued data can be sufficiently separated and obtained. Hereupon, the first phase section 2710, the second phase section 2711, the third phase section 2712 and the fourth phase section 2713 are corresponded to data "1", "2", "3" and "4" respectively for convenience.

When recording multi-valued data such as mentioned above, the multi-valued data can be replaced by multidimensional data. With assuming that the data is two-dimensional data (x, y), for example, the data "1" through "4" can be replaced by data (0, 0), data (0, 1), data (1, 0), and data (1, 1) respectively.

Figure 25:
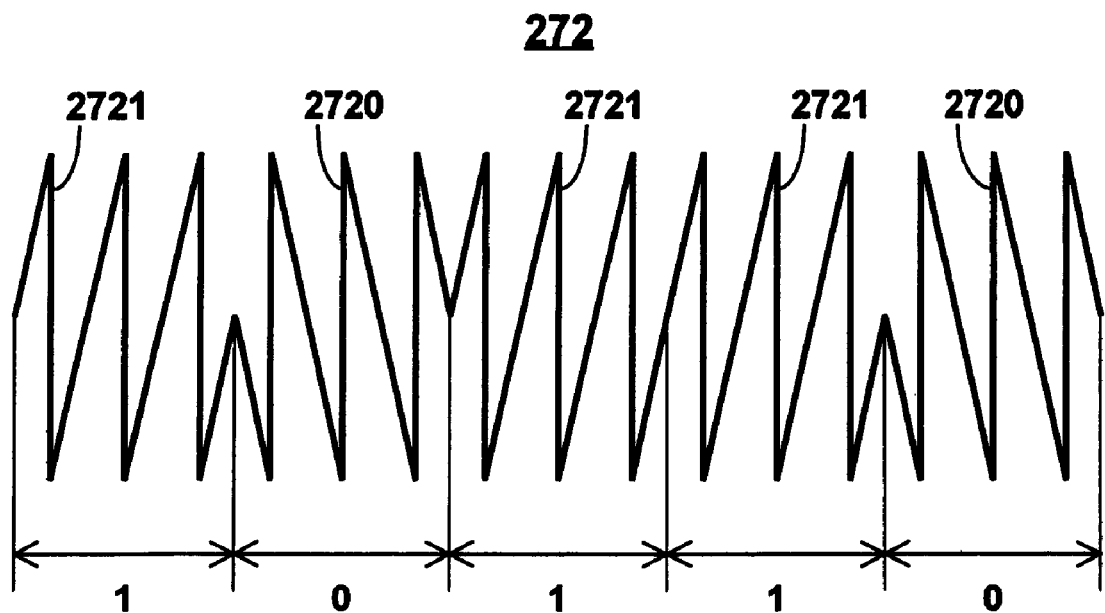
FIG. 25 shows a third example of a phase-shift keying modulation waveform according to the present invention.

FIG. 25 is a third example showing a phase-shift keying modulation wave 272, which deals with binary data in the information recording medium 1 according to the first embodiment of the present invention. In FIG. 25, a fundamental wave is a saw-tooth wave and the waveform is asymmetrical for rising and falling sections. By controlling the rising and falling sections individually, difference of phase is exhibited. In the case of the waveform shown in FIG. 25, data "1" is recorded as a section 2721 of which a wave rises gradually and falls rapidly (hereinafter referred to as a rapidly falling section 2721), and data "0" as a section 2720, which rises rapidly and falls gradually (hereinafter referred to as a rapidly rising section 2720). In case that address data "10110" is recorded, for example, as shown in FIG. 25, the phase-shift keying modulation wave 272 is geometrically recorded with the rapidly falling section 2721, the rapidly rising section 2720, the rapidly falling section 2721, the rapidly falling section 2721 and the rapidly rising section 2720 in order. Such a recording method that records data by angle difference between a rising angle and a falling angle can demodulate the data by inputting the data into a high-pass filter and by extracting a differential component. Consequently, the recording method is advantageous to the data that can be reproduced even under low C/N condition.

As mentioned above, an auxiliary information is recorded in the information recording medium 1 according to the first embodiment of the present invention by the phase-shift keying modulation wave 270, 271 or 272. The binary data "0" or "1" is recorded in accordance with phase change of a number of wobbles, so that ability of judging "0" or "1" is excellent. Particularly, a frequency of the phase-shift keying modulation method is constant. Therefore, a filter, which is installed in a preceding stage of a demodulation circuit for auxiliary information, can be assigned to be a band-pass filter of which passing band is specialized in one frequency.

Further, the band-pass filter can also eliminate any kind of noises including a noise that is caused by recording by a user effectively. In other words, a lower error rate can be obtained even though a C/N is relatively low.

Furthermore, influence of random noise caused by the recording can be effectively eliminated and a low error rate can be maintained, even though recording in the recording layer 12 of the information recording medium 1 is conducted by a user.

As mentioned above, constitutions and effects of the amplitude-shift keying modulation waves 250, 251 and 252, the frequency-shift keying modulation waves 260, 261 and 262 and the phase-shift keying modulation waves 270, 271 and 272 according to the present invention are depicted In and the above-mentioned descriptions that are explained with referring to FIGS. 17 through 25, they are explained as examples with defining that a fundamental wave is a sinusoidal wave and recorded. However, it is also acceptable that a fundamental wave is defined as a cosine wave and recorded.

The constitution and the effect of the information recording medium 1 according to the first embodiment of the present invention is detailed above. However, the inventive concept of the present invention is not limited to the information recording medium 1 that is described with referring to FIGS. 1 though 25. It is apparent that many changes, modifications and variations in the arrangement of equipment and devices and in materials can be made without departing from the invention concept disclosed herein.

Further, in the above-mentioned first embodiment, each constituting component can be replaced by each other or exchanged by another component that is disclosed herein.

For example, the shape of the information recording medium 1 is not restricted to one specific shape, any shape such as disc, card and tape can be applied for the information recording medium 1. It is also applicable for the information recording medium 1 to be a shape in circular, rectangular or elliptic.

In addition, an information recording medium having a hole is also acceptable.

Figure 26:
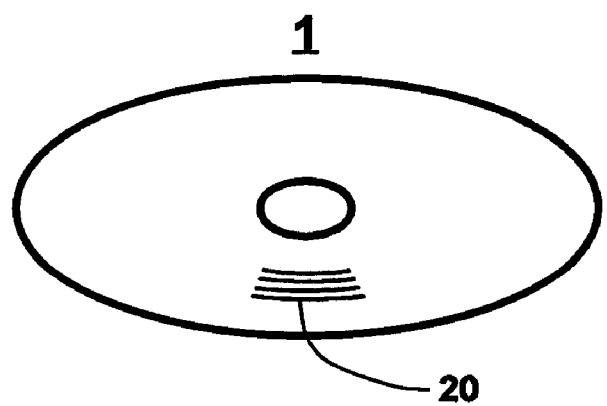
FIG. 26 shows a first example of a shape of the information recording medium according to the present invention.
Figure 27:
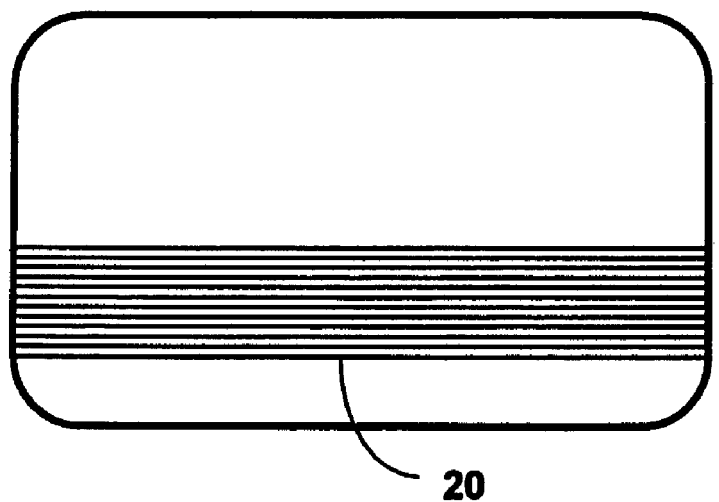
FIG. 27 shows a second example of a shape of the information recording medium according to the present invention.
Figure 28:
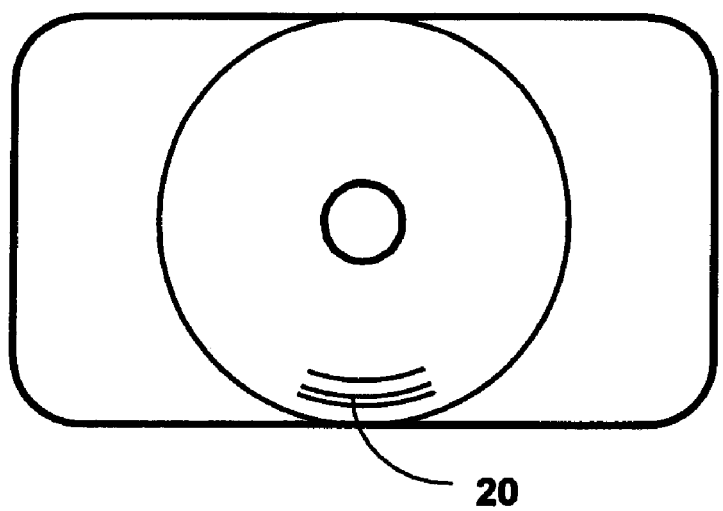
FIG. 28 shows a third example of a shape of the information recording medium according to the present invention.

FIG. 26 shows a first example of disk-shaped information recording medium 1 having a hole. FIG. 27 shows a second example of card-shaped information recording medium 1A having no hole. FIG. 28 shows a third example of a card-shaped information recording medium 1B having a hole. In FIG. 26, the disc-shaped information recording medium 1 is formed with a microscopic pattern 20, which is constituted by a continuous substance of approximately parallel grooves in a circular arc and in parallel with the inner or outer circumference of the information recording medium 1. The form of the microscopic pattern 20 is not limited to be the circular arc. Any form that is arranged continuously in 360 degrees coaxially or spirally is also acceptable. In FIG. 27, the card-shaped information recording medium 1A having no hole is formed with a microscopic pattern 20, which is constituted by a continuous substance of approximately parallel grooves linearly and in parallel with the longitudinal direction of the information recording medium 1A. In FIG. 28, the card-shaped information recording medium 1B having a hole is formed with a microscopic pattern 20, which is constituted by a continuous substance of approximately parallel grooves in circular.

Further, the cross section of the information recording medium 1 explained by using FIG. 1 is not limited to the cross sectional view shown in FIG. 1. It is apparent that the invention concept of the present invention can apply to an information recording medium having various cross sectional configurations.

Second Embodiment

Figure 29:
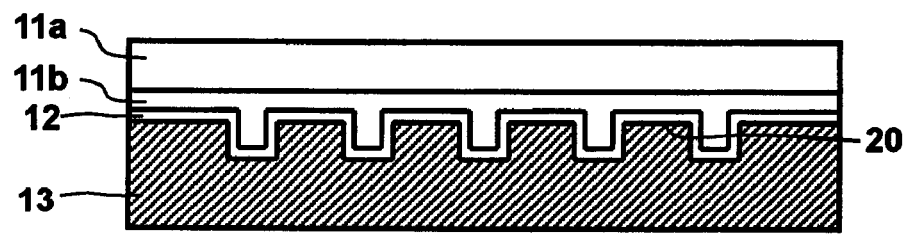
FIG. 29 is a cross sectional view of an information recording medium according to a second embodiment of the present invention.

FIG. 29 is a cross sectional view of an information recording medium according to a second embodiment of the present invention. In FIG. 29, an information recording medium 2 is identical to the information recording medium 1 shown in FIG. 1 except for the light transmitting layer 11, so that details of the same components will be omitted. As shown in FIG. 29, the light transmitting layer 11 of the information recording medium 1 is divided into two layers; a light transmitting layer 11a and an adhesive light transmitting layer 11b, wherein the light transmitting layer 11a is similar to the light transmitting layer 11 as mentioned above. The adhesive light transmitting layer 11b is a layer for adhering the light transmitting layer 11a on the recording layer 12 firmly, and transmits more than 70% of light having a wavelength λ, desirably more than 80%.

With respect to a material of the adhesive light transmitting layer 11a, an adhesive or cohesive resin such as thermosetting resins, various energy ray curable resins including UV ray curable resins, visible radiation curable resins and electron beam curable resins, moisture curable resins, plural liquid mixture curable resins and thermoplastic resins containing solvent can be used.

Further, a thickness of the adhesive light transmitting layer 11b is more than 0.001 mm as a minimum thickness exhibiting adhesiveness, desirably less than 0.04 mm in view of preventing a growth of stress crack, and more desirably to be more than 0.001 mm and less than 0.03 mm. Desirably further more, the thickness is more than 0.001 and less than 0.02 mm. However, it is the most desirable that the thickness is more than 0.001 mm and less than 0.01 mm in view of warpage of the information recording medium 2 totally.

Third Embodiment

Figure 30:
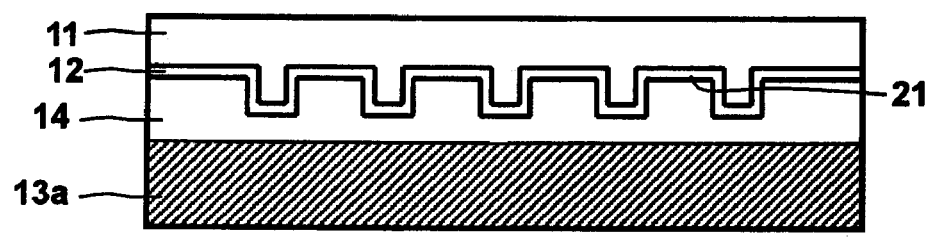
FIG. 30 is a cross sectional view of an information recording medium according to a third embodiment of the present invention.

FIG. 30 is a cross sectional view of an information recording medium according to a third embodiment of the present invention. In FIG. 30, an information recording medium 3 is identical to the information recording medium 1 shown in FIG. 1 except for the substrate 13, so that details of the same components will be omitted. As shown in FIG. 30, the substrate 13 shown in FIG. 1 is replace with a substance of two-layer structure; a substrate 13a and a resin layer 14.

With respect to a material of the resin layer 14, such resins as thermosetting resins, various energy ray curable resins including UV ray curable resins, visible radiation curable resins and electron beam curable resins, moisture curable resins, plural liquid mixture curable resins and thermoplastic resins containing solvent can be used. Reproducing light never reaches to the resin layer 14, so that there is existed no limitation in transmittance.

Further, a thickness of the resin layer 14 is desirable to be less than 0.02 mm in view of warpage of the information recording medium 3 totally.

Fourth Embodiment

Figure 31:
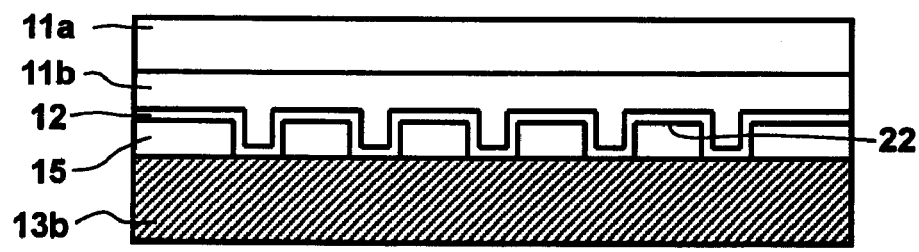
FIG. 31 is a cross sectional view of an information recording medium according to a fourth embodiment four of the present invention.

FIG. 31 is a cross sectional view of an information recording medium according to a fourth embodiment of the present invention. In FIG. 31, an information recording medium 4 is identical to the information recording medium 1 shown in FIG. 1 except for the light transmitting layer 11 and the substrate 13, so that details of the same components will be omitted. As shown in FIG. 31, the light transmitting layer 11 of the information recording medium 1 is divided into two layers; a light transmitting layer 11a and an adhesive light transmitting layer 11b as same constitution as those of the information recording medium 2 shown in FIG. 29.

Further, the substrate 13 shown in FIG. 1 is replace with a substance of two-layer structure; a flat substrate 13b and a pattern transferring layer 15 having a microscopic pattern 22, wherein the pattern transferring layer 15 is an extremely thin film for having the microscopic pattern 22.

Furthermore, a material of the pattern transferring layer 15 is selected out from a metal, an alloy of the metal and a resin, wherein an alloy includes a compound such as oxide, nitride, carbide, sulfide and fluoride, and its thickness is designated to be within a range of 5 nm to 200 nm.

With respect to a typical example of resin, there is existed novolac light-sensitive resin and polyhydroxy styrene light-sensitive resin, wherein both resins can be developed by alkali.

Each component of the information recording mediums 1 through 4 shown in FIGS. 1 through 4 and 26 through 31 can be replaced by or combined with other component mutually as far as a reproduction characteristic is not deteriorated.

For example, it is acceptable to stick two information recording mediums out of the information recording mediums 1 through 4, wherein one information recording medium is stuck on the other information recording medium with facing each substrate 13 (13a, 13b) towards each other. Further, one set of the recording layer 12 and the light transmitting layer 11 can be stuck on the light transmitting layer 11 of the information recording mediums 1 through 4. By this configuration, capacity of the information recording mediums 1 through 4 can be increased almost twice.

Furthermore, it is acceptable that laminating a plurality of sets of the recording layer 12 and the light transmitting layer 11 repeatedly forms a multi-layered information recording medium having a plurality of recording layers.

Further, the information recording mediums 1 through 4 according to the first through fourth embodiment of the present invention can be formed with commonly known layers such as an antistatic layer, a lubricative layer and a hard coat layer that are laminated on the light transmitting layer 11 (or 11a) although they are not shown in drawings.

With respect to an actual material for the antistatic layer, a resin such as energy ray curable resin and thermosetting resin that are dispersed with surface-active agent and conductive fine particles can be used.

With respect to an actual material for the lubricative layer, liquid lubricant of which surface energy is adjusted by modifying hydrocarbon macromolecule with silicon and fluorine can be used. A thickness of the lubricative layer is desirable to be within a range of 0.1 nm to 10 nm approximately.

Further, with respect to an actual material for the hard coat layer, a resin, which transmits more than 70% of light having wavelength $\lambda$, such as thermosetting resins, various energy ray curable resins including UV ray curable resins, visible radiation curable resins and electron beam curable resins, moisture curable resins, plural liquid mixture curable resins and thermoplastic resins containing solvent can be used.

Furthermore, the hard coat layer is desirable to exceed a certain value of the "scratch test by pencil" regulated by the Japanese Industrial Standard (JIS) K5400 in consideration of abrasion resistance of the light transmitting layer 11 (or 11a). In consideration of that glass is a hardest material for an objective lens of a reproducing apparatus of information recording medium, a value of the "scratch test by pencil" for the hard coat layer is most preferable to be more than the "H" grade. If the test value is less than the "H" grade, dust that is caused by scraping the hard coat layer is remarkably generated and resulted in deteriorating an error rate abruptly.

Moreover, a thickness of the hard coat layer is desirable to be more than 0.001 mm in consideration of shock resistance. However, the thickness is more desirable to be less than 0.01 mm in consideration of each warp of the information recording mediums 1 through 4 totally.

Further, a thin film, which transmits more than 70% of light having a wavelength $\lambda$ and has a value of the "scratch test by pencil" of more than the "H" grade, can be used for the hard coat layer. With respect to an actual example of the thin film, an element such as carbon, molybdenum and silicon, and their alloy including composition such as oxide, nitride, sulfide, fluoride and carbide can be used. A film thickness of such a thin film is desirable to be within a range of 1 nm to 1000 nm.

Furthermore, a label printing can be applied on the outer surface of the substrate 13 (13a, 13b) opposite to the recording layer 12 although the label printing is not shown in any drawings. Various energy ray curable resins containing pigment and dye such as UV ray curable resins, visible radiation curable resins and electron beam curable resins can be used suitably for the label printing. A thickness of the label printing is desirable to be more than 0.001 mm in consideration of visibility of the printing, more desirable to be less than 0.05 mm in consideration of each warp of the information recording mediums 1 through 4 totally.

A cross sectional surface of a groove portion "G" and a land portion "L" in the microscopic patterns 20, 21 and 22 is formed flat respectively However, a cross sectional surface is not limited to flat. Cross-sectionally, they can be formed in a shape of a V-letter or an inverse V-letter.

Further, any of the information recording mediums 1, 2, 3 and 4 can be formed with a read-only area on the plane of the information recording medium other than a predetermined area for recording, that is, an area for recording and reproducing. The read-only area can be formed by a pit or a wobbling groove recorded with at least one modulation wave selected out from the amplitude-shift keying modulation wave 250, the frequency-shift keying modulation wave 260 and the phase-shift keying modulation wave 270 on a sidewall of the groove. The information recording medium can be provided with the reference clock area 300 together with the read-only area hereupon These read-only area and reference clock area 300 can be formed by a bar code. The read-only area can provide information for tuning a recording apparatus or a reproducing apparatus when recording or reproducing.

Furthermore, the read-only area can handle an identification information, a copyright information and a copy restriction information of an individual information recording medium.

Moreover, the read-only area can be allocated arbitrarily. However, in case of an information recording medium in disciform, it is considered that a read-only area and a recording and reproducing area is allocated in the inner circumference area and the outer circumference area respectively, and these areas are formed so as not to overlap with each other. Particularly, it is most desirable that these two areas come into contact with each other, and they are connected at one point and resulted in enabling to be reproduced continuously.

A hologram and a visible microscopic pattern for identifying the information recording medium 1, 2, 3 or 4 can be formed in an area other than a predetermined area for recording.

In order to improve ability of loading an information recording medium into a reproducing apparatus or a recording apparatus, and in order to improve protectiveness while loading and handling the information recording medium, each of the information recording mediums 1 through 4 can be contained in a cartridge.

In case that the information recording mediums 1 through 4 are in disciform, its dimensions are not limited to one dimension. For example, in the case of diameter, various diameters from 20 mm to 400 mm can be applied for the information recording mediums 1 through 4. Any diameter such as 30, 32, 35, 41, 51, 60, 65, 80, 88, 120, 130, 200, 300 and 356 mm can be acceptable.

The recording layer 12 provided in the information recording mediums 1 through 4 are shown as a single layer in the respective drawings. However, the recording layers 12 can be formed by a plurality of thin film materials for a purpose of improving recording and reproducing characteristics and storage stability.

With referring to FIG. 32, another embodiment of information recording medium is detailed next.

Fifth Embodiment

Figure 32:
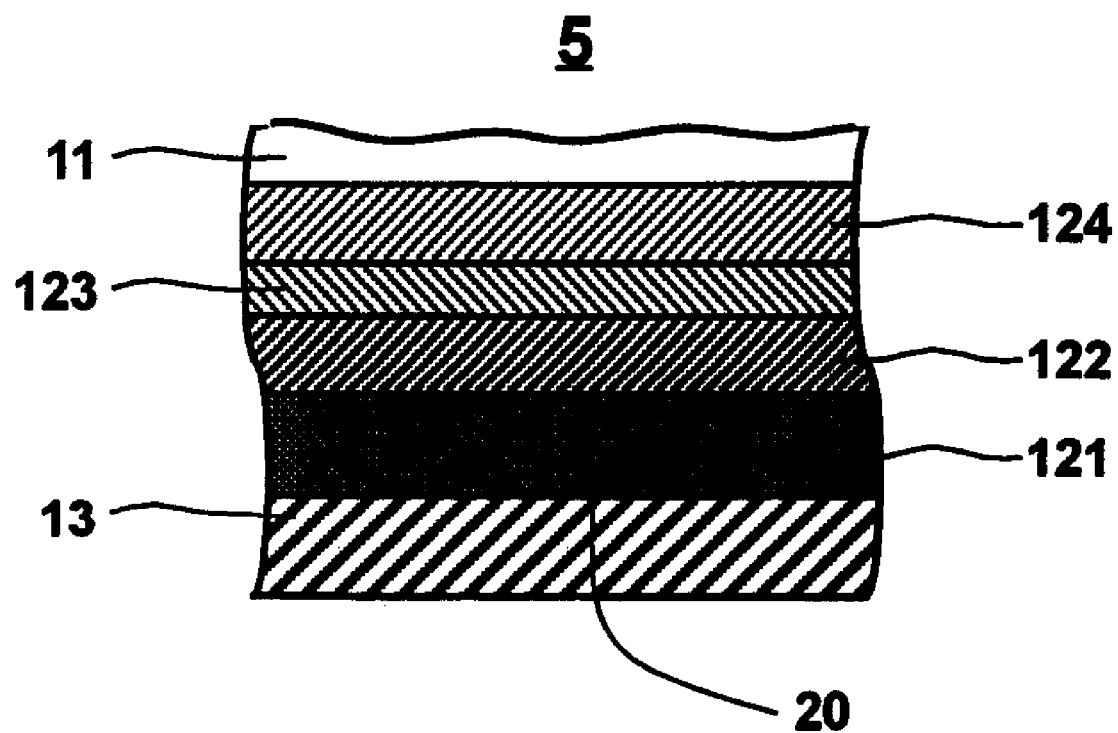
FIG. 32 is a cross sectional view of an information recording medium according to a fifth embodiment of the present invention.

FIG. 32 is a cross sectional view of an information recording medium according to a fifth embodiment of the present invention. In FIG. 32, an information recording medium 5 is similar to the information recording medium 1 of the first embodiment shown in FIG. 1, so that the same composition or configuration as that of the information recording medium 1 is marked by the same symbol as the information recording medium 1 and its detail is omitted. As shown in FIG. 32, the information recording medium 5 according to the fifth embodiment of the present invention is composed of a reflective layer 121, a first protective layer 122, a recording layer 123, a second protective layer 124, and a light transmitting layer 11, which are sequentially formed on a substrate 13 having a microscopic pattern 20 in order.

With respect to a material for the reflective layer 121, there existed a metal having light reflectiveness such as Al, Au and Ag, an alloy that contains the metal as a main component and an additive element composed of more than one metal, semiconductor or semimetal, and a mixture of metal such as Al, Au and Ag with metal compound such as metal nitride, metal oxide and metal chalcogenide. Such a metal as Al, Au or Ag and an alloy containing the metal as the main component is high in light reflectiveness and thermal conductivity, so that they are preferable for the material of the reflective layer 121.

Further, the reflective layer 121 plays a role of optimizing conduction of heat when recording is conducted to the recording layer 123, so that the reflective layer 121 can be called a heat-sink layer.

With respect to the alloy mentioned above, there existed an alloy composed of Al or Ag added with at least one element out of Si, Mg, Cu, Pd, Ti, Cr, Hf, Ta, Nb, Mn, Pd, Zr and Rh as an additive element within a range of more than 1 atomic % to less than 5 atomic % in total or composed of Au added with at least one element out of Cr, Ag, Cu, Pd, Pt and Ni as an additive element within a range of more than 1 atomic % to less than 20 atomic % in total.

Particularly, as anti-corrosiveness is excellent and an iterative characteristic is improved, the reflective layer 121 is desirable to be constituted by any one of Al—Cr alloy, Al—Ti alloy, Al—Ta alloy, Al—Zr alloy, Al—Ti—Cr alloy and Al—Si—Mn alloy, which contain Al as a main component and an additive element that is designated to be within a range of more than 0.5 atomic % to less than 3 atomic %. With respect to the additive element, adding a metal or a semiconductor to a base metal alone makes a crystal particle smaller and results in reducing noise level while reproducing, so that adding additive element is desirable.

Furthermore, adding additive element is effective for improving stability under a high temperature and high humidity condition. Alloys such as Al—Ti, Al—Cr, Al—Zr, Al—Si, Ag—Pd—Cu and Ag—Rh—Cu, for example, are desirable for the material of the reflective layer 121. In case of utilizing a violaceous semiconductor laser, constituting the reflective layer 121 by an alloy of Al system or Ag system can obtain higher reflectivity. A thickness of the reflective layer 121 is within a range of 10 nm to 300 nm.

More, the thickness of the reflective layer 121 varies by a degree of thermal conductivity of a metal or an alloy constituting the reflective layer 121. In case of Al—Cr alloy, for example, thermal conductivity decreases in accordance with content of Cr that increases. Consequently, the thickness of the reflective layer 121 must be made thicker; otherwise increasing content of Cr does not comply with recording strategy. In case that content of Cr is larger, the reflective layer 121 is hard to be heated or cooled down and becomes a so-called gradually cooling structure. In order to control forming a record mark in accordance with the recording strategy, some consideration such that shortening a head pulse, shortening multi-pulses or extending a cooling pulse is required. In case that the thickness of the reflective layer 121 exceeds 50 nm, the reflective layer 121 does not change optically or affect a value of reflectivity. However, affection to a cooling speed increases extremely. In case of increasing the thickness of the reflective layer 121 to more than 300 nm, it takes extra time while manufacturing an information recording medium. Consequently, it is desirable for the film thickness of the reflective layer 121 to be suppressed possibly by using a material having higher reflectivity.

Moreover, by dividing the reflective layer 121 into more than two layers, a noise level while reproducing an information recording medium can be reduced. Such a reflective layer 121 composed of more than two layers is formed as follows. In case of forming the reflective layer 121 having a thickness of 150 nm in total by using a single disc sputtering system, which forms each layer on a substrate 13 in a plurality of vacuum chambers while transporting the substrate 13 one by one, a first reflective layer is formed by a first material in a first vacuum chamber at a filming speed of 2 nm/s, and then second and third reflective layers are formed in second and third vacuum chambers respectively at a filming speed of 6.5 nm/s. Consequently, a plurality of the substrates 13 (discs) can be filmed one after another in a short period of time as long as 10 seconds. By the above-mentioned process, a crystal particle can be made finer by changing a filming speed.

Accordingly, a noise level can be reduced when reproducing the information recording medium 5.

The first protective layer 122 and the second protective layer 124 is effective for protecting the substrate 13 and the recording layer 123 from deformation and resulting in deteriorating a recording characteristic by excessive heat while recording, for preventing oxidization of recording materials, and effective for improving a signal contrast by an optical interference effect while reproducing.

Further, these first and second protective layers 122 and 124 are transparent at a wavelength of a light beam for recording and reproducing and its refractive index "n" is within a range of $1.9 \leq n \leq 2.5$.

Furthermore, both the first protective layer 122 and the second protective layer 124 are not required to be made by same material and composition. It is acceptable to be constituted by different materials. A thickness of the second protective layer 124 decides a wavelength exhibiting a minimum value of spectral reflectance.

Moreover, the first protective layer 122 and the second protective layer 124 is further effective for activating crystallization of a recording layer and for improving an erase ratio.

With respect to a material of these first and second protective layers 122 and 124, there is provided an inorganic thin film such as ZnS, $SiO_2$, silicon nitride, and aluminum oxide.

Particularly, an oxidized thin film of metal or semiconductor such as Si, Ge, Al, Ti, Zr and Ta, a nitride thin film of metal or semiconductor such as Si, Ge and Al, a carbide thin film of metal or semiconductor such as Ti, Zr, Hf and Si, a sulfide thin film of metal or semiconductor such as ZnS, $In_2S_3$, $TaS_4$ and $GeS_2$ and a film of mixture compound containing more than two compounds out of the above-mentioned compounds such as oxide, nitride, carbide and sulfide are desirable for the first and second protective layers 122 and 124 because they are high in heat resistance and chemically stable.

Further, with respect to a material of the first and second protective layers 122 and 124, it is desirable that the material does not diffuse into the recording layer 123. Compounds of oxide, sulfide, nitride and carbide are not necessary to be a stoichiometrical composition. Controlling a composition and using them by mixing are also effective for controlling a refractive index. By changing a content amount of oxygen, sulfur, nitrogen and carbon, a refractive index "n" is controlled. If a content amount of them increases, a refractive index "n" decreases. A mixture film of ZnS and $SiO_2$ is particularly desirable for a material of the first and second protective layers 122 and 124, because recording sensitivity, C/N (carrier to noise ratio), and an erase ratio is hard to be deteriorated by a plurality of repetitions of recording and reproducing. A thickness of the first protective layer 122 and the second protective layer 124 is within a range of 10 nm to 500 nm respectively. Particularly, a thickness of the first protective layer 122 is desirable to be within a range of 10 nm to 50 nm because of excellent recording characteristics such as C/N and erase ratio and enabling to rewrite stably a plurality of times. If a thickness of the second protective layer 122 is thinner, a reflectivity increases and a recording sensitivity results in being deteriorated.

Furthermore, the thinner first protective layer 122 makes a space between the second protective layer 122 and the reflective layer 121 narrower and the recording layer 123 results in a so-called rapid cooling construction, so that a relatively large recording power is necessary for forming a record mark.

On the contrary, if the thickness of second protective layer 122 becomes thicker, the space between the protective layer 122 and the reflective layer 121 becomes wider and the recording layer 123 becomes the gradually cooling structure. Consequently, a rewriting performance is deteriorated and a number of repetitions of overwriting decreases. A film thickness of the first protective layer 122 is preferable to be thinner than that of the second protective layer 124 and to be constituted in the rapid cooling construction so as to relief thermal damage. Consequently, the film thickness of the first protective layer 122 is preferable to be within a range of 2 nm to 50 nm. Desirably, a filming speed of the first protective layer 122 is made slower than that of the second protective layer 124.

Accordingly, an increase of jitter caused by rewriting is suppressed and a number of repetitions of overwriting increases.

With respect to a material of the recording layer 123, the same phase change material as the recording layer 12 mentioned above is used. A film thickness of the recording layer 123 is within a range of 5 nm to 100 nm, desirably, 10 nm to 30 nm in order to increase a reproduced signal.

The same material as the first protective layer 122 is used for the second protective layer 124. A thickness of the second protective layer 124 is within a range of 10 nm to 200 nm. Desirably, the thickness is within a range of 40 nm to 150 nm to increase a reproduced signal although an optimum film thickness varies by a wavelength of a light source to be utilized. In case that recording light is a violaceous laser having a wavelength of 400 nm approximately, modulated amplitude can be increased by adjusting the thickness to be within a range of 40 nm to 60 nm.

According to the present invention, as mentioned above, the recording characteristics and the reproducing characteristics of the information recording medium 5 is improved in addition to the effects realized by the information recording medium 1. The laminated constitution of the information recording medium 5 can be applied for not only the information recording medium 1 but also the information recording mediums 2 through 4.

Further, in order to improve the recording characteristics and the reproducing characteristics more, an auxiliary thin film can be formed on a surface of each layer or between layers.

The information recording mediums 1 through 5 according to the first through fifth embodiment of the present invention are explained above. With referring to FIG. 33, a first reproducing apparatus for reproducing any of the information recording mediums 1 through 5 is explained next. The information recording medium 1 represents the information recording mediums 1 though 5 generically for simplifying the explanation hereinafter.

Figure 33:
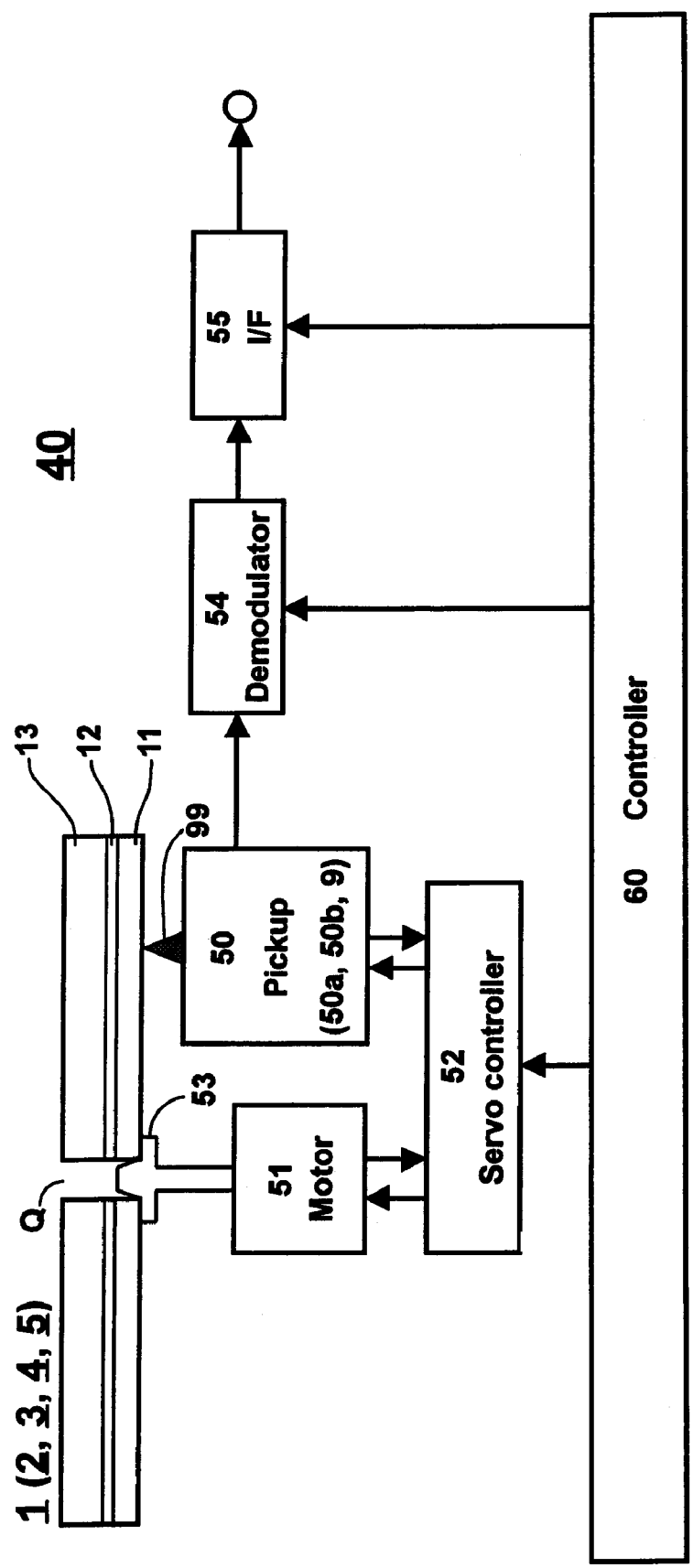
FIG. 33 is a block diagram of a first reproducing apparatus of an information recording medium according to an embodiment of the present invention.

FIG. 33 is a block diagram of a first reproducing apparatus for reproducing an information recording medium according to the present invention. As shown in FIG. 33, a first reproducing apparatus 40 is an apparatus for reproducing a recording layer 12 of the information recording medium 1 and composed of at least a reproducing unit provided with a light emitting element, which emits reproducing light having a wavelength λ of 350 nm to 450 nm and has a noise level of less than RIN −125 dB/Hz, and an objective lens having a numerical aperture NA of 0.75 to 0.9, and a control unit, which controls the reproducing unit so as to reproduce the information recording medium 1 by irradiating the reproducing light only on a land portion "L" of the information recording medium 1.

Actually, the first apparatus 40 is at least composed of a pickup 50 for reading reflected light from the information recording medium 1, a motor 51 that rotates the information recording medium 1, a servo controller 52 for controlling to drive the pickup 50 and the motor 51, a turntable 53 for supporting the information recording medium 1 while rotating, a demodulator 54 for demodulating an information signal that is read out by the pickup 50, an interface (I/F) 55 for outputting a signal that is demodulated by the demodulator 54, and a controller 60 that controls the first reproducing apparatus 40 totally.

The demodulator 54 hereupon is a digital converter that returns 16-bit data to original 8-bit data if a reproduced signal is modulated by the EFM plus modulation (8-16 modulation) method, which is commonly used for the DVD system.

The turntable 53 and the information recording medium 1 is connected with plugging a center hole Q of the information recording medium 1 with the turntable 53. Such a connection between the turntable 53 and the information recording medium 1 can be either a fixed connection or semi-fixed connection, which can load or release the information recording medium 1 freely.

Further, the information recording medium 1 can be contained in a cartridge. With respect to a cartridge, a commonly known cartridge having an opening and closing mechanism in the center can be used as it is.

The motor 51 is linked to the turntable 53 and the turntable 53 is plugged with the center hole Q of the information recording medium 1.

Further, the motor 51 supports the information recording medium 1 and supplies relative motion for reproduction to the information recording medium 1 through the turntable 53. A signal output can be supplied to a not shown external output terminal or directly supplied to a not shown display device, audio equipment or printing equipment.

The pickup 50 is at least composed of a light emitting element 50a, which emits light having a single wavelength λ within a range of 350 nm to 450 nm, desirably 400 nm to 435 nm, an objective lens 50b having a numerical aperture NA within a range of 0.75 to 0.9, and a photo detector 9, which receives reflected light that is reflected by the information recording medium 1 although they are not shown in FIG. 33.

Further, the pickup 50 forms reproducing light 99 in conjunction with these components. It is acceptable that the light emitting element 50a is a semiconductor laser of gallium nitride system compound or a laser having a second harmonic generating element.

Furthermore, the servo controller 52 is indicated only one in FIG. 33. However, it can be divided into two; one is a driving control servo for the pickup 50 and the other is another driving control servo for the motor 51.

With respect to the demodulator 54, a commonly know equalizer and the PRML (partial response maximum likelihood) decoding circuit, which are not shown, can be installed in the demodulator 54. With respect to an equalizer (waveform equalizer), for example, a so-called neural net equalizer (that is disclosed in the Japanese Patent No. 2797035) in which a plurality of conversion systems having a nonlinear input-output characteristic is combined together with applying individual variable weighting and constitutes a neural network, a so-called limit equalizer (that is disclosed in the Japanese Patent Application Laid-open Publication No. 11-259985/1999) in which an amplitude level of reproduced signal is limited to a predetermined value and forwarded to a filtering process, and a so-called error selection type equalizer (that is disclosed in the Japanese Patent Application Laid-open Publication No. 2001-110146) in which an error between a reproduced signal and an objective value for waveform equalization is obtained and a frequency of the waveform equalizer is changed adaptively so as to minimize the error can be preferably used.

Moreover, in the commonly known PRML decoding circuit that contains a predicted value controlling and equalization error calculating circuit, a so-called adaptive viterbi decoder (that is disclosed in the Japanese Patent Application Laid-open Publications No. 2000-228064 and No. 2001-186027) in which a predicted value utilized for decoding viterbi algorithm is calculated and a frequency response is optimized so as to minimize an equalization error of waveform equalizer can be used particularly.

Operations of the first apparatus 40 are explained next. The reproducing light 99 is emitted from the light emitting element 50a of the pickup 50 through the objective lens 50b and converged on the microscopic pattern 21 of the information recording medium 1 loaded on the turntable 53.

Accurately, the reproducing light 99 is focused on the microscopic pattern 21 that is disposed at a depth of 0.07 mm to 0.12 mm corresponding to the thickness of the light transmitting layer 11. Succeedingly, the reproducing light 99 tracks either a groove portion "G" or a land portion "L". The tracking is conducted on a predetermined portion of either the groove portion "G" or the land portion "L". However, as mentioned above, selecting the land portion "L" is most desirable.

The reflected light from the microscopic pattern 21 is received by the photo detector 9 not shown and a recorded signal is read out. As shown in FIG. 10, the photo detector 9 is divided into four sections. A total sum signal, that is, "(Ia+Ib+Ic+Id)" of outputs from the divided four sections of the photo detector 9 (hereinafter referred to as "4-division photo detector" 9) is transmitted to the demodulator 54. Reading out the recorded signal is conducted by reproducing a record mark "M" that is recorded only on the land portion "L", for example, in the microscopic pattern 21 as shown in FIG. 3.

It is omitted in the above explanation that a focus error signal is necessary for focusing to be generated and a tracking error signal is necessary for tracking to be generated. Such a focus error signal and a tracking error signal is generated by a differential signal in the radial direction, that is, "(Ia+Ib)−(Ic+Id)", which is outputted from the 4-division photo detector 9, and transmitted to the servo controller 52. In the servo controller 52, a focus servo signal or a tracking servo signal is produced from the received focus error signal or the tracking error signal in accordance with controlling by the controller 60, then the focus servo signal or the tracking servo signal is transmitted to the pickup 50.

In addition thereto, a rotary servo signal is produced in the servo controller 52 and transmitted to the motor 51.

Further, in the demodulator 54, the recorded signal is demodulated and applied with error correction as required, and a data stream that is obtained is transmitted to the I/F 55. Finally, a signal is outputted externally in accordance with controlling by the controller 60.

As mentioned above, the first reproducing apparatus 40 of the present invention is loaded with an information recording medium 1 and designed for coping with the reproducing light 99, which is generated by the light emitting element 50a (not shown) having single wavelength $\lambda$ within the range of 350 nm to 450 nm, the objective lens 50b (not shown) having the numerical aperture NA of 0.75 to 0.9 and the 4-division photo detector 9 (not shown). Therefore, the first reproducing apparatus 40 can reproduce the information recording medium 1 excellently.

Accordingly, the first reproducing apparatus 40 is such a reproducing apparatus that reads out information recorded on the recording layer 12 (or 123). Particularly, the first reproducing apparatus 40 can reproduce contents, which are continuously recorded for a long period of time, and can be used for reproducing an HDTV program and a movie, which are recorded by video equipment, for example.

With referring to FIG. 34, a second reproducing apparatus for reproducing any of the information recording mediums 1 through 5 according to the present invention is explained, wherein the information recording medium 1 represents the information recording mediums 1 though 6 generically for simplifying the explanation hereinafter.

Figure 34:
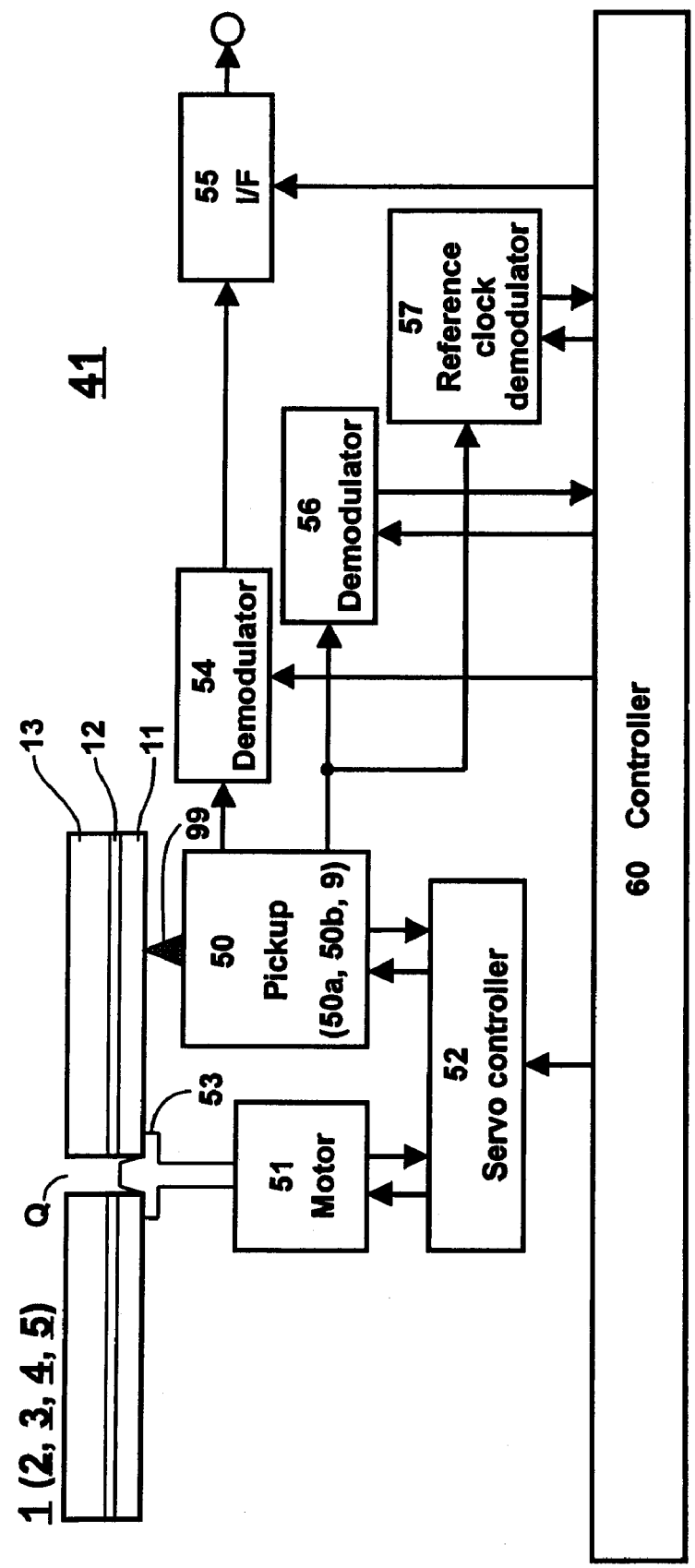
FIG. 34 is a block diagram of a second reproducing apparatus of an information recording medium according to an embodiment of the present invention.

FIG. 34 is a block diagram of a second reproducing apparatus for reproducing an information recording medium according to the present invention. In FIG. 34, a second reproducing apparatus 41 is identical to the first reproducing apparatus 40 except for an auxiliary information demodulator 56 and a reference clock demodulator 57, which are provided between the pickup 50 and the controller 60 and demodulate an auxiliary information and a reference clock read out by the pickup 50 respectively. The second reproducing apparatus 41 is a reproducing apparatus that is used for index reproduction of a HDTV program and a movie, which are recorded by video equipment, and for index reproduction of data stored in a computer.

As mentioned above, a signal that is transmitted from the pickup 50 to the demodulator 54 is the total sum signal, that is, "(Ia+Ib+Ic+Id)" outputted form the 4-division photo detector 9 not shown. In addition, another signal that is transmitted from the pickup 50 to the auxiliary information demodulator 56 is the differential signal in the radial direction, that is, "(Ia+Ib)−(Ic+Id)" outputted from the 4-division photo detector 9 not shown.

An auxiliary information and a reference clock recorded geometrically in the information recording medium 1 as a wobbling groove. The wobbling is formed in the radial direction, so that the auxiliary information and the reference clock can be extracted by monitoring the differential signal.

With respect to an actual constitution of the auxiliary information demodulator 56, it is constituted by at least any one of an amplitude-shift keying modulation demodulator, a frequency-shift keying modulation demodulator and a phase-shift keying modulation demodulator.

More accurately, an envelope detector circuit can be suitably used for the amplitude-shift keying modulation demodulator. A frequency detector circuit and a synchronous detector circuit can be suitably used for the frequency-shift keying modulation demodulator. A synchronous detector circuit, a delay detector circuit and an envelope detector circuit can be suitably used for the phase-shift keying modulation demodulator.

The amplitude-shift keying modulation wave 250, the frequency-shift keying modulation wave 260 or the phase-shift keying modulation wave 270, which constitutes the auxiliary signal area 200, is inputted to the auxiliary information demodulator 56 and an auxiliary information is demodulated from the differential signal in the radial direction outputted from the 4-division photo detector 9.

The total sum signal may leak into the differential signal in the radial direction although it may be a small amount. In order to avoid such leaking, a band-pass filter that is adjusted for a frequency range of an auxiliary signal can be inserted between the pickup 50 and the auxiliary information demodulator 56.

An actual constitution of the reference clock demodulator 57 is at least composed of a slicing circuit. The single-frequency wave 350, which constitutes the reference clock area 300 and is extracted from the differential signal in the radial direction that is outputted from the 4-division photo detector 9, is inputted to the reference clock demodulator 57. In the reference clock demodulator 57, the single-frequency wave 350 is properly sliced and formed in binary coded. In order to separate the single-frequency wave 350 from a signal obtained from the auxiliary signal area 200, a band pass filter can be inserted into a previous stage immediately before the reference clock demodulator 57. A binary coded signal controls revolution of the motor 51 through the controller 60 and the servo controller 52 in order to decide a number of revolutions of the turntable 53.

Further, in order to amplify, wave-transform, wave-shape or frequency-divide the binary coded signal, an amplifier, a waveform transformer, a waveform shaper, or a frequency divider can be connected to the second reproducing apparatus 41 additionally.

The auxiliary information demodulator 56 and the reference clock demodulator 57 is connected so as to distribute the differential signal respectively. A switching circuit not shown can be inserted in a previous stage before the auxiliary information demodulator 56 and the reference clock demodulator 57 in order not to deteriorate S/N and in order to reduce reading out error. In case that the auxiliary information area 200 and the reference clock area 300 is allocated at every predetermined interval, prediction for a following signal to be read out can be theoretically decided by reading out and identifying the signal. Consequently, the switching circuit can be constituted.

Furthermore, in case that a start bit signal and a stop bit signal is allocated between the auxiliary information area 200 and the reference clock area 300, prediction for a following signal to be read out can be theoretically decided by referring to these start bit and stop bit signals. Consequently, the switching circuit can be theoretically constituted.

With referring to FIGS. 34 and 35, an operation of the second reproducing apparatus 41 is explained next.

Figure 35:
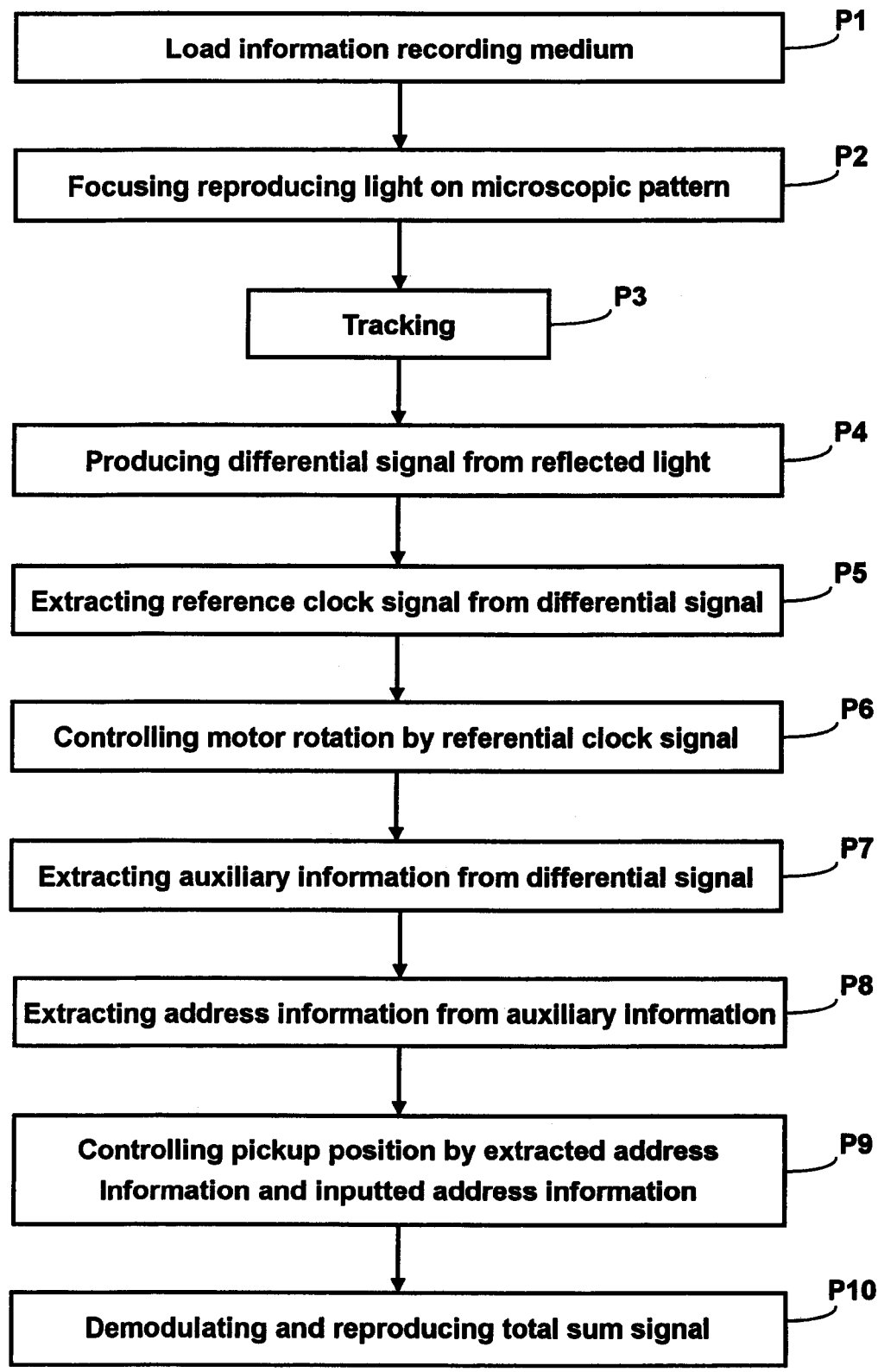
FIG. 35 is a flow chart showing a reproducing method of an information recording medium according to an embodiment of the present invention.

FIG. 35 is a flow chart showing a method for reproducing according to an embodiment of the present invention. As shown in FIG. 35, an operation of the second reproducing apparatus 41, that is, a method of reproducing the information recording medium 1 by using the second reproducing apparatus 41 is composed of at least following steps. The information recording medium 1 is loaded on the turntable 53 of the second reproducing apparatus 41 (step P1). The reproducing light 99 from the pickup 50 is converged and focused on the microscopic pattern 21 formed in the information recording medium 1 (step P2), and is made tracking (step P3). A differential signal is produced from reflected reproducing light 99 that is reflected by the microscopic pattern 21 (step P4). A reference clock signal is extracted from the differential signal (step P5). Revolution of the motor 51 is controlled by the extracted reference clock signal (step P6). An auxiliary information is extracted from the differential signal (step P7). An address information is extracted from the extracted auxiliary information (step P8). A position of the pickup 51 is controlled by the extracted address information and an address information inputted externally (step P9). A total sum signal is demodulated and reproduced (step P10).

More specifically, the information recording medium 1 is loaded on the turntable 53, which can control revolution of the information recording medium 1 to the circumferential direction (the step P1). Succeedingly, the reproducing light 99 is emitted from the light emitting element 50a of the pickup 50 through the objective lens 50b and converged on the microscopic pattern 21 of the information recording medium 1 (the step P2). Accurately, the reproducing light 99 is focused on the microscopic pattern 21, which is disposed at a depth of 0.07 mm to 0.12 mm that is equivalent to the thickness of the light transmitting layer 11. Then, the reproducing light 99 is conducted to a track either the groove portion "G" or the land portion "L" (the step P3). The tracking is conducted by selecting a portion previously decided. However, as mentioned above, selecting the land portion "L" is most preferable. The differential signal "(Ia+Ib)−(Ic+Id)" in the radial direction is produced from reflected light that is reflected by the microscopic pattern 21 and picked up by the pickup 50 (the step P4). The produced differential signal is transmitted to the reference clock demodulator 57 and a clock signal is produced (the step P5).

Further, the clock signal is transmitted to the controller 60 so as to control a number of revolutions of the turntable 53 and controls revolution of the motor 51 by way of the servo controller 52 (the step P6).

The differential signal is transmitted to the auxiliary information demodulator 56 at the same time, and an auxiliary information is read out (the step P7). At this moment, an address information out of various auxiliary information is extracted from the extracted auxiliary information (the step P8). The extracted address information is compared with another address information that is utilized for indexing data inputted to the controller 60. In case that the extracted address information does not coincide with the other address information, the controller 60 sends a signal to the servo controller 52 and instructs the servo controller 52 to search. The searching is conducted such that a number of revolutions of the motor 51 is reset to a specific number of revolutions, which corresponds to a radius between the motor 51 and the pickup 50, according to movement in the radial direction of the pickup 50 while scanning the movement of the pickup 50 in the radial direction.

Furthermore, during a process of scanning, an address information outputted from the address information demodulator 56, which receives the differential signal from the pickup 50, is compared with a predetermined address information. The searching is continued until they coincide with each other (the step P9). When they coincide, scanning in the radial direction is interrupted and reproduction is switched over to continuous reproduction of the total sum signal "(Ia+Ib+Ic+Id)" (the step P10). An output from the demodulator 54 in which the total sum signal "(Ia+Ib+Ic+Id)" is inputted, is resulted in demodulating a data stream that is obtained by indexing, and the output is inputted to the I/F 55. Finally, the I/F 55 outputs a signal externally in accordance with controlling conducted by the controller 60.

As mentioned above, according to the second reproducing apparatus 41 and the reproducing method that is composed of the steps P1 through P10 of the present invention, an information recording medium 1 is loaded on.

Further, the second reproducing apparatus 41 and the reproducing method is designed for coping with the reproducing light 99, which is generated by the light emitting element 50a having a single wavelength $\lambda$ within the range of 350 nm to 450 nm and the objective lens 50b having the numerical aperture NA of 0.75 to 0.9. Therefore, the second reproducing apparatus 41 and the reproducing method can suitably reproduce information that is recorded in the recording layer 12 of the information recording medium 1. At the same time, they can perform index reproduction of a data stream by reproducing an auxiliary information thereto.

Furthermore, in case that an auxiliary information contains information related to reproduction laser power other than an address information, it is acceptable for a power value of the light emitting element 50a to be set or to be renewed by extracting the information related to reproduction laser power from the read-out auxiliary information.

An NA of the objective lens 50b is large, so that spherical aberration caused by thickness error of the light transmitting layer 11 of the information recording medium 1 becomes extremely large. Consequently, spherical aberration is compensated by adjusting an optical system in the pickup 50. Actually, in the step P2, for example, the spherical aberration can be compensated by adjusting the optical system to maximize an output of differential signal after focusing. If a corrective lens not shown is installed in the pickup 50, for example, it is possible to find a maximum point of differential signal by changing a distance between the corrective lens and another optical element such as the objective lens 50b.

Further, compensating spherical aberration can be conducted by observing a total sum signal. More specifically, in the step P10, the compensation can be realized by adjusting an optical system as mentioned above such that an output of the total sum signal is adjusted to be maximal.

With respect to spherical aberration that is compensated by observing a differential signal, it is also acceptable for compensation to be conducted by observing a differential signal of a microscopic pattern that is disposed in a predetermined specific area.

Further, in case that spherical aberration is compensated by observing a total sum signal, it is also acceptable that test data is recorded on a land portion "L" or a groove portion "G" in a predetermined specific area and the compensation is conducted by observing a total sum signal of the test data. Particularly, in case that the information recording medium 1 is in disciform, these compensating methods of spherical aberration are desirable to be performed in an area, where a user never records or reproduces data, such as an area allocated in the inner circumference area.

With referring to FIG. 36, a recording apparatus for recording any of the information recording mediums 1 through 5 according to the present invention is explained, wherein the information recording medium 1 represents the information recording mediums 1 though 5 generically for simplifying the explanation hereinafter.

Figure 36:
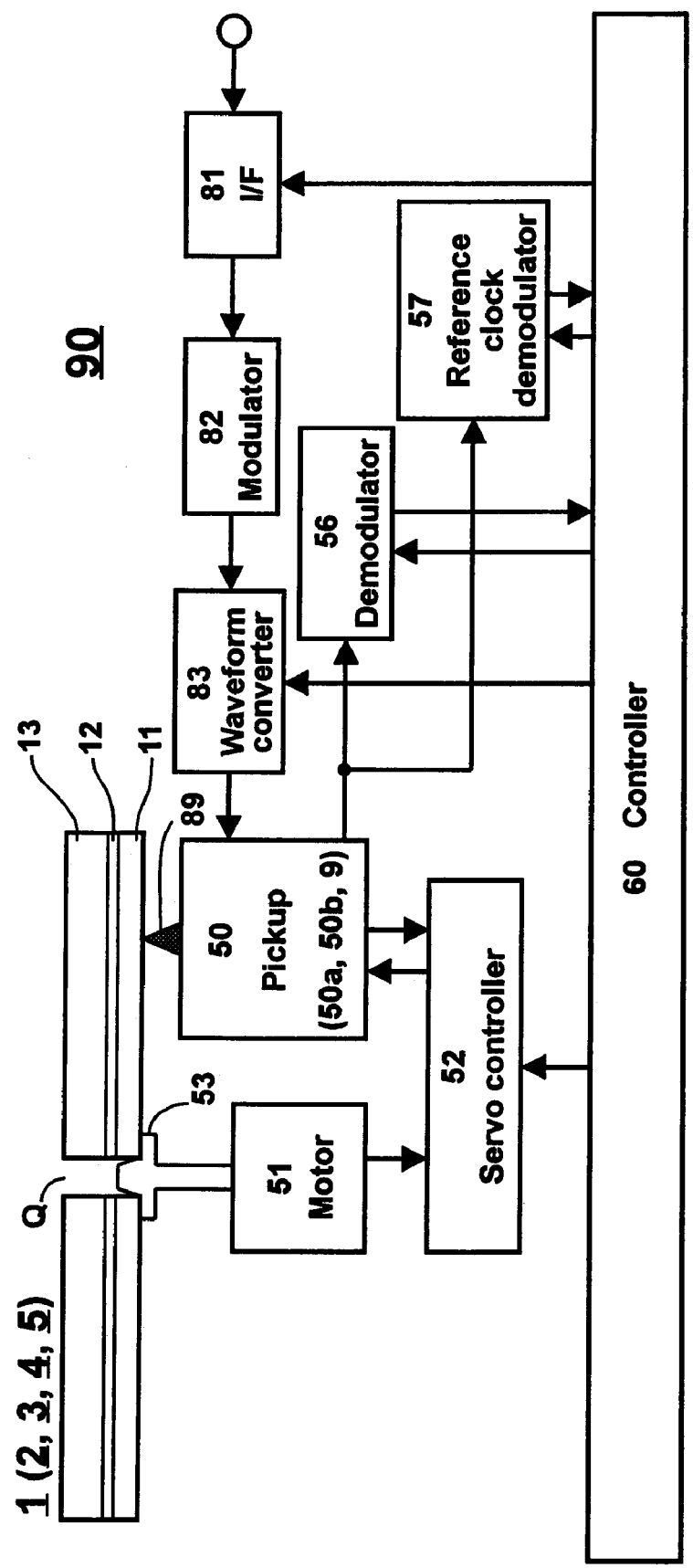
FIG. 36 is a block diagram of a recording apparatus of an information recording medium according to an embodiment of the present invention.

FIG. 36 is a block diagram of a recording apparatus 90 for recording an information recording medium 1 according to the present invention. The recording apparatus 90 is an apparatus for recording information in the recording layer 12 of the information recording medium 1, and composed of at least a recording unit provided with a light emitting element, which emits recording light having a wavelength λ of 350 nm to 450 nm and has a noise level of less than RIN −125 dB/Hz, and an objective lens having a numerical aperture NA of 0.75 to 0.9, and a control unit, which controls the recording unit so as to record the information recording medium 1 by irradiating the recording light exclusively on a land portion "L" of the information recording medium 1.

Actually, the recording apparatus 90 is similar to the second reproducing apparatus 41 shown in FIG. 34 except for followings: the demodulator 54 is replaced by a modulator 82 for modulating an original data and a waveform converter 83 for transforming a modulated signal from the modulator 82 into a waveform suitable for recording on an information recording medium 1, which are connected in series, and the I/F 55 is replaced by an interface (I/F) 81 for receiving an external signal to be recorded. Other components are exactly the same as those of the second reproducing apparatus 41, so that explanations for the same functions and operations are omitted.

Further, the recording apparatus 90 is an apparatus for recording a computer data, for example, at a predetermined address newly or recording a HDTV program or a movie continuously from a predetermined address by a video recorder.

The modulator 82 is such a modulator that converts an 8-bit original data into 16 bits, in case of the EFM plus modulation method. The waveform converter 83 transforms a modulated signal that is received from the modulator 82 into another waveform that is suitable for recording on an information recording medium 1. Actually, the waveform converter 83 is such a converter that converts a modulated signal into a recording pulse, which satisfies a recording characteristic of the recording layer 12 of the information recording medium 1. In case that the recording layer 12 is composed of a phase change material, for example, a so-called multi-pulse is formed. In other words, the modulated signal is divided into a unit of channel bit or less than the unit of channel bit, and recording power is changed into a rectangular waveform, wherein peak power, bottom power, erase power and a pulse time duration, which constitute a multi-pulse, are adjusted in accordance with a direction of the controller 60.

With referring to FIGS. 36 and 37, an operation of the recording apparatus 90 is explained next.

Figure 37:
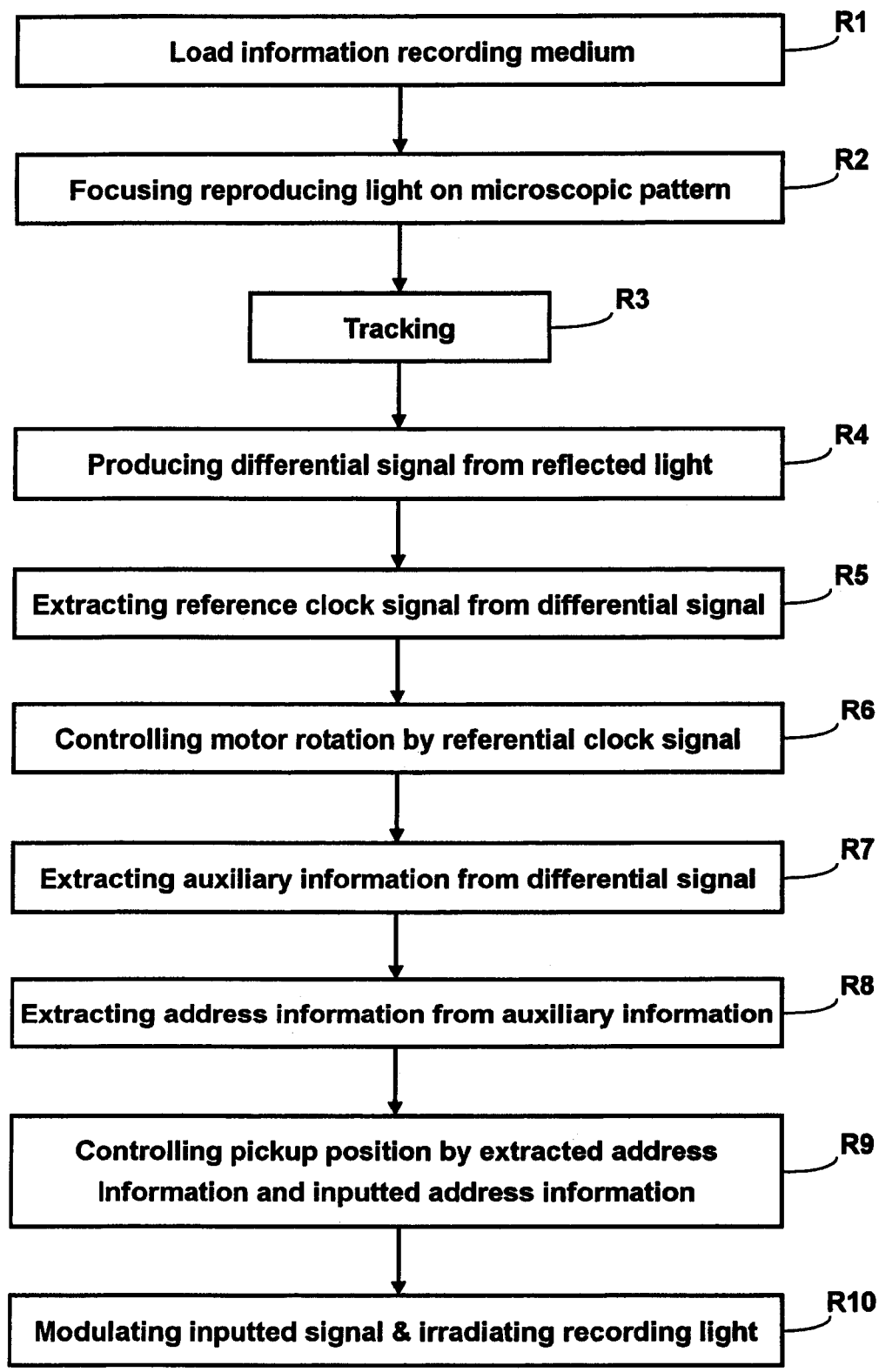
FIG. 37 is a flow chart showing a recording method of an information recording medium according to an embodiment of the present invention

FIG. 37 is a flow chart showing a recording method of an information recording medium 1 by using the recording apparatus 90 shown in FIG. 36. As shown in FIG. 37, an operation of the recording apparatus 90, that is, a recording method of the information recording medium 1 by using the recording apparatus 90 is composed of at least following steps. The information recording medium 1 is loaded on the turntable 53 of the recording apparatus 90 (step R1). The reproducing light 99 from the pickup 50 is converged and focused on the microscopic pattern 20 formed in the information recording medium 1 (step R2), and is made tracking (step R3). A differential signal is produced from reflected reproducing light 99 that is reflected by the recording later 12 (step R4). A reference clock signal is extracted from the differential signal (step R5). Revolution of the motor 51 is controlled by the extracted reference clock signal (step R6). An auxiliary information is extracted from the differential signal (step R7). An address information is extracted from the extracted auxiliary information (step R8). A position of the pickup 50 is controlled by the extracted address information and another address information inputted externally (step R9). An inputted signal is demodulated and the recording light 89 is emitted (step R10).

More specifically, the information recording medium 1 is loaded on the turntable 53 that can control revolution of the information recording medium 1 to the circumferential direction (the step R1). Succeedingly, the reproducing light 99 is emitted from the light emitting element 50a of the pickup 50 through the objective lens 50b and converged on the microscopic pattern 20 of the information recording medium 1 (the step R2). More accurately, the reproducing light 99 is focused on the microscopic pattern 20, which is disposed at a depth of 0.07 mm to 0.12 mm that is equivalent to the thickness of the light transmitting layer 11. Then, the reproducing light 99 is conducted to a track either the groove portion "G" or the land portion "L" (the step R3). The tracking is conducted by selecting a portion previously decided. However, as mentioned above, selecting the land portion "L" is most preferable. The differential signal "(Ia+Ib)−(Ic+Id)" in the radial direction is produced from reflected reproducing light 99 that is reflected by the recording layer 12 and picked up by the pickup 50 (the step R4). The produced differential signal is transmitted to the reference clock demodulator 57 and a clock signal is produced (the step R5).

Further, the clock signal is transmitted to the controller 60 so as to control a number of revolutions of the turntable 53 and controls revolution of the motor 51 by way of the servo controller 52 (the step R6).

The differential signal is transmitted to the auxiliary information demodulator 56 at the same time, and an auxiliary information is read out (the step R7). At this moment, an address information out of various auxiliary information is extracted (the step R8). The extracted address information is compared with another address information that is utilized for indexing data, which is inputted to the controller 60. In case that the extracted address information does not coincide with the other address information, the controller 60 sends a signal to the servo controller 52 and instructs the servo controller 52 to search. The searching is conducted such that a number of revolutions of the motor 51 is reset to a specific number of revolutions, which corresponds to a radius between the motor 51 and the pickup 50, according to movement in the radial direction of the pickup 50 while scanning the movement of the pickup 50 in the radial direction.

Furthermore, during a process of scanning, an address information outputted from the address information demodulator 56, which receives a differential signal from the pickup 50, is compared with a predetermined address information. The searching is continued until they coincide with each other (the step R9). When they coincide with each other, scanning in the radial direction is interrupted and reproduction is switched over to a recording operation. In other words, data inputted form the I/F 81 is demodulated by the demodulator 82 in accordance with controlling conducted by the controller 60. The modulated data is inputted into the waveform converter 83 in accordance with the controlling conducted by the controller 60 and finally, the demodulated data is transformed into a format that is suitable for recording, and outputted to the pickup 50 (the step R10).

In the pickup 50, the recording light 89 is generated by changing recording power to a predetermined recording power that is designated by the waveform converter 83, and irradiated on the information recording medium 1. Consequently, the original data is recorded at a predetermined address in the information recording medium 1.

In addition thereto, the recording light 89 can read out the differential signal "(Ia+Ib)−(Ic+Id)" in the radial direction and an address can be extracted from the auxiliary information demodulator 56 even while recording. Accordingly, limited area recording as far as an address that is required by a user can be conducted.

As mentioned above, according to the recording apparatus 90 and the recording method that is composed of the steps R1 through R10 of the present invention, an information recording medium 1 is loaded on.

Further, the recording apparatus 90 and the recording method is designed for coping with the reproducing light 99 and the recording light 89, which are generated by the light emitting element 50*a* having a single wavelength λ within the range of 350 nm to 450 nm and the objective lens 50*b* having the numerical aperture NA of 0.75 to 0.9. Therefore, the recording apparatus 90 and the recording method can suitably record information in the recording layer 12 of the information recording medium 1. At the same time, they can reproduce even auxiliary information and can conduct random indexing for recording.

Furthermore, in case that an auxiliary information contains information related to recording strategy for generating multi-pulse such as peak power, erase power, and pulse interval other than an address information, it is acceptable that a setting value of the waveform converter 83 is designated or renewed by extracting these strategic information from the read-out auxiliary information.

More, it is possible to combine the above-mentioned recording method and the reproducing method together. For example, an additional step of confirming whether or not recording on an information recording medium 1 is conducted correctly by reproducing the recorded information recoding medium 1 can be added after the information recording medium 1 is recorded by the recording method that is composed of the steps R1 through R10. The additional step of confirming is conducted by reproducing the recorded area by the reproducing light 99, and by comparing data to be recorded and another data to be reproduced.

Moreover, by extracting an address information from an auxiliary information, the additional step of confirming can be compared with the address information hereat. In case that data not recorded properly is found by the comparing, an address information corresponding to the original data is recorded in a specific area at the inner circumference area and/or the outer circumference area of the information recording medium 1. In other words, in case that an error is found when confirming by reproducing after recording, the address information is recorded in a specific area of the information recording medium 1. Consequently, an address information having error can be recognized by referring to the specific area when reproducing data recorded by a user.

Further, it is possible to reproduce the recorded data excluding only data corresponding to the address information.

Accordingly, reproduction without error can be enabled.

Furthermore, in case that data not recorded properly is found by the comparing, it is acceptable that the defective data is recorded in another area having another address information together with recording an address information corresponding to the original data in a specific area at the inner circumference area and/or the outer circumference area of the information recording medium 1. By this process, not only reproducing without error but also compensating a defective part can be conducted, so that it is more effective.

The light emitting element 50*a* that is used in the first and second reproducing apparatuses 40 and 41 is detailed hereupon. The light emitting element 50*a* is defined as either a semiconductor laser of gallium nitride system compound or a laser having a second harmonic generating element. However, these individual laser elements have a particular laser noise respectively. In the case of a semiconductor laser of gallium nitride system compound, particularly, its noise level is relatively high. According to our measurement for the noise level, a laser RIN (Relative Intensity Noise) of a laser having a second harmonic generating element is −134 dB/Hz that is a similar noise level to that of a red-light emitting semiconductor laser having a wavelength of 650 nm approximately being used for a DVD system.

On the other hand, in case of a semiconductor laser of gallium nitride system compound, its laser RIN is −125 dB/Hz. That is, the laser RIN of the semiconductor laser of gallium nitride system compound is larger that that of the laser having a second harmonic generating element by 9 dB. The noise is added to a reproduced signal from the information recording medium 1 and results in deteriorating an S/N of the reproduced signal extremely. In other words, in case that a semiconductor laser of gallium nitride system compound is adopted for the light emitting element 50*a* of the first and second reproducing apparatuses 40 and 41, a signal characteristic is deteriorated. Therefore, a guide for designing DVD system that has been obtained by us can not be applied for the first and second reproducing apparatuses 40 and 41 by just shifting the guide proportionally.

Accordingly, in view of that a particular noise inherent in a laser is added to a reproduced signal from the information recording medium 1 when reproduced by these first and second reproducing apparatuses 40 and 41, it is essential for an information recording medium to have a signal characteristic in which a worsen component caused by the particular noise inherent in a laser is compensated.

With respect to the information recording medium 5 according to the fifth embodiment of the present invention, by changing a depth of the microscopic pattern 20, that is, height difference between a groove portion "G" and a land portion "L" formed on the substrate 13, several variations of the information recording medium 5 are manufactured. Those information recording mediums are reproduced by the second reproducing apparatus 41 that is installed with a semiconductor laser of gallium nitride system compound having a laser RIN of −125 dB/Hz as the light emitting element 50*a*, and a relation between reflectivity and an error rate of reproduced signal is studied.

In addition thereto, recording is conducted by the recording apparatus 90 under an ideal recording condition such that an error rate decreases maximally.

Reflectivity could be defined as an output of reproduced signal. In case that the recording layer 123 is constituted by a phase change material, reflectivity is an index correlating to brightness of the recording layer 123 in a crystalline state. More specifically, an information recording medium 5 is recorded with a modulation signal of the above-mentioned (d, k) code. The information recording medium 5 is loaded in the second reproducing apparatus 41 so as to be flat or without declining, and then a recorded signal is reproduced. The reproduced signal of a DC system outputted from the pickup 50 is connected to an oscilloscope, and reflectivity is obtained from a signal having the maximum mark length (k+1). In the case of the 17 PP modulation, for example, in which "d" and "k" is "one" and "seven" respectively, a minimum mark length (d+1) is 2T and a maximum mark length (k+1) is 8T. Therefore, reflectivity is calculated from an absolute reflectivity calibration line by measuring I8H.

Further, an error rate is obtained by measuring a reproduced signal obtained through the demodulator 54.

Figure 38:
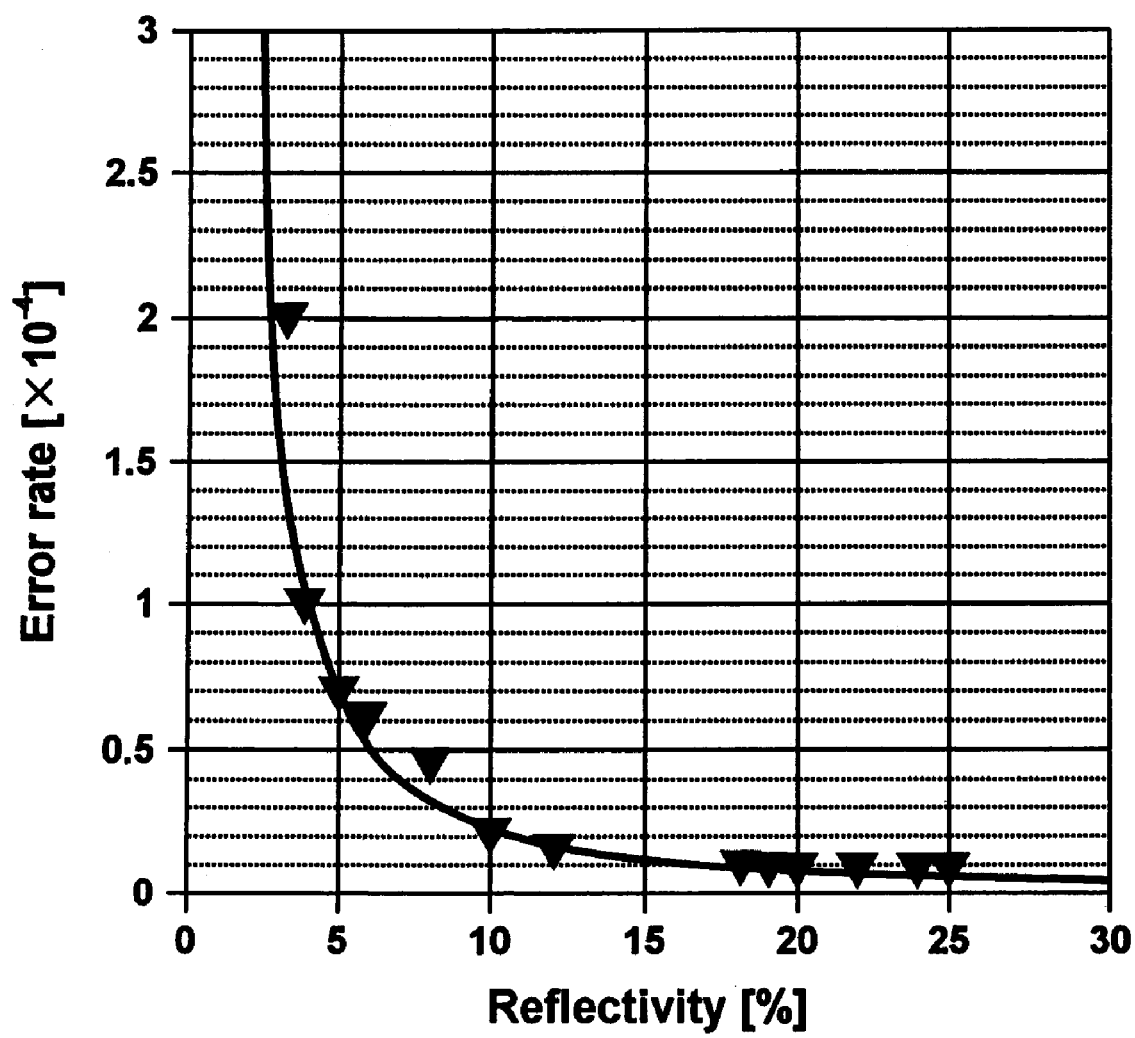
FIG. 38 is a graph exhibiting a relation between reflectivity and error rate.

Result of measuring modulated amplitude and error rate by the second reproducing apparatus 41 after recording the 17PP modulation by the recording apparatus 90 is shown in FIG. 38.

FIG. 38 is a graph exhibiting a relation between reflectivity and error rate. As shown in FIG. 38, there is existed an apparent mutual relation between reflectivity and error rate. It is apparent that an error rate drastically increases in accordance with reflectivity that decreases. In case that a practical error rate is defined as $3 \times 10^{-4}$ that is the figure specified by the several standards such as the DVD Standard, necessary reflectivity is more than 2%.

Further, the information recording medium 5 may warp by temperature change in the surrounding of use. Consequently, with assuming that the information recording medium 5 inclines by the order of 0.7 degree as the same angle as a DVD disc, an error rate increases more than coma aberration caused compositively by conditions such that a wavelength λ is within a range of 350 nm to 450 nm, a numerical aperture NA is within a range of 0.75 to 0.9, and a thickness of the light transmitting layer 11 is within a range of 0.07 mm to 0.12 mm.

Furthermore, in case that the information recording medium 5 is inclined by 0.7 degree, it is found by an experimental measurement that the error rate of $3 \times 10^{-4}$ is equivalent to $0.7 \times 10^{-4}$ when the incline is zero degree. In other words, the error rate of $0.7 \times 10^{-4}$ is essential for actual use.

Accordingly, it is found that practical reflectivity is more than 5%.

As mentioned above, in the case that the semiconductor laser of gallium nitride system compound is used as a light emitting element, a noise is added to a reproduced signal. Therefore, by constituting reflectivity of the information recording medium 5 to be more than 5%, an error rate can be practically reduced to the same degree as the DYD Specification.

Further, it is found by an experimental study that the correlation between reflectivity and error rate shown in FIG. 38 can be obtained by any of the modulation methods mentioned above. It is caused by that a signal output almost saturates in any modulation methods when the maximum mark length (k+1) exceeds 6T approximately and becomes a constant value although the maximum mark length (k+1) varies by the modulation methods.

Accordingly, one reflectivity obtained by recording the information recording medium 1 by the 17PP modulation method, wherein "d" is one and "k" is seven, is a same value as the other reflectivity obtained by the EFM plus modulation method, wherein "d" is two and "k" is ten. In the above-mentioned case, if the information recording medium 1 is replaced by the information recording medium 5, the same result is obtained.

In consideration of the reproducing characteristic of the first and second reproducing apparatuses 40 and 41 and the recording apparatus 90, the information recording mediums 1 through 5 according to the present invention of which reflectivity is designated to be more than 5% are explained above.

In consideration of a general characteristic of the first and second reproducing apparatuses 40 and 41 and the recording apparatus 90 of which light emitting element is constituted by a semiconductor laser of gallium nitride system compound, and a physical characteristic of the recording layer 12 or 123, which is constituted by a phase change material, totally, a range of more practical reflectivity of the information recording mediums 1 through 5 that is necessary for realizing a total system is explained next.

A maximal output of semiconductor laser of gallium nitride system compound is merely 30 mW. In a recording apparatus, it is general that an output of a pickup decreases almost one fifth of a laser output due to a coupling efficiency of optical elements applied for a wavelength λ within a range of 350 nm to 450 nm. In other words, a laser power decreases down to 6 mW on the surface of the information recording mediums 1 through 5 although a laser of which output is 30 mW is used.

On the contrary, in order to realize phase change recording in excellent contrast, a recording power is desirable to be designated as high as possible. Therefore, the information recording mediums 1 through 5 are essential to be recorded by the recording power of the order of 6 mW. Consequently, an absorbency index and transmittance of the recording layer 12 or 123 of the information recording mediums 1 through 5 is essential to be a higher value relatively.

A particular noise inherent in a semiconductor laser of gallium nitride system compound and increasing noise in a reproducing apparatus utilizing the semiconductor laser of gallium nitride system compound is mentioned above. However, it is also necessary to pay attention to that a noise depends upon a reproduction laser power when designing a total system. The inventors of the present invention measure a laser noise while changing a reproduction laser power. In case of a semiconductor laser of gallium nitride system compound, it is found that a noise increases in accordance with a laser power that decreases, and found particularly that there is existed a critical point at 0.35 mW of laser power on a surface of information recording medium. In other words, when the laser power is lower than 0.35 mW, a noise increases extremely. Consequently, a reproduction laser power on the surface of the information recording mediums 1 through 5 is essential to be more than 0.35 mW.

With respect to a physical characteristic of the recording layer 12 or 123, there is existed a phenomenon such that the recording layer 12 or 123 is damaged thermally and a recorded record mark "M" vanishes when a reproduction laser power is increased. Accordingly, it is necessary for a reproduction laser power to be set to lower than a particular value. Particularly, in case of reproducing light having a wavelength λ within a range of 350 nm to 450 nm, an energy density of a spot "S" formed on a surface of recording layer is larger than that of a red-light emitting semiconductor laser of which wavelength is within a range of 635 nm to 830 nm, for example. Therefore, a reproduction laser power is set relatively low. However, a permissible range of reproduction laser power is narrowed due to the above-mentioned minimum limit for reproduction laser power. In order to increase tolerance for reproduction laser power, that is, in order to set a reproduction laser power larger, an absorbency index and transmittance of the recording layer 12 or 123 of the information recording mediums 1 through 5 is essential to be a lower value relatively.

As mentioned above, in consideration of the general characteristic of the first and second reproducing apparatuses 40 and 41 and the recording apparatus 90 of which light emitting element is constituted by a semiconductor laser of gallium nitride system compound, and the physical characteristic of the recording layer 12 or 123, which is constituted by a phase change material, totally, it is concluded that an information recording medium in which a record mark "M" on the recording layer 12 or 123 is hardly vanished by a reproduction laser power of more than 0.35 mW is required while a recording power is in the neighborhood of 6 mW. In other words, an absorbency index and transmittance is essential to be within a predetermined range. A sum of an absorbency index and transmittance and reflectivity is one, so that reflectivity is essential to be within a predetermined range as well.

The inventors of the present invention experimentally study a reflectivity range that satisfies the above-mentioned limitations, and find an optimal reflectivity range of 12% to 26%. Hereinafter, an actual manufacturing process of the information recording medium 5 is detailed as embodiments 1 through 7 and comparative examples 1 and 2.

Embodiments 1 through 7

FIG. 39 is a chart exhibiting reflectivity and reproduction characteristics of embodiments 1 through 7 and comparative examples 1 and 2.

Samples of embodiments 1 through 7 and comparative examples 1 and 2 are manufactured as a phase-change recording type information recording medium 5. A polycarbonate plate having a thickness of 1.1 mm is utilized for a substrate 13. A reflective layer 121, a first protective layer 122, a recording layer 123, and a second protective layer 124 is constituted by $Ag_{98}Pd_1Cu_1$, $ZnS-SiO_2$ (80:20 at mol %), $Ge_8Sb_{69}Te_{23}$, and $ZnS-SiO_2$ (80:20 at mol %) respectively, wherein each film thickness of the reflective layer 121, the first protective layer 122, the recording layer 123, and the second protective layer 124 follows figures shown in FIG. 39 respectively. Finally, a polycarbonate plate having a thickness of 0.10 mm is laminated on the second protective layer 124. Consequently, the samples of the embodiments 1 through 7 and the comparative examples 1 and 2 are completed as an information recording medium 5.

An auxiliary information area 200 and a reference clock area 300 is formed continuously on a land portion "L" of each information recording medium 5 without being interrupted. The auxiliary information area 200 is composed of a frequency-shift keying modulation wave 262 of which fundamental wave is a sinusoidal wave (or a cosine wave), wherein a phase difference between a higher frequency section and a lower frequency section is "$2\pi\pm(\pi/2.5)$".

Further, a phase is selected so as to be that the waveform continues at a point where a frequency changes over from higher to lower or vice versa.

Furthermore, the auxiliary information area 200 is recorded geometrically on a sidewall as a wobbling groove.

In addition thereto, a single-frequency wave 350 of which fundamental wave is a sinusoidal wave (or a cosine wave) is recorded geometrically on a sidewall as a wobbling groove.

The information recording medium 5 is designed for recording or reproducing by using a pickup installed with optical elements of which wavelength $\lambda$ is 405 nm and an NA is 0.85, and a pitch "P" between land portions "L" is 0.32 μm.

Further, the reflective layer 121 and the recording layer 123 is formed by the DC sputtering process, and the first and second protective layers 122 and 124 are formed by the AC sputtering process in an atmosphere of argon gas of 5 mTorr.

Furthermore, a vacuum chamber used for sputtering is sufficiently exhausted as low as less than $1\times10^{-6}$ Torr.

More, each completed information recording medium 5 is initialized by irradiating a laser beam on the recording layer 123 through the light transmitting layer 11, and the recording layer 123 is phase-changed from an amorphous state in lower reflectivity to a crystalline state in higher reflectivity.

Each information recording medium 5 is loaded on the recording apparatus 90 equipped with a pickup installed with optical elements of which wavelength $\lambda$ is 405 nm and an NA is 0.85. A recording signal is recorded on a land portion "L" with a modulation signal of which minimum mark length (equal to 2T) is designated to be 0.149 μm by the 17PP modulation method, wherein "d" and "k" is "one" and "seven" respectively.

Further, a differential signal reproduced from the reference clock area 300 of each information recording medium 5 is transmitted to the reference clock demodulator 57 and revolution of the turntable 53 is controlled by the obtained reference clock. By controlling the turntable 53 as mentioned above, a record mark "M" having a desired length is conducted to be recorded accurately. With respect to a recording condition, a recording peak power is 6.0 mW, a bias power is 2.6 mW, a bottom power between multi-pulses and a cooling pulse is 0.1 mW, and a linear velocity is 5.3 m/s respectively.

Furthermore, the recording is conducted by a signal, which is transformed into a so-called multi-pulse by the waveform converter 83, and by adopting a 3-level power modulation method, wherein each pulse width of a head pulse and a succeeding pulse is designated to be 0.4 times the recording period 1T and a pulse width of cooling pulse is designated to be 0.4 times the recording period 1T.

Succeedingly, the information recording medium 5 is loaded on the second reproducing apparatus 41 shown in FIG. 34 equipped with the pickup 50 having a wavelength $\lambda$ of 405 nm and a numerical aperture NA of 0.85, and a land portion "L" is reproduced.

With respect to evaluation items, there is existed reflectivity and modulated amplitude that is equal to "(I8H−I8L)/I8H", which are obtained from a total sum signal, reproduction laser power at limit of deterioration, reproduction error rate of record mark "M" obtained from the demodulator 54, and reproduction error rate of address information recorded in the auxiliary information area 200 that is obtained from the auxiliary information demodulator 56. The reproduction laser power at limit of deterioration is obtained as follows: at first reproducing the information recording medium 5 by the reproduction laser power of 0.3 mW, then measuring a laser power that deteriorates reproduction by gradually increasing reproduction laser power from 0.3 mW.

With respect to the reproduction laser power at limit of deterioration and the reproduction error rate of record mark "M" and the error rate of address information out of these evaluation items, they are judged by comparing with a reference value and decided whether or not they are acceptable.

A reference value of reproduction laser power at limit of deterioration is designated to be 0.35 mW. Each sample of the embodiments 1 through 7 and comparative examples 1 and 2 is judged whether it is reproduced by the laser power of more than 0.35 mW or less. Consequently, as shown in FIG. 39, a sample of which reproduction laser power at limit of deterioration is more than 0.35 mW is judged as acceptable and marked "Good". On the contrary, another sample of which reproduction laser power at limit of deterioration is less than 0.35 mW is judged as defective and marked "Not".

Further, with respect to a reference value of reproduction error rate of reproduced signal, samples of which reproduction error rate is less than $0.7 \times 10^{-4}$ are judged as acceptable and marked "Good", and other samples of which reproduction error rate is more than $0.7 \times 10^{-4}$ are judged as defective and marked "Not".

Furthermore, with respect to a reference value of address error rate, samples of which address error rate is less than 5% are judged as acceptable and marked "Good", wherein 5% is a limit of restoring an address information by error correction. On the contrary, other samples of which address error rate is more than 5% is judged as defective.

In addition thereto, each figure of reflectivity and modulated amplitude and reproduction laser power at limit of deterioration, and each judgement of reproduction laser power at limit of deterioration, error rate of reproduced signal, and address error rate with respect to the embodiments 1 through 7 and the comparative examples 1 and 2 is exhibited in FIG. 39.

As shown in FIG. 39, the embodiments 1 through 7, which are manufactured by designating reflectivity to be within a range of 12% to 26%, are excellent in every evaluation items, so that they can satisfy performance as a total system.

COMPARATIVE EXAMPLE 1

A sample of the comparative example 1 is manufactured by designating reflectivity to be 11.0% and evaluated the same items as the samples of the embodiments 1 through 7. Result of the evaluation is shown in FIG. 39. According to the evaluation, reproduction is deteriorated at 0.34 mW. Therefore, it is concluded that the recording layer 123 is too sensitive. Consequently, an information recording medium of which reflectivity is less than 11% is not suitable for a total system.

COMPARATIVE EXAMPLE 2

A sample of the comparative example 2 is manufactured by designating reflectivity to be 28.2% and evaluated the same items as the samples of the embodiments 1 through 7. Result of the evaluation is shown in FIG. 39. In the case of the comparative example 2, reproduction is not deteriorated. However, a reproduction error rate is excessively, so that the comparative example 2 is defective. The defect is caused by that modulated amplitude is too small as small as 0.389. In other words, sensitivity of the recording layer 123 is too low, so that it is supposed that recording in sufficient contrast is not conducted. Consequently, an information recording medium of which reflectivity is more than 28% is not suitable for a total system.

According to the evaluation result of the embodiments 1 through 7 and the comparative examples 1 and 2, reflectivity that is suitable for establishing a total system is supposed to be within a range of 12% to 26%. The 17PP modulation, where "d" is one and "k" is seven, is applied for the embodiments 1 through 7 and the comparative examples 1 and 2 as a recording signal. However, applying the "D4, 6" modulation, where "d" is one and "k" is nine, also obtains the same result.

Further, applying the "D8-15" modulation, where "d" is two and "k" is ten, brings the same result as well.

Furthermore, in the embodiments 1 through 7, the auxiliary information area 200 is constituted by the frequency-shift keying modulation wave 262. However, the phase-shift keying modulation wave 272 also brings the same result. The amplitude-shift keying modulation wave 252 brings the same result as well.

More, in the embodiments 1 through 7, the auxiliary information area 200 and the reference clock area 300 is continuously formed without interruption. However, in case that the auxiliary information area 200 is connected to the reference clock area 300 with sandwiching a linear groove having a length of 1 mm, the recording apparatus 90 can not conduct recording. Because, a reference clock can not be extracted from the linear groove, so that revolution servo can not be applied to the turntable 53.

Moreover, in the embodiments 1 through 7, the auxiliary information area 200 and the reference clock area 300 is formed on a land portion "L". In case that the auxiliary information area 200 and the reference clock area 300 is formed on a groove portion "G", the recording apparatus 90 can not conduct recording. Because, the recording light 89 of the recording apparatus 90 is focused on the land portion "L", so that a reproduced signal from the reference clock area 300 is interfered by a reference clock signal twice. Consequently, an extremely unstable clock can only be extracted.

By designating reflectivity to be more than 5%, particularly, to be within a range of 12% to 26% as mentioned above, the information recording mediums 1 through 5 according to the present invention can compensate the problem of adding a particular noise inherent in a semiconductor laser of gallium nitride system compound utilized for the first and second reproducing apparatuses 40 and 41 to a reproduced signal.

A method of regulating modulated amplitude to be within a predetermined range as a second method of compensating the problem of adding a particular noise inherent in a semiconductor laser of gallium nitride system compound to a reproduced signal is explained next.

By changing each material and each layer thickness of the reflective layer 121, the first protective layer 122, the recording layer 123 and the second protective layer 124 of the information recording medium 5 according to the fifth embodiment of the present invention, several samples of information recording mediums are manufactured. These samples are reproduced by the first reproducing apparatus 40 in which a semiconductor laser of gallium nitride system compound having a laser RIN of −125 dB/Hz is adopted as the light emitting element 50*a*, and evaluated with respect to a relation between modulated amplitude and an error rate of reproduced signal. Recording hereupon is conducted by the recording apparatus 90 under most ideal recording conditions so as to decrease an error rate to the utmost limit.

Reproduction modulated amplitude is an output of reproduced signal. In case that the recording layer 123 is constituted by a phase change material, modulated amplitude is an index correlating to reflectivity contrast between crystal and amorphous. More specifically, the modulated amplitude is obtained by recording a modulation signal of the (d, k) code in the information recording medium 5 by the recording apparatus 90.

The information recording medium 5 is loaded on the second reproducing apparatus 41 in flat, that is, without being inclined and a recorded signal is reproduced, and then a reproduced signal in DC system outputted from the pickup 50 is connected to a oscilloscope. Consequently, modulation amplitude is obtained from a signal (k+1) having the maximum mark length that is utilized for the (d, k) coding method. In the case of the "8-16" modulation method that is utilized for the DVD system, for example, the maximum mark length is 14T. Therefore, by measuring I14L and I14H as specified in the JIS Standard X6241/1997, modulated amplitude, that is, (I14H−I14L)/I14H is calculated.

On the other hand, in the case of the 17PP modulation method, the maximum mark length is 8T. Therefore, by measuring I8L and I8H, modulated amplitude, that is, (I8H−I8L)/I8H is calculated.

Further, in the case of the "D4, 6" modulation method, the maximum mark length (k+1) is 10T. Therefore, by measuring I10L and I10H, modulated amplitude, that is, (I10H−I10L)/I10H is calculated.

Furthermore, an error rate is obtained by measuring a reproduced signal obtained through the demodulator 54.

Figure 40:
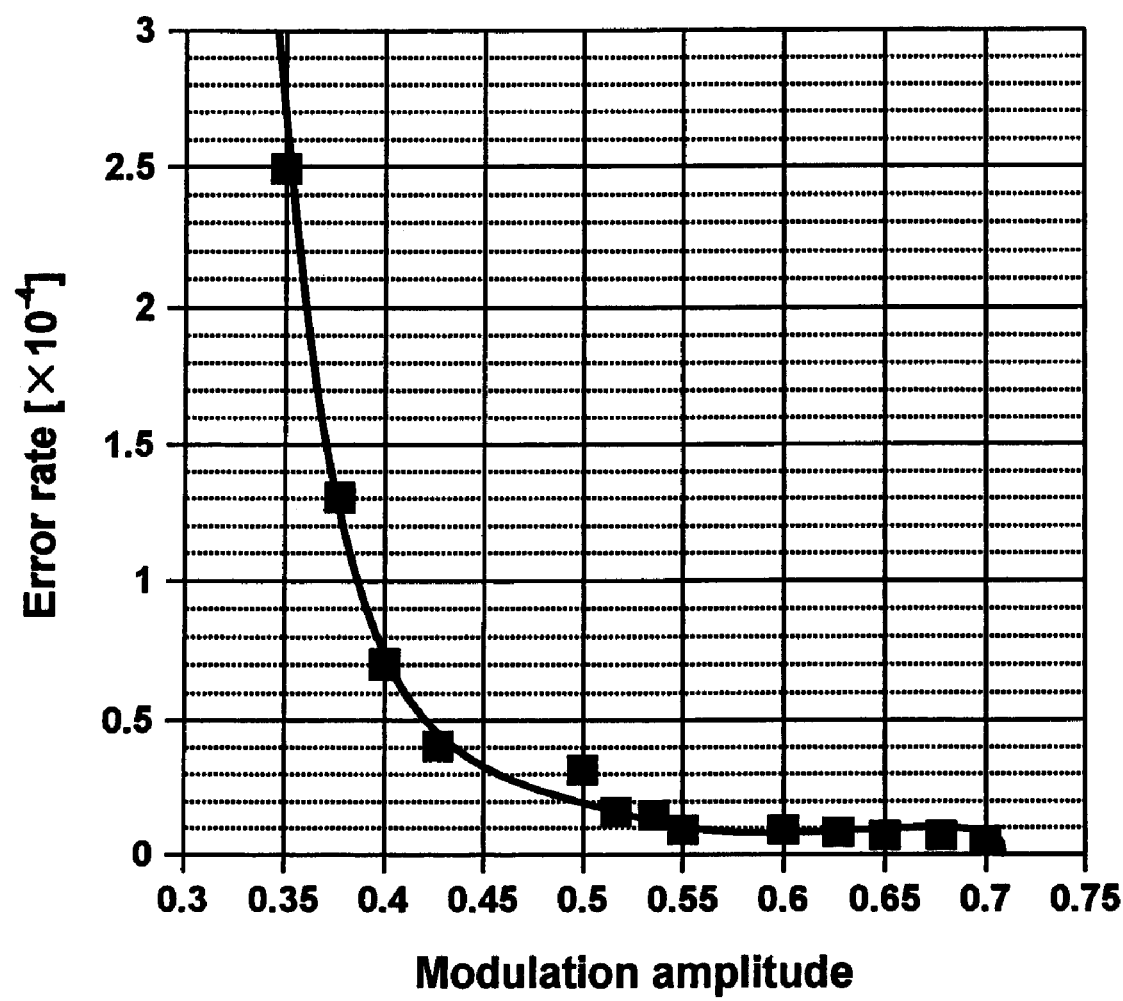
FIG. 40 is a graph exhibiting a relation between modulated amplitude and error rate.
Figure 41:
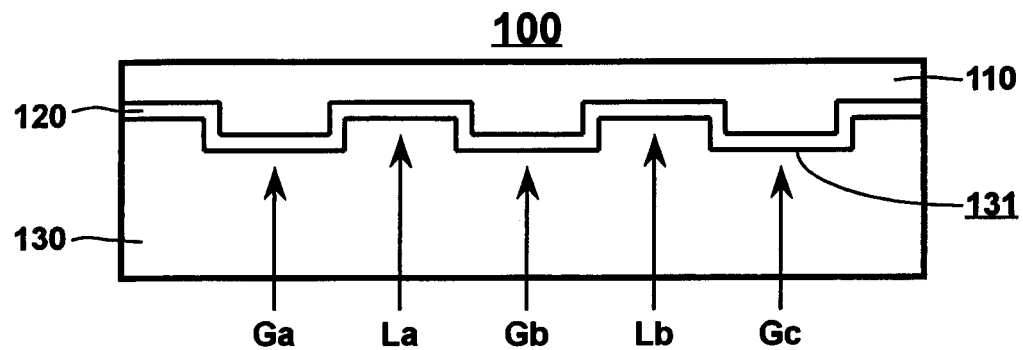
FIG. 41 is a cross sectional view of a conventional information recording medium according to the prior art.
Figure 42:
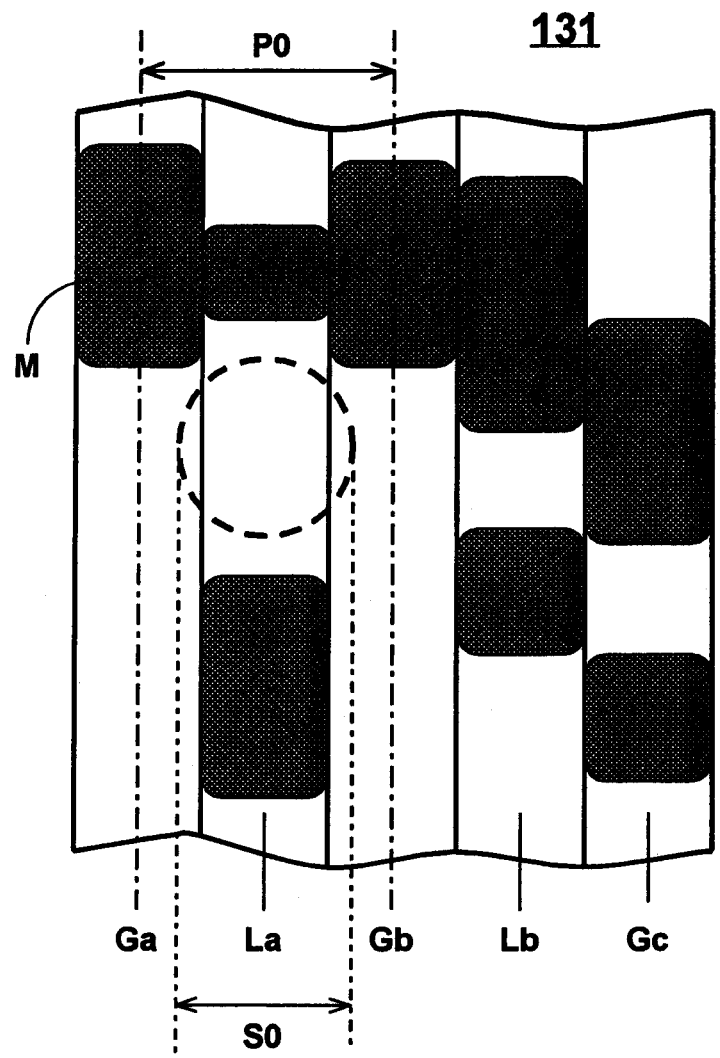
FIG. 42 is an enlarged plan view of the information recording medium shown in FIG. 41.

Result of measuring modulated amplitude and an error rate by the first reproducing apparatus 40 after recording a signal modulated by the 17PP modulation method by the recording apparatus 90 is shown in FIG. 40.

FIG. 40 is a graph exhibiting a relation between modulated amplitude and error rate. As shown in FIG. 40, there is existed an apparent relationship between modulated amplitude and error rate. It is apparent that an error rate drastically increases in accordance with modulated amplitude that decreases. In case that a practical error rate is defined as $3 \times 10^{-4}$ that is the figure specified by the several standards such as the DVD Standard, necessary modulated amplitude is more than 0.34.

Further, an information recording medium 5 may warp by temperature change in the surrounding of use. Consequently, with assuming that the information recording medium 5 inclines by the order of 0.7 degree that is the same angle as a DVD disc, an error rate increases more than coma aberration caused compositively by conditions such that a wavelength λ is within a range of 350 nm to 450 nm, a numerical aperture NA is within a range of 0.75 to 0.9, and a thickness of the light transmitting layer 11 is within a range of 0.07 mm to 0.12 mm.

When the information recording medium 5 is inclined by 0.7 degree, it is found by an actual measurement that the error rate of $3 \times 10^{-4}$ is equivalent to $0.7 \times 10^{-4}$ when the incline is zero degree. In other words, the error rate of $0.7 \times 10^{-4}$ is essential in consideration of incline while actual use.

Accordingly, it is found that practical modulated amplitude is more than 0.4.

As mentioned above, in consideration of the phenomenon of adding noise when a semiconductor laser of gallium nitride system compound is used for a light emitting element, an error rate can be suppressed to the same level as the DVD Standard and becomes a practical level if an information recording medium 5 is constituted such that modulated amplitude is more than 0.4.

In addition thereto, with respect to the correlation between modulated amplitude and error rate as shown in FIG. 40, it is experimentally understood that almost similar results are obtained from any modulation methods applied for the above-mentioned (d, k) code. A signal output is almost saturated by any of these modulation methods when the maximum mark length exceeds 6T although a maximum mark length (k+1) may vary by the modulation method. Consequently, a value of modulated amplitude obtained from an information recording medium 1 recorded by the 17PP modulation method, for example, is the same as that obtained from the information recording medium 1 recorded by the "D4, 6" modulation method. The same results are obtained although the information recording medium 1 is replaced with an information recording medium 5.

Further details are explained as embodiments 8 through 12 next. In addition, samples of comparative examples 3 through 5 are also manufactured for the purpose of comparison.

Embodiment 8

A sample of an embodiment 8 is manufactured as a phase-change recording type information recording medium 5. A polyearbonate plate having a thickness of 1.1 mm is utilized for a substrate 13. A reflective layer 121, a first protective layer 122, a recording layer 123, and a second protective layer 124 is constituted by $Ag_{98}Pd_1Cu_1$, ZnS—$SiO_2$ (80:20 at mol %), Ag—In—Sb—Te, and ZnS—$SiO_2$ (80:20 at mol %) respectively. Finally, a polycarbonate plate having a thickness of 0.10 mm is laminated on the second protective layer 124 as a light transmitting layer 11.

The sample of the embodiments 8 (hereinafter simply referred to as embodiment 8) is manufactured as an information recording medium 5.

An auxiliary information area 200 and a reference clock area 300 is formed continuously on a land portion "L" of the information recording medium 5 of the embodiment 8 without being interrupted. The auxiliary information area 200 is composed of a frequency-shift keying modulation wave 262 of which fundamental wave is a sinusoidal wave (or a cosine wave), wherein a phase difference between a higher frequency section and a lower frequency section is "$2\pi \pm (\pi/2.5)$".

Further, a phase is selected so as to be that the waveform continues at a point where a frequency changes over from higher to lower or vice versa.

Furthermore, the auxiliary information area 200 is recorded geometrically on a sidewall as a wobbling groove.

In addition thereto, a single-frequency wave 350 of which fundamental wave is a sinusoidal wave (or a cosine wave) is recorded geometrically on a sidewall as a wobbling groove.

The embodiment 8 is designed for recording or reproducing by using a pickup installed with optical elements of which wavelength λ is 405 nm and an NA is 0.85. A pitch "P" between land portions "L" of the embodiment 8 is 0.32 μm.

Further, the reflective layer 121 and the recording layer 123 is formed by the DC sputtering process, and the first and second protective layers 122 and 124 are formed by the AC sputtering process in an atmosphere of argon gas of 5 mTorr.

Furthermore, a vacuum chamber used for sputtering process is sufficiently exhausted as low as less than $1 \times 10^{-6}$ Torr.

More, the embodiment 8 is initialized by irradiating a laser beam on the recording layer 123 through the light transmitting layer 11, and the recording layer 123 is phase-changed from an amorphous state in lower reflectivity to a crystalline state in higher reflectivity.

The embodiment 8 is loaded on the recording apparatus 90 equipped with a pickup installed with optical elements of which wavelength λ is 405 nm and an NA is 0.85. A recording signal is recorded on a land portion "L" with a modulation signal of which minimum mark length that is equal to 2T is designated to be 0.149 μm by the 17PP modulation method.

Further, a differential signal reproduced from the reference clock area 300 of the embodiment 8 is transmitted to the reference clock demodulator 57, and then revolution of the turntable 53 is controlled by the obtained reference clock. By controlling the turntable 53 as mentioned above, a record mark "M" having a desired length is conducted to be recorded accurately.

With respect to a recording condition, a recording peak power is 6.0 mW, a bias power is 2.6 mW, a bottom power between multi-pulses and a bottom power of a cooling pulse is 0.1 mW respectively, and a linear velocity is 5.3 m/s.

Furthermore, the recording is conducted by a signal, which is transformed into a so-called multi-pulse by the waveform converter 83. A 3-level power modulation method is adopted, wherein each pulse width of a head pulse and a succeeding pulse is designated to be 0.4 times the recording period 1T and a pulse width of cooling pulse is designated to be 0.4 times the recording period 1T.

Succeedingly, the embodiment 8 is loaded on the second reproducing apparatus 41 equipped with the pickup 50 having a wavelength λ of 405 nm and a numerical aperture NA of 0.85, and then a land portion "L" is reproduced.

With respect to evaluation items, there is existed modulated amplitude that is equal to "(I8H−I8L)/I8H" and obtained from a total sum signal, reproduction laser power at limit of deterioration, reproduction error rate of record mark "M" obtained from the demodulator 54, and reproduction error rate of address information recorded in the auxiliary information area 200 that is obtained from the auxiliary information demodulator 56.

A signal of which modulated amplitude that is equal to "(I8H−I8L)/I8H" is 0.52 is reproduced from a total sum signal. Succeedingly, an excellent error rate as low as $2 \times 10^{-5}$ is obtained from a reproduced signal outputted from the demodulator 56. Consequently, data that do not come into question in practical application are extracted.

Further, an error rate of address information obtained from the auxiliary information demodulator 56 is the order of 1% in a recorded section, so that address data is restored excellently.

Furthermore, in case that an error rate of address information is less than 5% when reproducing after recorded in the recording layer 123, almost errorless data can be restored by a error correction process. Consequently, less than 5% is suitable for the error rate of address information.

Embodiment 9

A sample of embodiment 9 (hereinafter simply referred to as embodiment 9) is identical to the embodiment 8 except for the modulation method. In case of the embodiment 9, a recording signal is modulated by the "D4, 6" modulation method and the minimum mark length that is equal to 2T is 0.154 μm. The embodiment 9 is recorded and reproduced as the same manner as the embodiment 8. A signal of which modulated amplitude that is equal to "(I10H−I10L)/I10H" is 0.60 is reproduced when reproducing a land portion "L". Succeedingly, an excellent error rate as low as $8 \times 10^{-6}$ is obtained from a reproduced signal. Consequently, data that do not come into question in practical application are extracted.

Further, an error rate of address information is the order of 1% in a recorded section, so that address data are restored excellently.

Embodiment 10

A sample of embodiment 10 (hereinafter simply referred to as embodiment 10) is identical to the embodiment 8 except for the modulation method. In case of the embodiment 10, a recording signal is modulated by the "D8-15" modulation method and the minimum mark length that is equal to 3T is 0.185 μm. The embodiment 10 is recorded and reproduced as the same manner as the embodiment 8. A signal of which modulated amplitude that is equal to "(I12H−I12L)/I12H" is 0.63 is reproduced when reproducing a land portion "L". Succeedingly, an excellent error rate as low as $4 \times 10^{-6}$ is obtained from a reproduced signal. Consequently, data that do not come into question in practical application are extracted.

Further, an error rate of address information is the order of 1% in a recorded section, so that address data are restored excellently.

Embodiment 11

A sample of embodiment 11 (hereinafter simply referred to as embodiment 11) is identical to the embodiment 8 except for the modulation method and recording of auxiliary information. In case of the embodiment 11, auxiliary information data are recorded in a wobbling shape by the phase-shift keying modulation wave 272.

Further, a recording signal is modulated by the 17PP modulation method and the minimum mark length that is equal to 2T is 0.149 μm.

The embodiment 11 is recorded and reproduced as the same manner as the embodiment 8. A signal of which modulated amplitude that is equal to "(I8H−I8L)/I8H" is 0.60 is reproduced when reproducing a land portion "L". Succeedingly, an excellent error rate as low as $2 \times 10^{-5}$ is obtained from a reproduced signal. Consequently, data that do not come into question in practical application are extracted.

Furthermore, an error rate of address information is the order of 0.1% in a recorded section, so that address data are restored excellently.

Embodiment 12

A sample of embodiment 12 (hereinafter simply referred to as embodiment 12) is identical to the embodiment 8 except for the modulation method. In case of the embodiment 12, auxiliary information data are processed through the base-band modulation by the Manchester coding method.

Further, the auxiliary information data processed through the base-band modulation are modulated to be the frequency-shift keying modulation wave 262 shown in FIG. 22, wherein a phase relation between a higher frequency section and a lower frequency section is $2\pi \pm (\pi/2.5)$.

Furthermore, the embodiment 12 is recorded with a wobbling shape by the frequency-shift keying modulation method, wherein a phase is selected such that a waveform continues at a point where a frequency changes over.

More, a recording signal is modulated by the "D4, 6" modulation method and the minimum mark length that is equal to 2T is 0.154 μm.

The embodiment 12 is recorded and reproduced as the same manner as the embodiment 8. A signal of which modulated amplitude that is equal to (I10H−I10L)/I10H is 0.60 can be reproduced when reproducing a land portion "L". Succeedingly, an excellent error rate as low as $8 \times 10^{-6}$ is obtained from a reproduced signal. Consequently, data that do not come into question in practical application can be extracted.

Moreover, an error rate of address information is the order of 1% in a recorded section, so that address data are restored excellently.

COMPARATIVE EXAMPLE 3

A sample of comparative example 3 (hereinafter simply referred to as comparative example 3) is identical to the embodiment 8 except for recording that is conducted to a groove portion "G" of the information recording medium 5 according to the embodiment 1. A signal having modulated amplitude of 0.38 is reproduced by reproducing a groove portion "G". Succeedingly, an error rate of $4 \times 10^{-3}$ is obtained from a reproduced signal. Consequently, data, which contain many defective and erratic portions that are impossible to correct, are extracted.

Further, address data are completely disordered, and extracting data is impossible.

COMPARATIVE EXAMPLE 4

A sample of comparative example 4 (hereinafter simply referred to as comparative example 4) is identical to the embodiment 8 except for the thickness of the light transmitting layer 11. In case of the comparative example 4, a thickness of the light transmitting layer 11 is 0.06 mm. A signal having modulated amplitude of 0.46 is reproduced. However, an eye pattern is obscure. Succeedingly, an error rate of $6 \times 10^{-3}$ is obtained from a reproduced signal. Consequently, data, which contain many defective and erratic portions that are impossible to correct, are extracted.

Further, an error rate of address information is 10% in a recorded section, so that address data are defective and contain many erratic portions that are impossible to correct.

Furthermore, the comparative example 4 is easily scratched by a scratch test such that the objective lens 50b is forced to contact with the comparative example 4 and to slide. Consequently, the comparative example 4 is not suitable for an information recording medium.

COMPARATIVE EXAMPLE 5

A sample of comparative example 5 (hereinafter simply referred to as comparative example 5) is identical to the embodiment 8 except for the thickness of the light transmitting layer 11. In case of the comparative example 5, a thickness of the light transmitting layer 11 is 0.13 mm. A signal having modulated amplitude of 0.38 is reproduced. However, an eye pattern is obscure. Succeedingly, an error rate of $9 \times 10^{-3}$ is obtained from a reproduced signal. Consequently, data, which contain many defective and erratic portions that are impossible to correct, are extracted.

Further, an error rate of address information is 10% in a recorded section, so that address data are defective and contain many erratic portions that are impossible to correct.

Accordingly, in consideration of the result of evaluation being conducted to the embodiments 1 through 7 and the comparative examples 1 and 2, which are summarized in FIG. 40, and the embodiments 8 through 12 and the comparative examples 3 through 5, it is concluded that a range of modulated amplitude that is suitable for establishing a total system is more than 0.4.

Details of the information recording mediums 1 through 5, the first and second reproducing apparatuses 40 and 41, and the recording apparatus 90 according to the present invention are explained hereinbefore.

While the invention has been described above with reference to specific embodiment thereof, it is apparent that many changes, modification and variations in the arrangement of equipment and devices can be made without departing from the invention concept disclosed herein. For example, in the case of the information recording medium 1, the microscopic pattern 20 is constituted by only one layer. However, the information recording medium 1 can be expanded to an information recording medium in which one set of layers constituted by the recording layer 12 and the light transmitting layer 13 is repeatedly laminated a plurality of times and a plurality of layers of microscopic patterns such as two layers, three layers and four layers is formed.

Further, with respect to the first and second reproducing apparatuses 40 and 41 and the recording apparatus 90, the present invention provides not only the apparatuses themselves but also their operations.

Furthermore, the present invention provides the reproducing method and the recording method that is conducted by replacing each operation of apparatuses with each step of procedures of the operations respectively.

More, the present invention provides computer programs that execute each step of the reproducing method and the recording method.

Moreover, the preset invention provides a recording and reproducing apparatus that combines the first or second reproducing apparatus and the recording apparatus, and provides a recording and reproducing method that combines the reproducing method and the recording method.

In addition thereto, the present invention provides a system that is constituted by combining the information recording medium, the reproducing apparatus, the recording apparatus, the reproducing method, and the recording method totally.

According to the present invention, as mentioned above, there is provided an information recording medium that is composed of at least a substrate having a microscopic pattern, which is constituted by a continuous substance of approximately parallel grooves formed with a groove portion and a land portion alternately, a recording layer formed on the microscopic pattern, and a light transmitting layer having a thickness of 0.07 mm to 0.12 mm, which is formed on the recording layer.

Further, with defining that a pitch between the groove portions or the land portions is "P" and a wavelength of reproducing light is $\lambda$ and a numerical aperture of an objective lens is NA, the microscopic pattern is formed with satisfying a relation of $P \leq \lambda/NA$.

Furthermore, recording is conducted in accordance with either one of reflectivity difference and phase difference caused by recording in either the land portion or the groove portion so as to be more than 5% for reflectivity while the wavelength $\lambda$ is within the range of 350 nm to 450 nm and the numerical aperture NA is within the range of 0.75 to 0.9.

Accordingly, making recording density of the information recording medium higher can be realized as well as reducing cross erase.

In addition thereto, an error rate can be suppressed down to a practical level. In other words, by combining with a reproducing apparatus, a recording apparatus, a reproducing method, and a recording method, a total system can be established.

Particularly, designating reflectivity to be within a range of 12% to 26% can establish a total system in combination with a reproducing apparatus and a recording apparatus.

Further, according to the present invention, recording is conducted in accordance with either one of reflectivity difference and phase difference caused by recording in either the land portion or the groove portion so as to be more than 0.4 for modulated amplitude. Consequently, making recording density of the information recording medium higher can be realized as well as reducing cross erase.

Furthermore, an error rate can be suppressed down to a practical level. In other words, by combining with a reproducing apparatus, a recording apparatus, a reproducing method, and a recording method, a total system can be established.

An auxiliary information such as address data is recorded geometrically in a part of microscopic pattern by the amplitude-shift keying modulation method. Therefore, recorded data can be demodulated even under low C/N condition.

Further, an auxiliary information such as address data is recorded geometrically in a part of microscopic pattern by the frequency-shift keying modulation method. Therefore, recorded data can be demodulated by a simplified circuitry. Particularly, by utilizing a frequency-shift keying modulation in which a phase is selected such that a wave continues at a point of changing a frequency, a reproduction envelope is made constant and stable reproduction is enabled.

Furthermore, an auxiliary information such as address data is recorded geometrically in a part of microscopic pattern by the phase-shift keying modulation method. Therefore, recorded data can be reproduced even under low C/N condition by demodulating the modulated data by the synchronous detection method.

Particularly, phase difference between a higher frequency section and a lower frequency section, which constitute a frequency-shift keying modulation wave, is set to $\pm \pi/2.5$, excellent signal demodulation is enabled by the synchronous detection method.

Furthermore, a reference clock is recorded in succession to an auxiliary information in a part of microscopic pattern, so that controlling revolution of a reproducing apparatus and a recording apparatus is enabled. Recording by stabilized length of record mark can be conducted, particularly when recording.

It should be understood that many modifications and adaptations of the invention will become apparent to those skilled in the art and it is intended to encompass such obvious modifications and changes in the scope of the claims appended hereto.

What is claimed is:

1. An information recording medium at least comprising:
   a substrate having a microscopic pattern including a continuous substrate of grooves formed with a groove portion and a land portion alternately;
   a recording layer formed on the microscopic pattern for recording information; and
   a light transmitting layer formed on the recording layer,
   wherein the microscopic pattern is formed with satisfying a relation of $P \leq \lambda/NA$, wherein P is a pitch of the land portion or the groove portion, $\lambda$ is a wavelength of reproducing light for reproducing the recording layer, and NA is a numerical aperture of an objective lens, and
   wherein the land portion is formed with wobbling so as to be parallel with each other for both sidewalls of the land portion,
   wherein auxiliary information based on data used supplementally when recording the information and a reference clock based on a clock used for controlling a recording speed when recording the information, is recorded alternately and continuously, and
   wherein the information is recorded in the recording layer corresponding to only the land portion by at least either one change of reflectivity difference and refractive index difference in the recording layer so as to be more than 0.4 for modulated amplitude of signal recording.

2. A reproducing apparatus for reproducing a recording layer of an information recording medium comprising:
   a substrate having a microscopic pattern having a continuous substrate of grooves formed with a groove portion and a land portion alternately;
   the recording layer formed on the microscopic pattern for recording information; and
   a light transmitting layer formed on the recording layer,
   wherein the microscopic pattern is formed with satisfying a relation of $P \leq \lambda/NA$, wherein P is a pitch of the land portion or the groove portion, $\lambda$ is a wavelength of reproducing light for reproducing the recording layer, and NA is a numerical aperture of an objective lens, and
   wherein the land portion is formed with wobbling so as to be parallel with each other for both sidewalls of the land portion, and
   wherein an auxiliary information, based on data used supplementally when recording the information and a reference clock based on a clock used for controlling a recording speed when recording the information, is recorded alternately and continuously, and
   wherein the information is recorded in the recording layer corresponding to only the land portion by at least either one change of reflectivity difference and refractive index difference in the recording layer so as to be more than 0.4 for modulated amplitude of signal recording,
   the reproducing apparatus comprising:
   a light emitting element for emitting reproducing light having a wavelength $\lambda$ of 350 nm to 450 nm and a noise of less than RIN (Relative Intensity Noise) −125 dB/Hz;
   a reproducing means equipped with an objective lens having a numerical aperture NA of 0.75 to 0.9; and
   a control means for controlling the reproducing means to irradiate the reproducing light only on the land portion for reproducing.

* * * * *